United States Patent [19]
Wiedeman et al.

[11] Patent Number: 5,884,142
[45] Date of Patent: Mar. 16, 1999

[54] LOW EARTH ORBIT DISTRIBUTED GATEWAY COMMUNICATION SYSTEM

[75] Inventors: Robert A Wiedeman, Los Altos; Paul A Monte, San Jose, both of Calif.

[73] Assignee: Globalstar L.P., San Jose, Calif.

[21] Appl. No.: 834,238

[22] Filed: Apr. 15, 1997

[51] Int. Cl.[6] .................................................. H04Q 7/36
[52] U.S. Cl. ......................... 455/12.1; 455/432; 455/443
[58] Field of Search .................................. 455/427, 429, 455/432, 443, 12.1, 13.1, 13.2, 13.3, 456, 509, 450, 454, 69; 342/354, 357

[56] References Cited

U.S. PATENT DOCUMENTS

| | | | |
|---|---|---|---|
| Re. 32,905 | 4/1989 | Baran ........................................ | 370/104 |
| 4,617,674 | 10/1986 | Mangulis et al. ........................... | 375/1 |
| 4,901,307 | 2/1990 | Gilhousen et al. ......................... | 370/18 |
| 5,010,317 | 4/1991 | Schwendeman et al. ............. | 340/311.1 |
| 5,073,900 | 12/1991 | Mallinckrodt ............................... | 375/1 |
| 5,081,703 | 1/1992 | Lee ............................................... | 455/13 |
| 5,109,390 | 4/1992 | Gilhousen et al. ......................... | 375/1 |
| 5,119,225 | 6/1992 | Grant et al. ............................... | 359/172 |
| 5,216,427 | 6/1993 | Yan et al. .................................. | 342/352 |
| 5,233,626 | 8/1993 | Ames ........................................... | 375/1 |
| 5,239,671 | 8/1993 | Linquist et al. ......................... | 455/13.1 |
| 5,265,119 | 11/1993 | Gilhousen et al. ......................... | 375/1 |
| 5,287,541 | 2/1994 | Davis et al. ............................ | 455/12.1 |
| 5,303,286 | 4/1994 | Wiedeman ................................. | 379/59 |
| 5,339,330 | 8/1994 | Mallinckrodt ............................... | 375/1 |
| 5,410,728 | 4/1995 | Bertiger et al. ........................ | 455/13.1 |
| 5,415,368 | 5/1995 | Horstein et al. ..................... | 244/158 R |
| 5,422,647 | 6/1995 | Hirshfield et al. ....................... | 342/354 |
| 5,433,726 | 7/1995 | Horstein et al. ..................... | 244/158 R |
| 5,439,190 | 8/1995 | Horstein et al. ........................ | 244/158 |
| 5,446,756 | 8/1995 | Mallinckrodt ............................ | 375/200 |
| 5,448,623 | 9/1995 | Wiedeman et al. ..................... | 455/12.1 |
| 5,548,801 | 8/1996 | Araki et al. ............................. | 455/13.2 |
| 5,551,624 | 9/1996 | Horstein et al. ..................... | 244/158 R |
| 5,612,701 | 3/1997 | Dickelman ................................ | 342/354 |
| 5,625,867 | 4/1997 | Rouffet et al. ......................... | 455/13.1 |
| 5,625,868 | 4/1997 | Jan et al. ................................. | 455/13.2 |
| 5,664,006 | 9/1997 | Monte et al. ............................ | 455/456 |
| 5,697,056 | 12/1997 | Tayloe ..................................... | 455/13.4 |
| 5,713,075 | 2/1996 | Threadgill et al. ..................... | 455/427 |
| 5,737,685 | 4/1998 | Locascio et al. ....................... | 455/12.1 |

FOREIGN PATENT DOCUMENTS

| | | |
|---|---|---|
| 0 421 698 A2 | 10/1991 | European Pat. Off. . |
| WO 90/13186 | 11/1990 | WIPO . |
| WO 91/09473 | 6/1991 | WIPO . |
| WO 93/09613 | 5/1993 | WIPO . |

OTHER PUBLICATIONS

"Increased Capacity Using CDMA for Mobile Satellite Communication", K. Gilhousen et al., IEEE Journal on Selected Areas in Communications, vol. 8, No. 4, May 1990, pp. 503–514.

(List continued on next page.)

*Primary Examiner*—Dwayne D. Bost
*Assistant Examiner*—Jean A. Gelin
*Attorney, Agent, or Firm*—Perman & Green, LLP

[57] ABSTRACT

A communication system includes a satellite communication system segment having at least one satellite, that projects a plurality of beams on the surface of the earth, and at least one terrestrial satellite gateway that is bidirectionally coupled to the at least one satellite and also to a terrestrial communications system. One or more beams from one or more satellites at the surface of the earth define a regional service area within which at least one Wireless Local Loop (WLL) service region is located. The communication system further includes a terrestrial communication segment having at least one WLL base station, capable of bidirectional communications with a plurality of WLL user terminals within the WLL service region, and a virtual gateway that is bidirectionally coupled to the WLL base station and to the at least one satellite. The virtual gateway is responsive to the terrestrial satellite gateway for temporarily assuming control of some satellite system resources for bidirectionally coupling a communication to or from an individual one of the WLL user terminals into or out of the WLL service region.

12 Claims, 36 Drawing Sheets

OTHER PUBLICATIONS

"The Iridium™[1] System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

"An Integrated Satellite–Cellular Land Mobile System for Europe", E. Del Re, University of Florence, Dept. of Electronics Engineering, italy, Sep. 21, 1989.

"Current and Future Mobile Satellite Communication Systems", S. Kato et al., IEICE Transactions, vol. F 74, No. 8 Aug. 1991, pp. 2201–2210.

"Digital Network Oriented Mobile Radio Satellite System as an Integrated Part of The GSM Cellular Radio System in Europe", P. Dondl, Deutsch BUndespost/Fernmeldetechniches Zentralmt/Darmstadt, Fed. Rep. Germ., Sep. 21, 1989.

"The OmniTRACS® Mobile Satellite Communications and Positioning System", E. Tiedemann, Jr. et al., Vehicle Electronics in the 90's: Proceedings of the In'l. Congress on Transporation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey$^{sm}$ before the FCC, Washington, D.C. 20554, May 31, 1991 pp. 33–51.

Application of Ellipsat Corporation Ellipsat for the Authority to Construct Ellipso$^R$I An Elliptical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

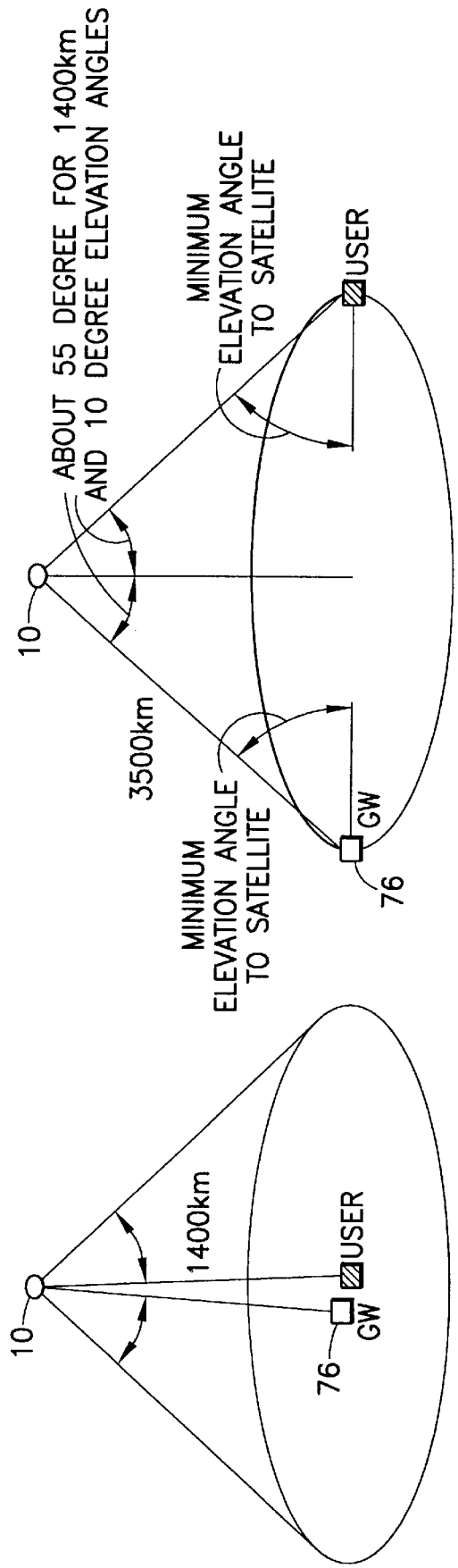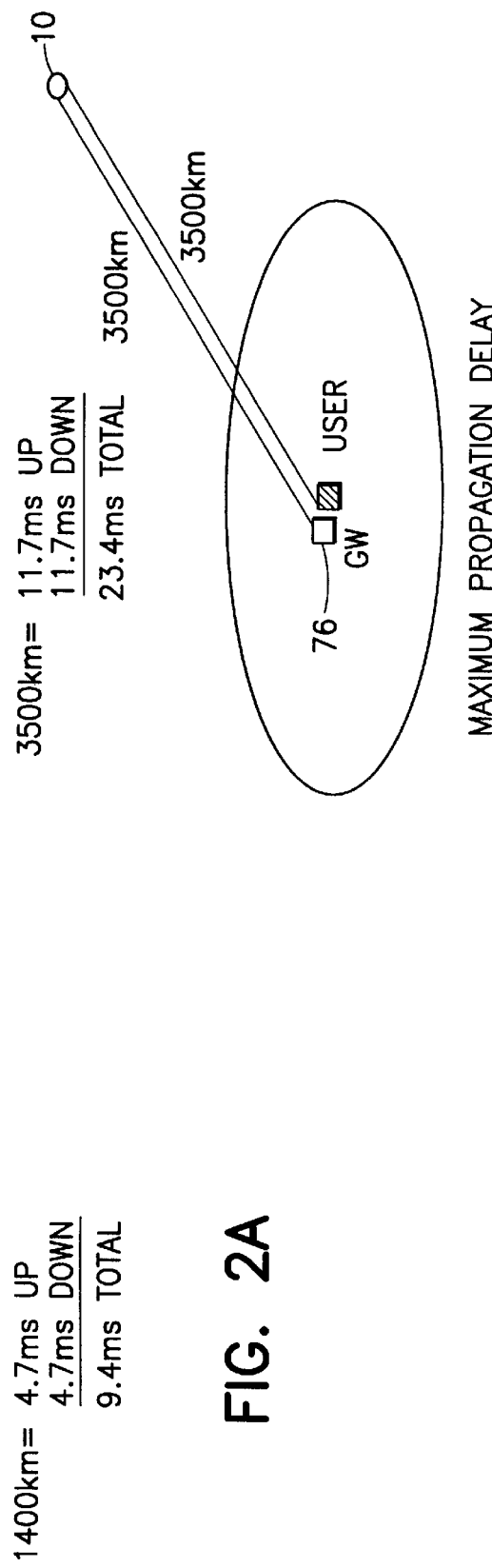

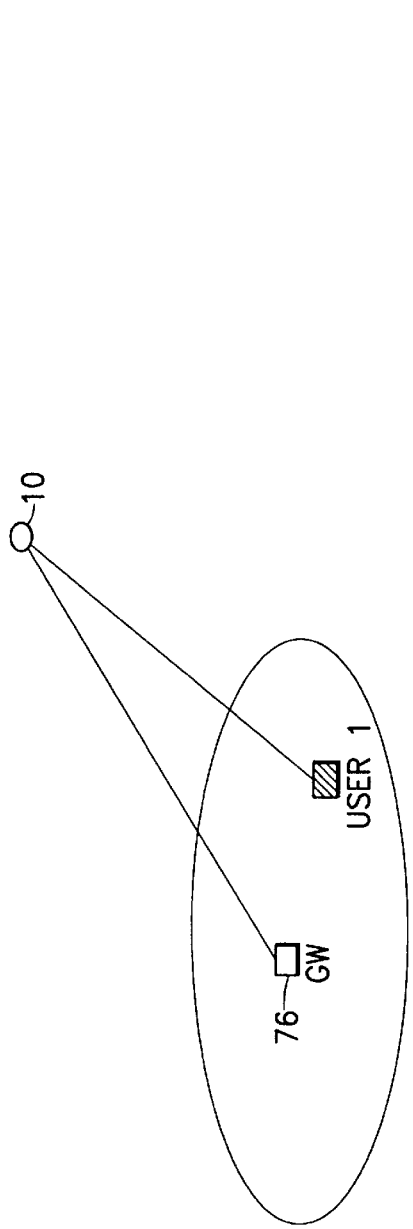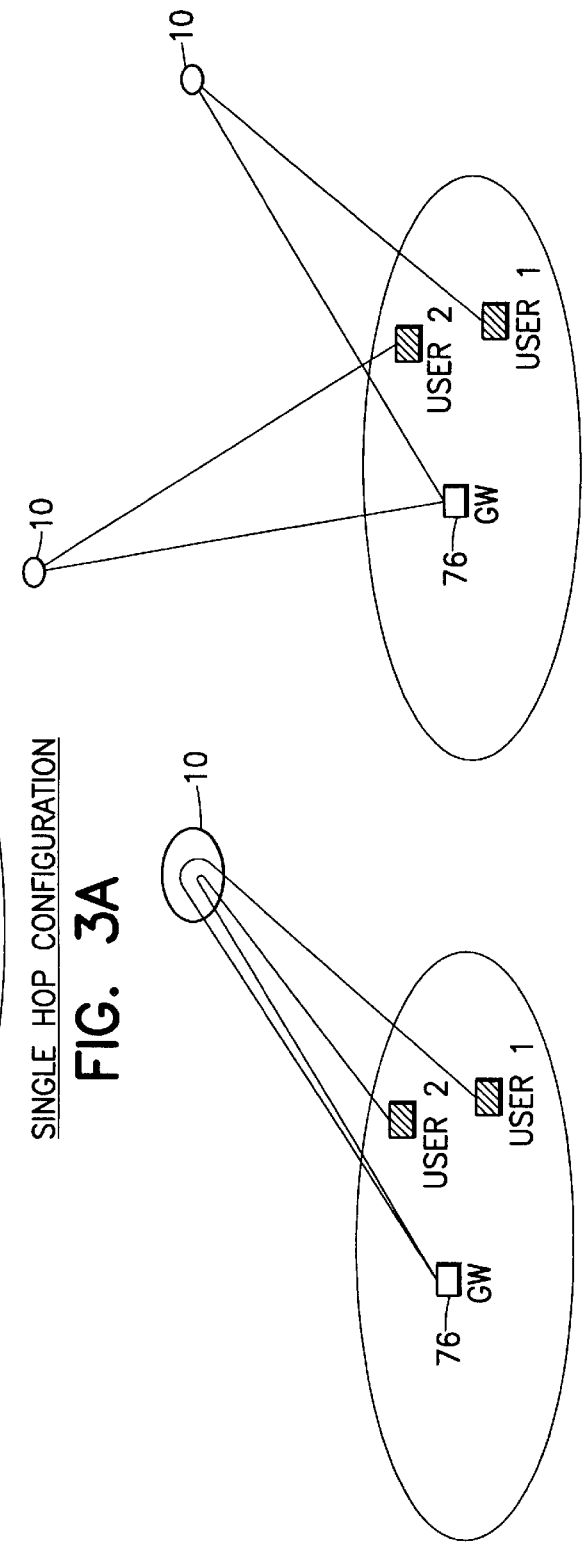

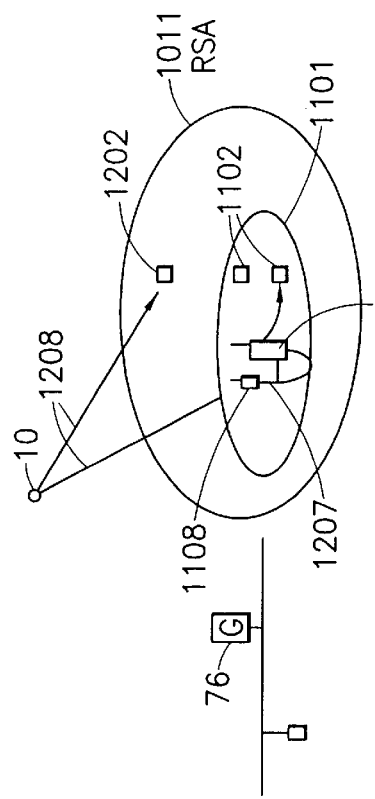
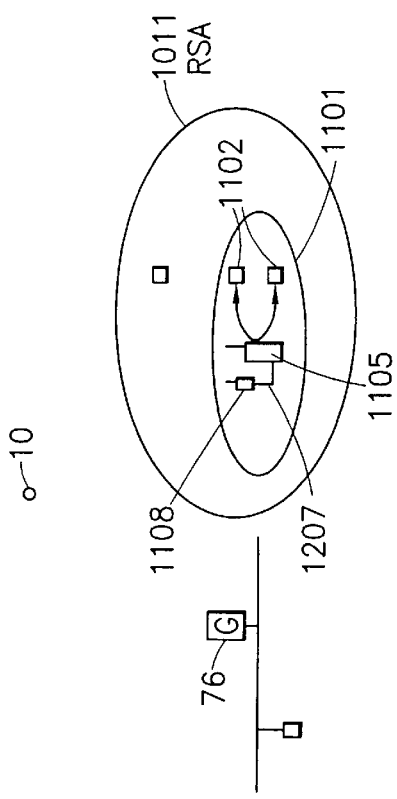
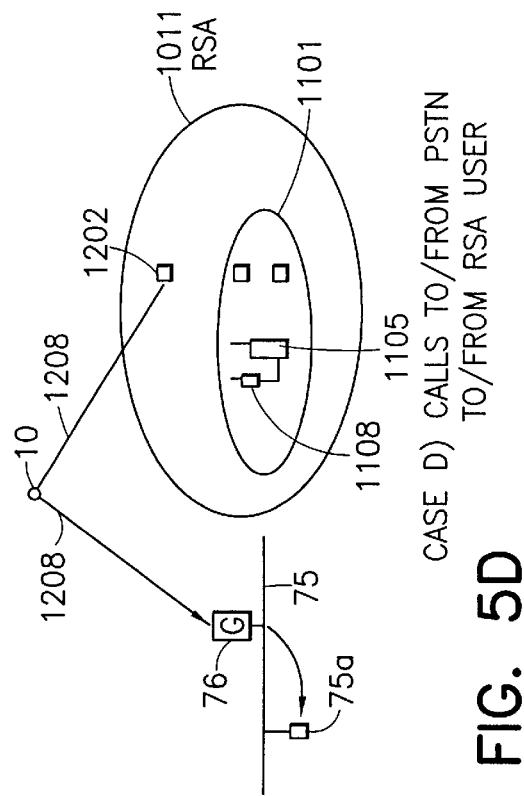
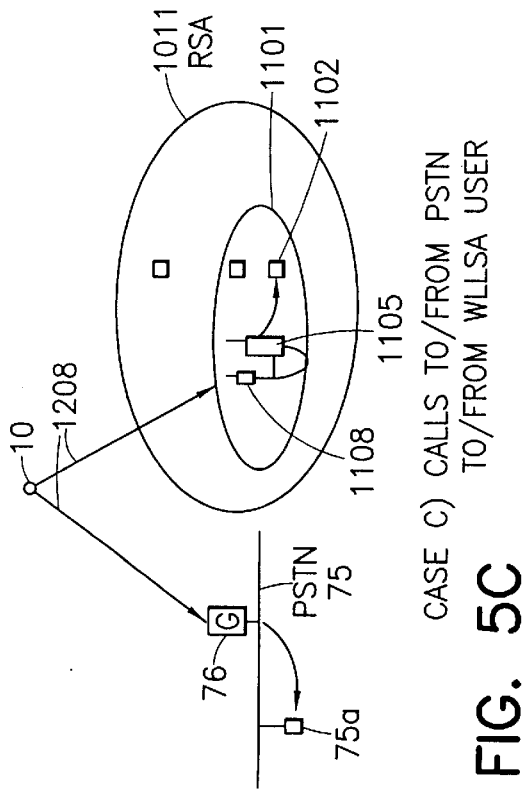

CASE E) CALLS FROM A WLLSA TO ANOTHER WLLSA WITHIN A RSA

CASE F) CALLS TO/FROM ONE WLLSA TO ANOTHER USER IN A DIFFERENT RSA

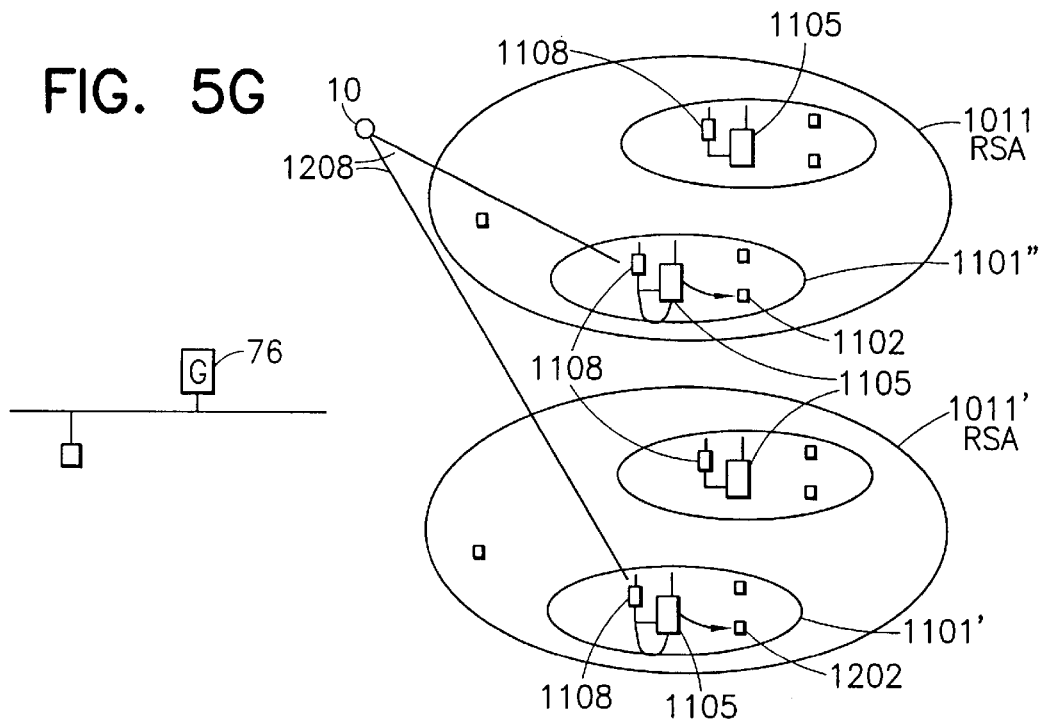
CASE G) CALLS TO/FROM ONE WLLSA TO ANOTHER WLLSA IN A DIFFERENT RSA
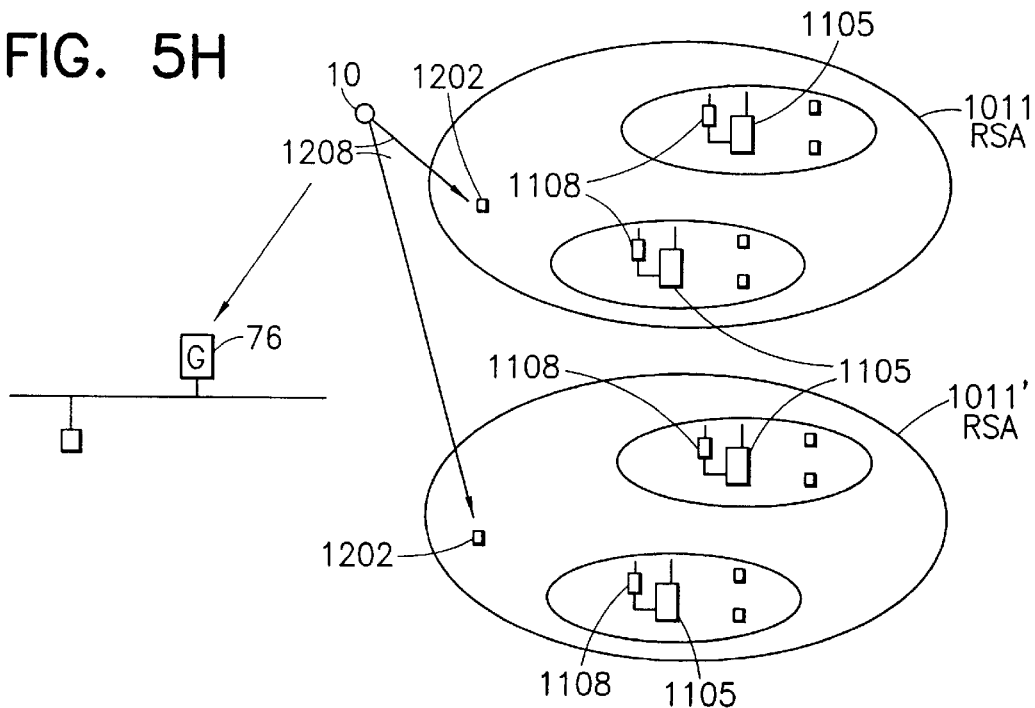
CASE H) CALLS FROM ONE VIRTUAL BEAM TO ANOTHER VIRTUAL BEAM OR IN THE SAME RSA

CALLS TO/FROM WLLSA TO USER WITHIN THE SAME WLLSA

CALLS FROM WLLSA TO USER WITHIN THE RSA

CALLS TO WLLSA FROM USER WITHIN THE RSA

CALLS FROM A WLLSA USER TO THE PSTN

CALLS TO THE WLLSA USER FROM THE PSTN

CALLS FROM A FVGWU TO THE PSTN

CALLS TO THE FVGWU SUBSCRIBER UNIT FROM THE PSTN

CALLS FROM WLLSA SUBSCRIBER TO ANOTHER WLLSA SUBSCRIBER

CALLS FROM WLLSA SUBSCRIBER IN WLLSA #1 TO A FVGWU USER IN THE SAME OR A DIFFERENT RSA

CALLS FROM FVGWU #N TO A WLLSA #1 USER IN RSA #1

CALLS FROM WLLSA SUBSCRIBER IN A RSA TO ANOTHER WLLSA SUBSCRIBER IN ANOTHER RSA

CALLS FROM FVGWU #N TO ANOTHER FVGWU #1 IN RSA #1

# LOW EARTH ORBIT DISTRIBUTED GATEWAY COMMUNICATION SYSTEM

CROSS-REFERENCE TO A RELATED PATENT APPLICATION

This patent application is related to copending U.S. patent application Ser. No. 08/772,073, filed Dec. 12, 1996, entitled "INTERACTIVE FIXED AND MOBILE SATELLITE NETWORK", by Robert A. Wiedeman.

FIELD OF THE INVENTION

This invention relates generally to satellite communication systems and, in particular, to satellite communication systems that employ a constellation of satellites in combination with terrestrial user terminals.

BACKGROUND OF THE INVENTION

Communication systems generally referred to as Wired Loop Plans (WLP) have been implemented or proposed for various regions of the earth to either provide a basic communication system or to augment already existing systems. However, WLP systems must be accurate in their planning, can experience long delays in the roll out of services due to obtaining rights of way and environmental considerations, have a high cost/subscriber ratio, are susceptible to outages due to natural disasters, theft, and political instabilities, and also have high up-front costs.

In an effort to avoid or minimize such problems Wireless Local Loop (WLL) terrestrial communication systems have been introduced, especially in developing countries. Wireless Local Loop systems avoid some of the problems inherent in WLP systems, but are still expensive to implement due to their typically smaller coverage areas and the need for many "cells" or base stations to provide adequate coverage.

It would thus be desirable to provide a WLL communication system that overcomes the problems inherent in the WLP systems, while also overcoming the problems inherent in existing WLL systems.

Also, commercial and other users are increasingly implementing TCP/IP protocol networks in response to the wide spread use of the Internet. At the present time it appears likely that TCP/IP will not only remain prevalent, but will need to be operable over satellite networks. Several experiments over the ACTS (Advanced Communications Technology Satellite) have shown that the TCP/IP protocol limits throughput, and analysis has shown this to be caused by the TCP window size and the TCP "Slow Start" algorithm for File Transfer Protocol. There may be alternative protocols developed to efficiently transfer information using TCP/IP (especially for satellite use), however, the installed base of equipment being deployed worldwide for using the terrestrial version of TCP/IP is expected to be dominant for many years.

It would thus also be desirable to provide a satellite-based communication system that overcomes the problems inherent in the use of conventional TCP/IP and other network protocols in a satellite-based system.

OBJECTS OF THE INVENTION

It is a first object of this invention to provide an Enhanced Wireless Local Loop communications system that provides single hop connectivity between WLL terminals and a terrestrial communications system, via a satellite communications system.

It is a second object of this invention to provide an Enhanced Wireless Local Loop communications system that provides single hop connectivity between WLL terminals in a first WLL service regions and WLL terminals located in a second WLL service region, via a satellite communications system.

It is a further object of this invention to provide a Satellite WLL system having one or more WLL service regions that are located within a regional service area, and to provide a virtual gateway for autonomously handling communications traffic into and out of the regional service area, in cooperation with a satellite communications system.

It is another object of this invention to provide a satellite-based communication system for serving one or more localized network areas, such as one or more of a WLL service area, a WLP service area, and a Local Area Network (LAN) service area, and that permits both fixed and mobile terminals to be provided service.

SUMMARY OF THE INVENTION

The foregoing and other problems are overcome and the objects of the invention are realized by methods and apparatus in accordance with embodiments of this invention, wherein a Satellite Wireless Local Loop (SWLL) system eliminates most of the problems inherent in WPL and WLL systems. The SWLL system in accordance with this invention is enabled to adapt itself to system growth without resorting to typically inaccurate subscriber prediction market studies, can be rapidly deployed once the satellite system is in place, has a very low cost/subscriber ratio, and has a relatively low investment for a group or community served by the SWLL system.

This invention teaches a communication system, and methods for operating the communication system, of a type that includes a satellite communication system segment comprised of at least one satellite that projects a plurality of beams on the surface of the earth. The satellite communication system segment further includes at least one terrestrial satellite gateway that is bidirectionally coupled to the at least one satellite and also to a terrestrial communications system. In the communication system one or more overlapping beams from one or more satellites at the surface of the earth define an area within which at least one Wireless Local Loop (WLL) service region is located. This area is also referred to herein as a regional service area (RSA). The communication system further includes a terrestrial communication segment comprised of at least one WLL base station capable of bidirectional communications with a plurality of WLL user terminals within the WLL service region. The terrestrial segment further includes a virtual gateway that is bidirectionally coupled to the WLL base station and to the at least one satellite. The virtual gateway is responsive to the terrestrial satellite gateway for temporarily assuming control of satellite system resources for bidirectionally coupling a communication to or from an individual one of the WLL user terminals into or out of the WLL service region.

The virtual gateway is further bidirectionally coupled to a transmitter used for transmitting at least one of paging and broadcast messages to one or more of the WLL user terminals. The paging and broadcast messages are received by the virtual gateway from the terrestrial satellite gateway via the at least one satellite.

BRIEF DESCRIPTION OF THE DRAWINGS

The above set forth and other features of the invention are made more apparent in the ensuing Detailed Description of the Invention when read in conjunction with the attached Drawings, wherein:

FIGS. 2A–2C are diagrams that are useful for explaining various propagation delays experienced by signals in a satellite communications system;

FIGS. 3A–3C are diagrams that are useful for explaining the concept of single and double hop signal propagation paths in a satellite communications system;

FIGS. 5A–5H, collectively referred to herein as FIG. 5, illustrate various cases (A–H) of calls within a WLL service area, between WLL service areas, from, to and between regional service areas, and to a PSTN terminal;

DETAILED DESCRIPTION OF THE INVENTION

It is first noted that although the invention is described below in the context of a WLL-based system, other network types, such as private networks, can be employed as well. In general, it is useful to keep in mind that the invention provides a technique for interconnecting an open-type network, such as the Public Switched Telephone Network (PSTN), with a closed-type network, such as WLL, and/or to separate user terminals. Although described below primarily in the context of a single call to a single entity, whether a user terminal of via a WLL interface to a WLL subscriber, the system can be configured and operated to simultaneously route many calls through any portion of the system.

A presently preferred embodiment of a SWLL system employs a constellation of low earth orbit (LEO) satellites that communicate through one or more terrestrial gateways. The individual gateways are each bidirectionally coupled to one or more terrestrial communication systems, such as the local Public Switched Telephone Network (PSTN), as well as to private and public data and voice networks.

The following U.S. Patents teach various aspects of a LEO satellite constellation, and the associated communication system, which may be used to practice this invention: U.S. Pat. No. : 5,422,647, issued Jun. 6, 1995, entitled "Mobile Communication Satellite Payload", by E. Hirshfield and C. A. Tsao; U.S. Pat. No. : 5,504,493, issued Apr. 2, 1996, entitled "Active Transmit Phased Array Antenna with Amplitude Taper", by E. Hirshfield; U.S. Pat. Nos. 5,448,623, issued Sep. 5, 1995, and 5,526,404, issued Jun. 11, 1996, "Satellite Telecommunications System Using Network Coordinating Gateways Operative with a Terrestrial Communication System", by R. A. Wiedeman and P. A. Monte; U.S. Pat. No. 5,233,626, issued Aug. 3, 1993, entitled "Repeater Diversity Spread Spectrum Communication System", by S. A. Ames; and U.S Pat. No. : 5,552,798, issued Sep. 3, 1996, entitled "Antenna for Multipath Satellite Communication Links", by F. J. Dietrich and P. A. Monte. The disclosures of these various U.S. Patents are incorporated by reference herein in their entireties.

As will be made evident below, the teaching of this invention is not restricted for use with LEO satellite systems, but may be practiced as well using medium earth orbit (MEO) and geo-synchronous orbit (GSO) satellite systems. Cross-links between satellites can also be used to advantage by various embodiments of this invention, but are not required for operation.

Figure 1A:
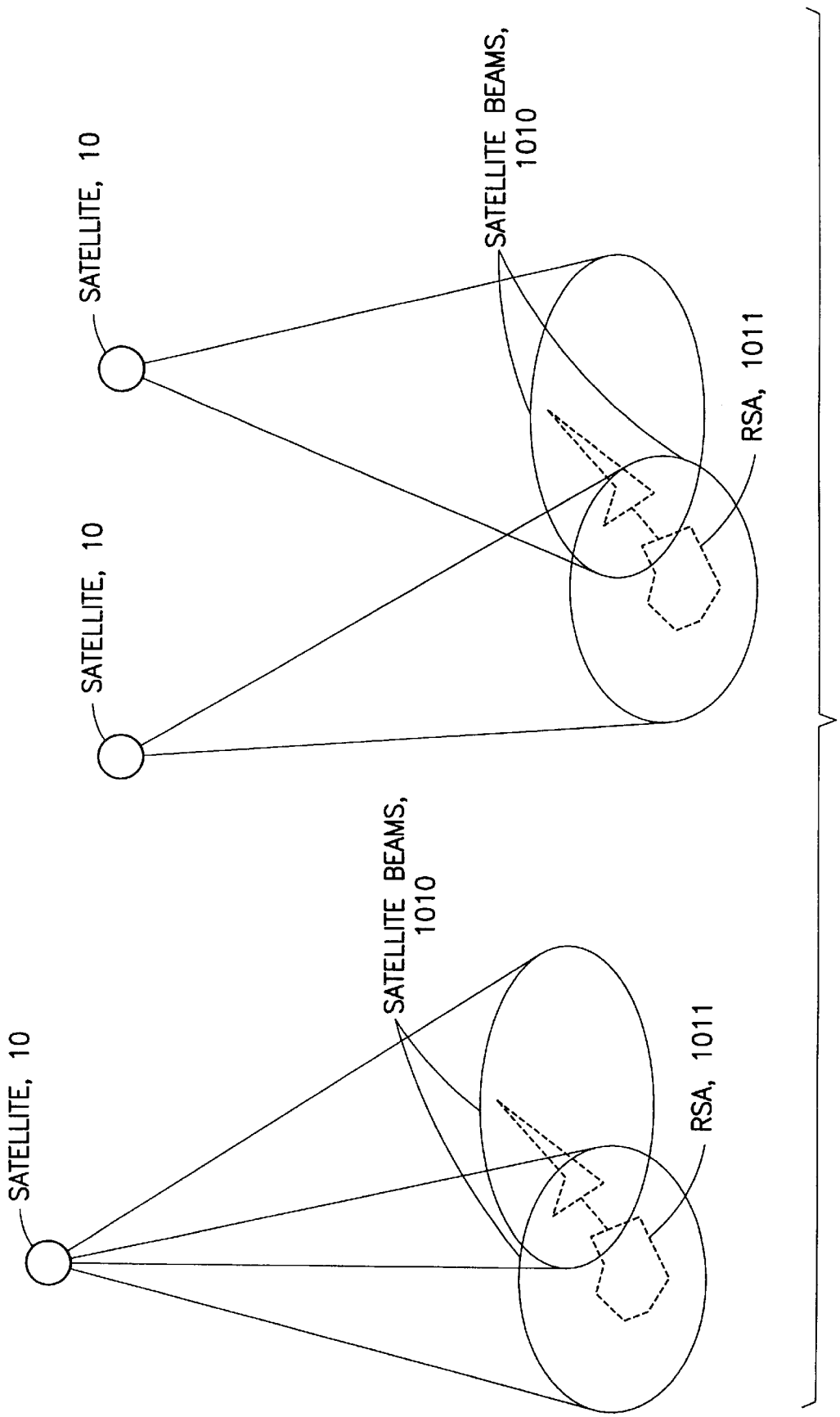
FIGS. 1A–1E are diagrams that are useful for explaining the concept of a regional service area, and the relationship of the regional service area to a WLL service region.

FIG. 1A illustrates a general configuration of a satellite 10 which generates 1 to N beams 1010 each having an associated coverage region at the surface of the earth. In accordance with an aspect of this invention it is possible to define contiguous or dis-contiguous areas on the ground which are referred to herein as Regional Service Areas (RSAs) 1011. A Regional Service Area 1011 is a portion of the Earth's surface that is served in whole or in part by one or more Virtual Gateways. As such, within a given RSA 1011 may be one or more Virtual Gateways, each serving a portion of the RSA 1011. The Regional Service Areas 1011 are not necessarily connected with any single satellite 10, but in general may be served by several of the satellites 10. In general, a given Regional Service Area 1011 may be served by one or more beams 1010 from a single satellite 10, or from one or more beams from a plurality of satellites. The Regional Service Areas 1011 may have any arbitrary shape, not necessarily contiguous, on the surface of the earth. Generally a Regional Service Area 1011 will be defined by a polygon on the surface of the Earth, having the locations (e.g., latitude and longitude) of its vertices stored in a memory of certain data processing devices (e.g., the databases of the gateway 76, Virtual Gateway 1108 and WLLBS 1105, as described below) in the SWLL system. The Regional Service Area 1011 may thus be considered to be a defined region on the ground which corresponds to a database of locations of fixed user terminals, and is essentially a map showing the locations of these terminals. In one embodiment of this invention, i.e., an on-board satellite processing embodiment, this map is carried within the satellite computer memory. In other embodiments the map is stored in the databases of the terrestrial equipment. In a LEO or MEO satellite embodiment of this invention the beams 1010 projected by the orbiting satellites move with respect to the Regional Service Area 1011, and the identities of the physical beams (and satellites 10) that serve the Regional Service Area 1011 dynamically change with time. However, based on satellite ephemeris data it is possible to calculate, at any instant of time, which satellite(s) and satellite beams are serving a given one of the Regional Service Areas 1011.

Figure 1B:
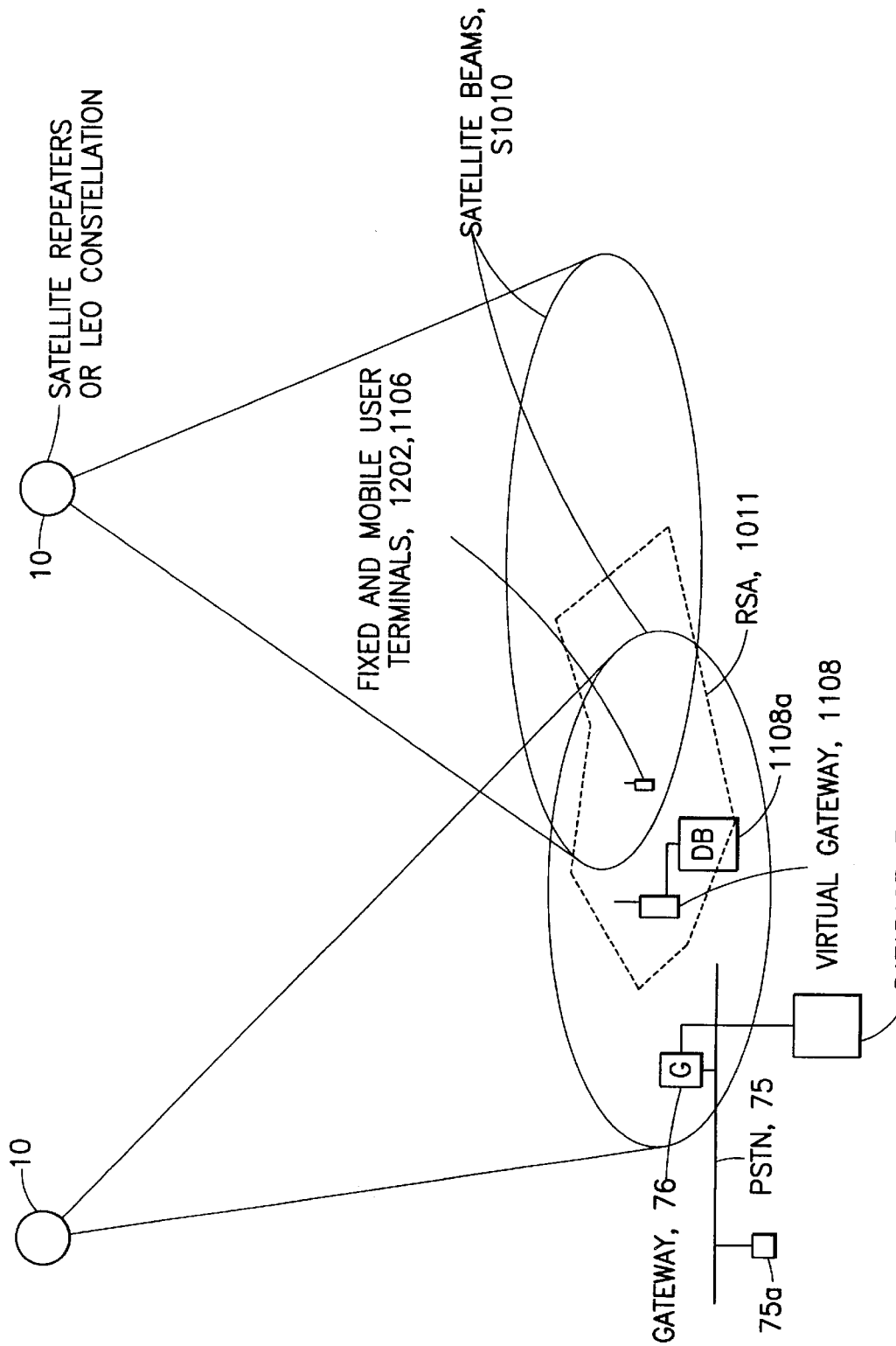

FIG. 1B illustrates various types of communications equipment and devices that are located in a Regional Service Area 1011. Located within or in proximity to the Regional Service Area 1011 are Virtual Gateways 1108, also referred to herein as PSTN Link Interfaces or as Satellite Interface Units (SIUs). The Virtual Gateways 1108 are assigned tasks to perform in the setup, call management, and call tear down procedures, as these functions are generally performed by LEO satellite system gateways 76. In the presently preferred embodiment of this invention the Virtual Gateway 1108 performs these functions, and also manages the satellite system resources that are allocated to it on a part time, as-required basis. That is to say, the Virtual Gateway 1108 functions as a local gateway for the duration of the setup, call, and call tear down time only, and relinquishes its authority and control of the system resources after these functions have been performed. The Virtual Gateway 1108 is under the control of the system gateway 76, which assigns responsibility of system resource management to the Virtual Gateway 1108 for some limited period of time. During this period of time the allocated resources may be reallocated by the Virtual Gateway 1108 one or more times, as required. Of course, it is possible that there are many calls being simultaneously handled by the Virtual Gateway 1108, and indeed, in some installations it is possible that the Virtual Gateway 1108 is active 100% of the time. Also, and as was stated above, although described in the context of a single call to a single entity, whether a user terminal of via a WLL interface to a WLL subscriber, the system can be configured and operated to simultaneously route many calls through any portion of the system. As was described above, the terrestrial coverage area or service region of one or more of the Virtual Gateways 1108 is contained within a Regional Service Area 1011.

Both the gateway 76 and the Virtual Gateway 1108 include a database (76a and 1108a, respectively) for storing information that specifies, for example, the boundaries of the associated Regional Service Area(s) 1011, and the identities of authorized users associated with the Regional Service Areas(s) 1011.

The system gateway 76 is connected to the PSTN 75, having PSTN terminals 75a (e.g., telephones) connected thereto. Other terrestrial communication networks, both public and private, may also be connected to, or may be reachable from, the gateway 76.

Figure 1C:
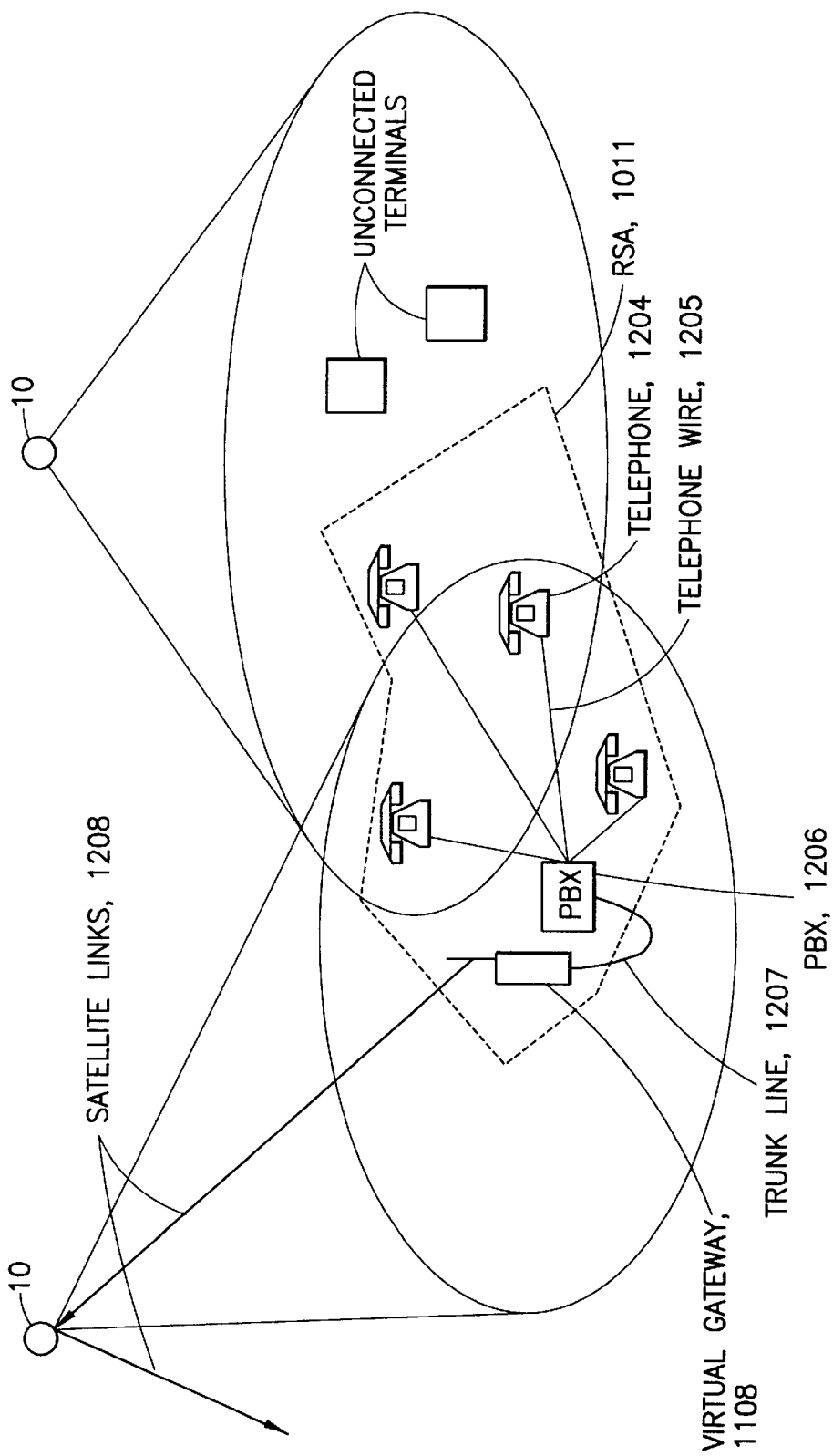

Within the Regional Service Area 1011 are also fixed and mobile terminals 1202 and 1106, respectively. Some of these terminals will desire telecommunication service to and from local areas. FIG. 1C illustrates one implementation of this type of service. Although there are many possible configurations, two are shown by example, namely Wired Connectivity and Wireless Connectivity, and it is possible to interconnect many of either type. These connections can be via satellite or terrestrial interconnections.

Figure 18:
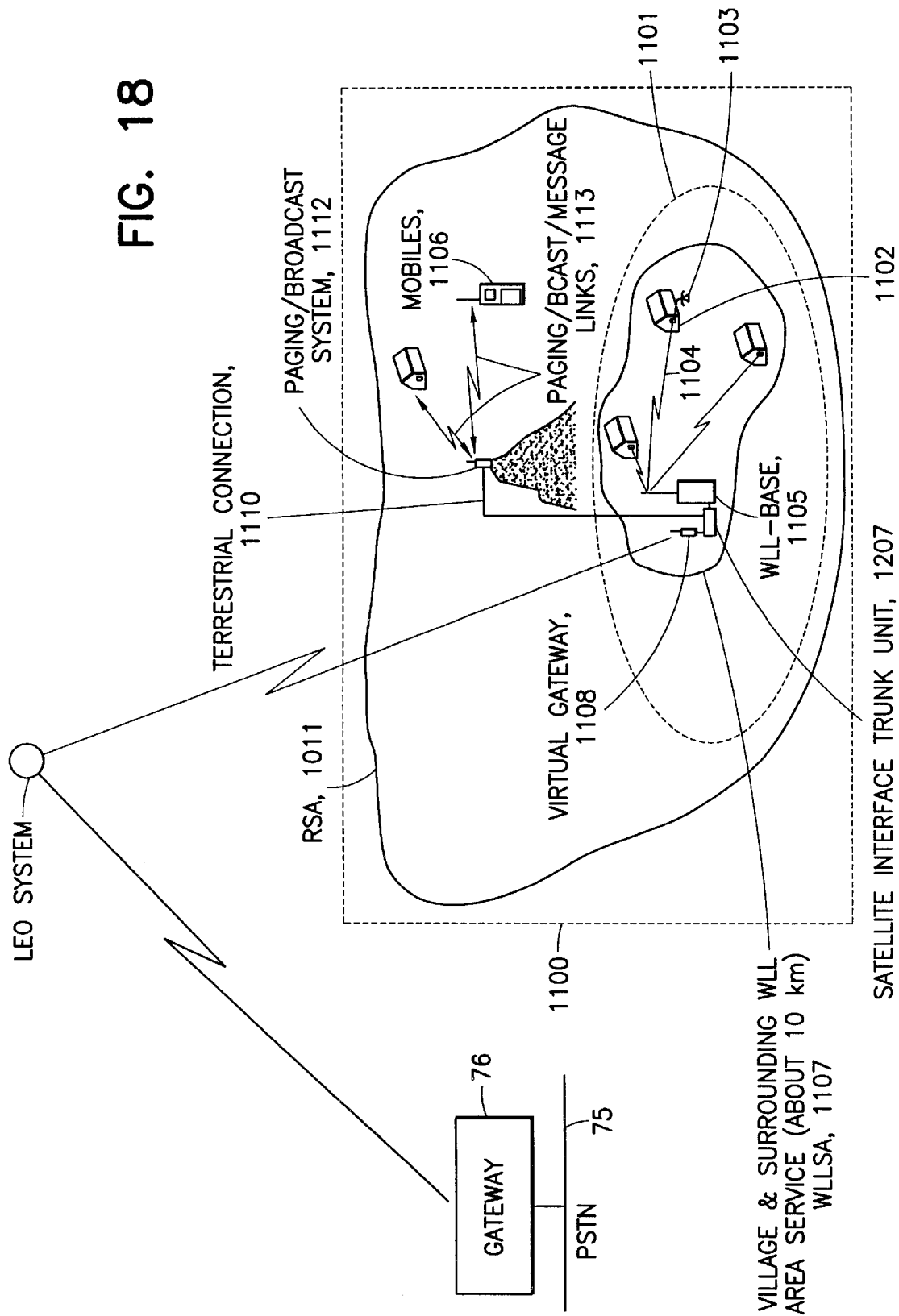
FIG. 18 is an overall system diagram showing also an enhanced paging and broadcast services system.

Considering first the Wired Connectivity case, a Wired Connectivity Virtual Gateway 1108 is connected to a PBX 1206 with a trunk line 1207, also referred to herein as a Satellite Interface Trunk Unit (see, for example, FIG. 18). This arrangement is in turn connected to many telephones 1204 by way of conventional telephone wire 1205. The PBX 1206 operates in a conventional manner, as a local loop, allowing telephone calls between telephones 1204. The trunk line 1207 allows calls out of the local area (the Wired Local Loop). The users desiring communications out of range of the Wired Local Loop use the trunk line connection via the PBX 1206 to the Virtual Gateway 1108 to communicate out of the local area by way of satellite links 1208. The satellite links 1208 are bidirectional links made through the Virtual Gateway 1108, one or more of the satellites 10, and a gateway 76 (not shown) whose service area includes the region served by the Wired Local Loop. This system, while limited to the requirement to install the telephone wires 1205 between the telephones 1204 and the PBX 1206, does allow adequate local connectivity.

Figure 1D:
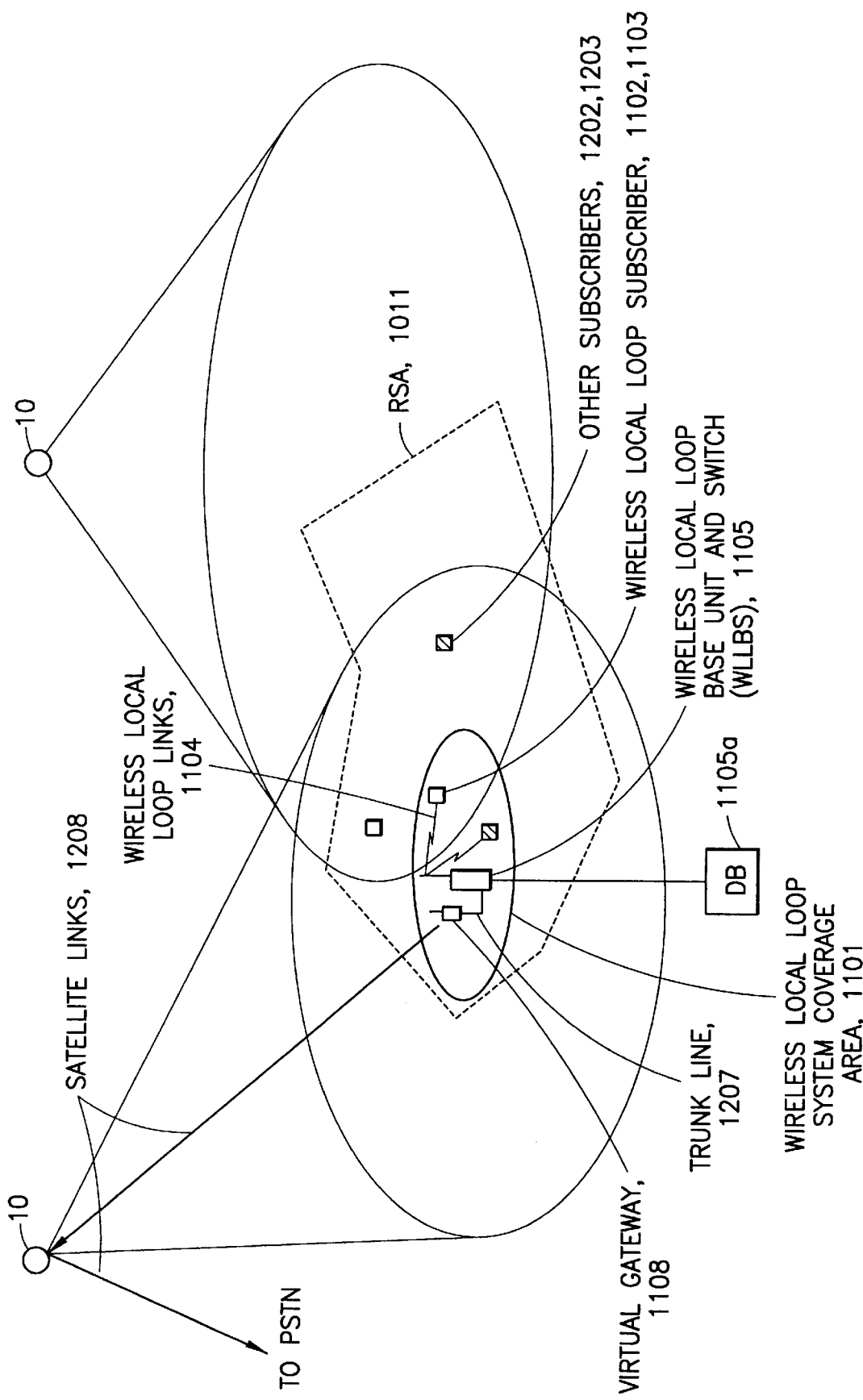

A system that features wider utilization is shown in FIG. 1D. The system of FIG. 1D utilizes a Wireless Local Loop (WLL) to connect subscribers. The Wireless Local Loop (WLL) system has a coverage or service area 1101, also referred to as a WLLSA. This WLLSA 1101 is generally limited to a radius of a few miles, typically less than 10 miles, and serves a population of users or subscribers within its range. The users have access to WLL Subscriber Units 1102, each having an associated handset 1103. There may be other users (referred to below as Fixed Virtual Gateway Users (FVGWUS) having FVGWU Subscriber Units 1202 and associated handsets 1203) that are outside of the WLLSA 1101 and that desire to be connected to the WLL and alternatively to other WLLs, as well as to the PSTN 75 having the terminals 75a (e.g., telephones) connected thereto. Within the WLLSA 1101 there is at least one Wireless Local Loop Base Station (WLLBS) 1105 which may or may not include a switch. Users with WLL equipment are connected to the WLLBS 1105 by local radio frequency links 1104. There may be any kind of modulation scheme in use on the local RF links 1104, and the modulation scheme need not resemble that used on the satellite links 1108. The WLLBS 1105 is connected by a trunk line 1207 to a Wireless Connectivity Virtual Gateway 1108. The trunk line 1207 may be a physical cable, a pair of wires, a radio link, or any other suitable transmission medium. The WLLBS 1105 may also be co-located with the Virtual Gateway 1108. The Virtual Gateway 1108 is connected to the satellite 10, and thence to the PSTN 75 or public or private networks, by satellite radio links 1208, via the gateway 76 (not shown). The WLLBS 1105 includes a database 1105a that stores information that describes, by example, the identities of the WLL user terminals associated with the WLL service area. A plurality of WLLBSs 1105 can be associated with and connected to one Virtual Gateway 1108.

Figure 1E:
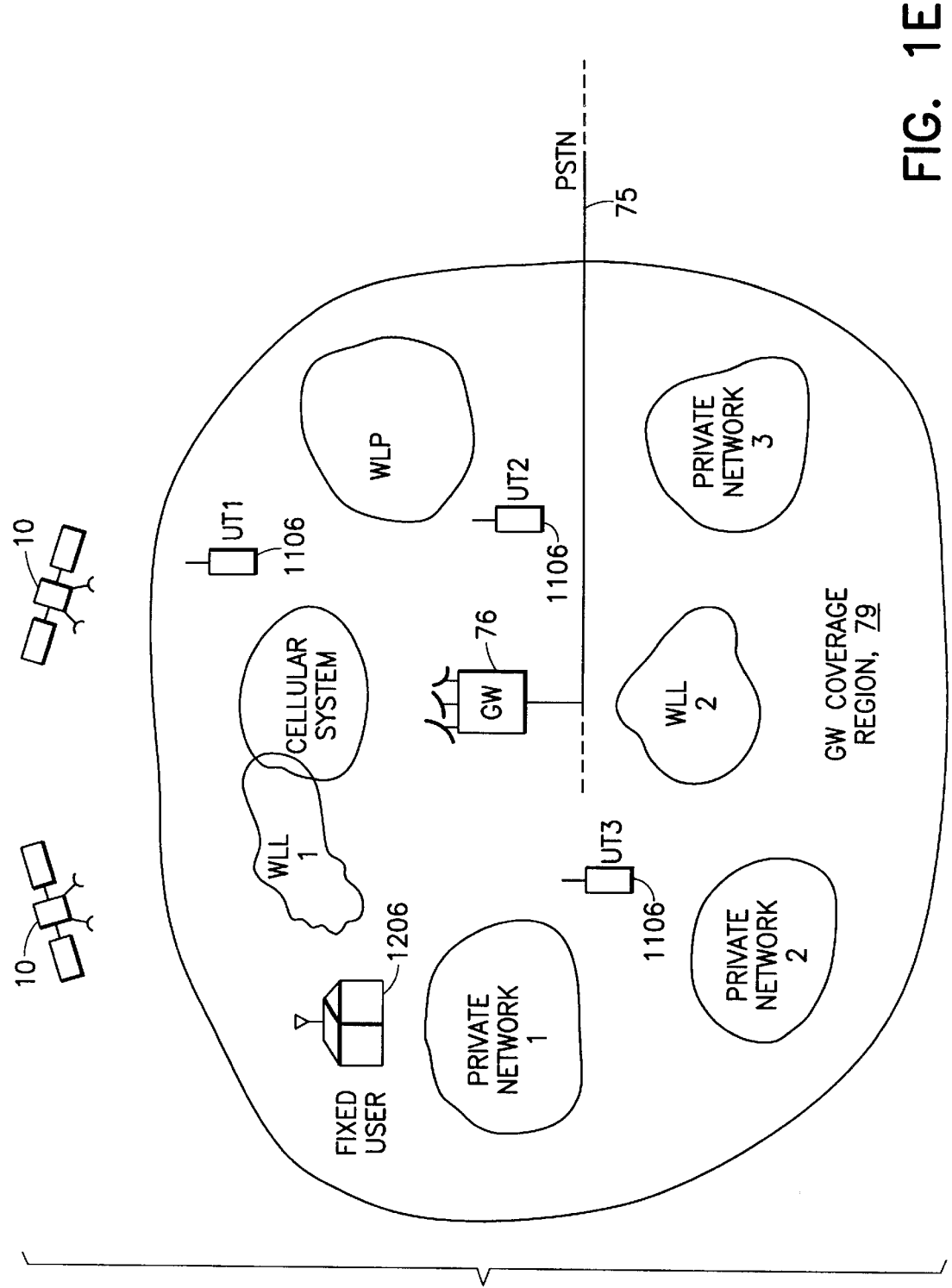

Referring to FIG. 1E, it can be seen that a given gateway 76 has an associated gateway coverage or service region 79. Within the gateway service region 79 can be a plurality different localized network coverage regions, including WLL regions (WLL 1–WLL 2), private networks (Private Network 1-Private Network 3), terrestrial cellular systems, and WLP regions, some of which may overlap. Both fixed users 1206 and roaming users 1106 may be located within the gateway service region 79 outside of one of the localized network coverage regions. The teaching of this invention can be employed to provide satellite communications service to any or all of these various localized network coverage regions, as well as to the fixed and mobile users 1206 and 1106.

Referring now to FIG. 18, there is shown an embodiment of a SWLL system providing various paging and call alerting types of services. Included in this type of services are one way broadcasting (very narrow casting) to service areas which are extremely small. One application of the distributed gateway embodied in the satellite interface unit or virtual gateway 1108 is the delivery of paging, messaging, low speed data, SCADA control, and call alerting of mobile users by the use of other terrestrial systems. For this service, the Virtual Gateway 1108 (also referred to as a PSTN Interface Unit), with its associated Satellite Interface Trunk Unit 1207, is connected to various Paging/Broadcast Systems 1112 via a terrestrial connection 1110 or other suitable means. The Paging and Broadcast System 1112 transmits data to mobile terminals 1106 and fixed user equipment by way of Paging/Broadcast/Message links 1113. As an example of the use of such a system, consider a mobile user 1106 which has been in contact with the system for some period of time and is registered as a mobile user at gateway 76. This user then moves indoors. Since the gateway paging messages that normally alert the mobile terminal 1106 that a call is received may be blocked by the building, the mobile terminal 1106 cannot receive the paging messages. The system, after some number of attempts to reach the mobile terminal 1106, forms a message at the gateway 76, and transmits the message to the appropriate Satellite Interface Trunk Unit 1207 and thence to the Paging/Broadcast System 1112. The Paging/Broadcast System 1112 is sited in a good location (e.g., the top of a mountain or some other high place). The Paging/Broadcast System 1112 in turn broadcasts the paging message on a frequency (typically a lower frequency) which is able to penetrate the building successfully. The mobile user terminal 1106, with an appropriate receiver capable of tuning to the lower frequency either automatically or on demand from the user, thence is notified that a call is waiting. The mobile user, thus alerted, can move to a location, (e.g. outdoors or near a window) where the paging message can be responded to and the incoming call connected. Using this technique the Paging/Broadcast System 1112 can also be used to broadcast data and messages to many users simultaneously via the Paging/Broadcast/Message links 1113.

A feature of this invention is an elimination of double hop to improve communication quality. In general, satellite communications using LEO (and MEO) satellites are transmitted to a gateway 76 and thence to the PSTN 75. If the communications is to a terrestrial called party, the "hop" through the satellite is equal to:

$$T_{(delay)} = T_{(digitization)} + T_{(modulation)} + T_{(uplink)} + T_{(sat\ delay)} + T_{(dnlink)} + T_{(gateway)};$$

where the uplink and downlink delays are a function of the satellite altitude.
The total delay for a GEO-Synchronous system is:

$$T_{(GEO)} = T_{(digitization)} + T_{(modulation)} + T_{(sat\ delay)} + T_{(gateway)} + 250\ \text{ms}.$$

Typical values for the digitization, modulation and gateway effect yields a static delay of 100 ms, plus the propagation delay. For the GEO-Synchronous case this results in a typical value of 360 ms. For a double hop communications link this results in a value of 720 ms. Delay values this large yield unacceptable performance for voice, and are virtually impossible for data communications. With low earth orbit satellites, this delay is lower:

$$T_{(LEO)} = T_{(digitization)} + T_{(modulation)} + T_{(sat\ delay)} + T_{(gateway)} + [T_{(uplink)} + T_{(dnlink)}];$$

where $T_{(uplink)}$=the propagation delay from the user to the satellite and $T_{(dnlink)}$=the propagation delay from the satellite to the gateway (or other device), or where $T_{(dnlink)}$=the propagation delay from the user to the satellite and $T_{(Uplnk)}$= the propagation delay from the satellite to the gateway (or other device).

Since the path lengths are the same in either case only one is necessary to be considered. The delay to a LEO satellite is a function of the distance from the gateway 76 to the satellite 10, and thence to the user as shown in FIG. 3. This distance is a function of the instantaneous altitude of the satellite, its orbital position, and the distance between the user and the gateway. This delay also varies with time.

By example, and referring to FIG. 2A, for a satellite that is directly overhead at an altitude of 1400 km, with the distance between the gateway and the user being zero, the one way path delay is:

Path Delay (min)=1400×2/300=9.4 ms.

Referring to FIGS. 2B and 2C, and for a user at the maximum slant range of an orbiting satellite, with the user and gateway both having a minimum elevation angle of 10 degrees, the path delay (path=3500 km) is:

Path Delay (max)=3500×2/300=23.4 ms.

Thus the total maximum LEO delay is 110 ms plus 23.4 ms=133.4 ms, which yields a double hop delay value of 266.8 ms. While a value of 133 ms is very acceptable for voice communications, and for single hop data communications, the double hop value, while yielding acceptable voice communications, would have poor performance for data.

Therefore, it can be appreciated that it is important to reduce the data communications to and from users to a single hop configuration, thereby eliminating the delay associated with the double hop case. As will be described in further detail below, the teaching of this invention enables the elimination of the double hop delay in most types of call configurations.

It will be instructive to first consider a conventional general case. User terminals are typically connected to gateways, and thence to PSTN 75 connections, according to: (a) the single hop configuration, wherein users calling another user is connected according to FIG. 3A, (b) through one satellite (FIG. 3B), or (c) through two different satellites (FIG. 3C). In conventional practice the delay, user to user, is not optimized, and the call is set up through a switch, causing a doubling of the delay. That is, for GEO:

Double Hop delay $_{(GEO\text{-}full)}$=2×Single Hop delay=2×360 ms=720 ms.

If the switch is sufficiently intelligent to connect the users without demodulating the signal one of the delay components is eliminated, resulting in;

Double Hop delay$_{(LEO\text{-}max)}$=2×Single Hop delay= 2×360 ms−110 ms=610 ms. For LEO satellites at 1400 km the delay is:

Double Hop delay $_{(LEO=max)}$=2×Single Hop delay=2× 133.3 ms=266.6 ms (worst case), or Double Hop delay $_{(LEO\text{-}min)}$=2×Single Hop delay=2× 119.4 ms=238.8 ms (best case).

Using an intelligent switch, and eliminating the demodulation of the signal in the gateway 76, can thus reduce the delay to that of only adding another path loss of 23.4 ms worst case and 9.4 ms best case, plus some processing overhead in the gateway of about 50 ms:

Double Hop delay $_{(LEO\text{-}partial\ max)}$=1×133.3 ms+23.4 ms+50 ms=206.7 is (worst case);

Double Hop delay $_{(LED\text{-}partiat\ min)}$=1×119.4 ms+9.4 ms +50 ms=178.8 ms (best case).

For a Medium Earth Orbit (MEO) system (at about 10,312 km) the delays are 96 ms for a two way path to an elevation angle of 10 degrees, and 69 ms for a path directly from the satellite to the sub-satellite point. These values lead to double hop delays of between 358 to 412 ms, or 298 to 352 ms for the optimized case.

Figure 4:
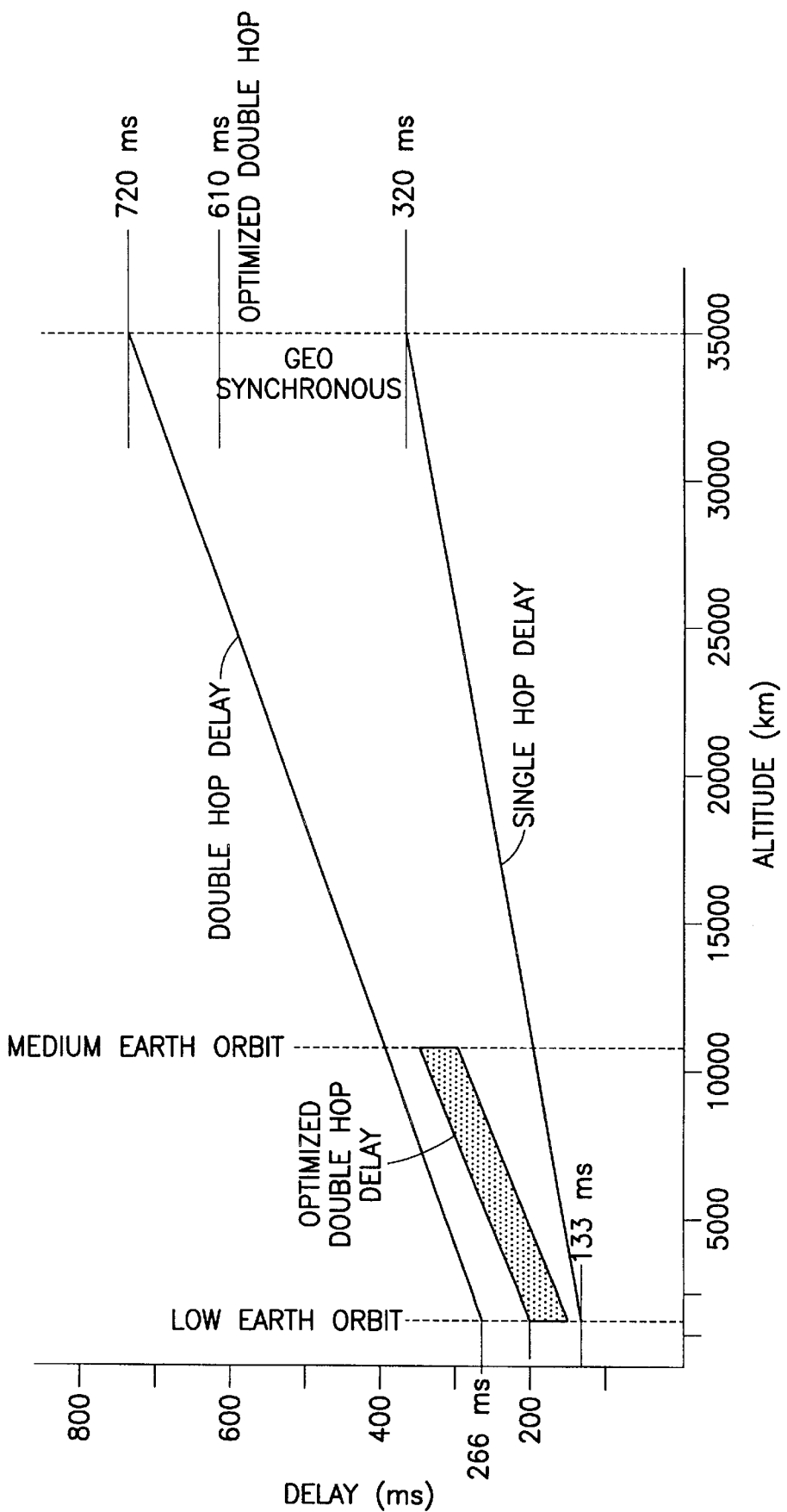
FIG. 4 is a graph that relates propagation delays to satellite altitude, for the single and double hop cases, for various types of satellite communication systems.

The graph shown in FIG. 4 summarizes the various delays for the LEO, MEO and GEO satellite cases.

Figure 5E:
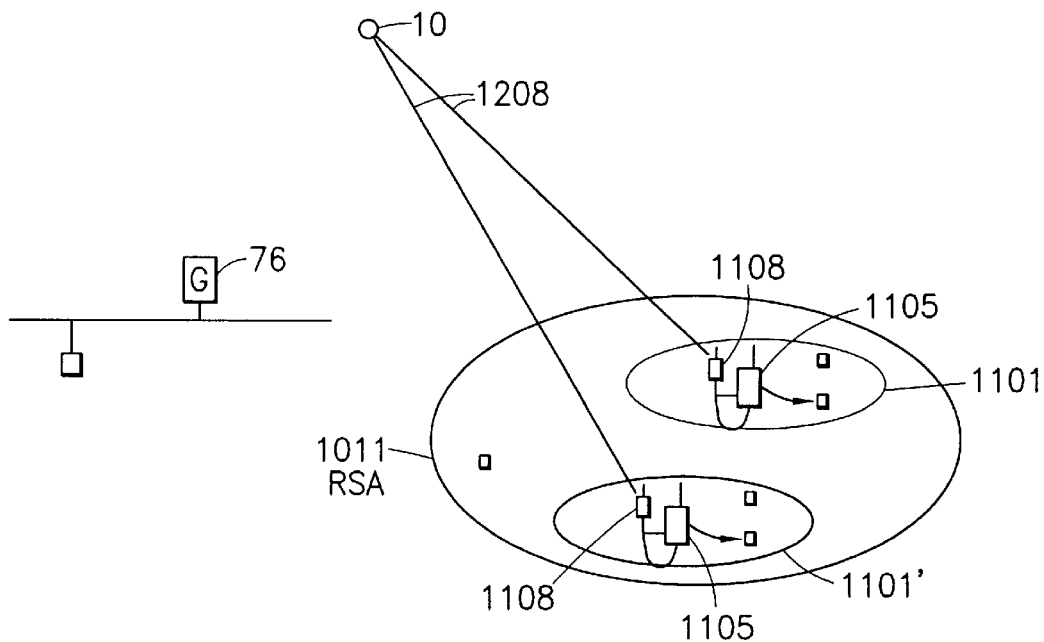
Figure 5F:
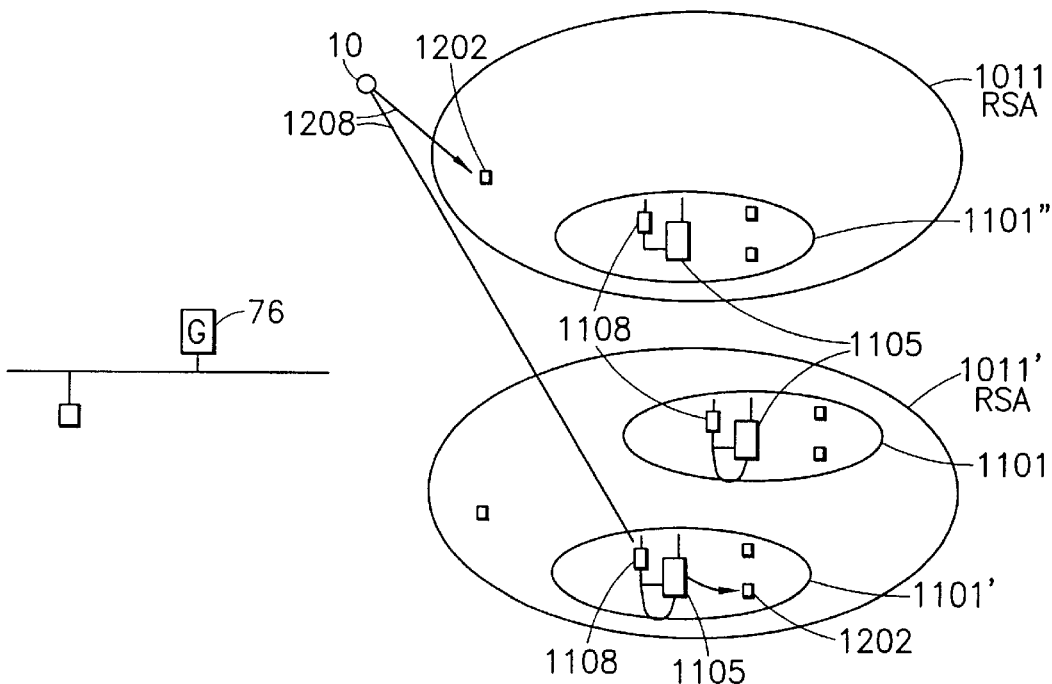

An important aspect of the teaching of this invention is a significant reduction in signal path delays, enabling improvements in the use of various data networks, such as the TCP/IP network referred to previously. A communication method in accordance with an embodiment of this invention beneficially reduces or eliminates the cases of double hop through satellites by employing on-board satellite signal processing, and call routing, to and from Wireless Local Loop systems. Reference is now made to FIG. 5 for illustrating various cases (A–H) of combinations of calling for a number of Regional Service Area 1011 connections. The following Table summarizes these various cases.

TABLE

Case Description

A A call within the WLLSA 1101, e.g., a first WLL Subscriber unit 1102 to a second WLL subscriber Unit 1102 via the WLLBS 1105.

B A call to/from a WLL subscriber Unit 1102 in the WLLSA 1101 to a subscriber Unit 1202 within the Regional Service Area 1011, but outside the WLLSA 1101.

C A call to/from the PTSN terminal 75a to a WLL Subscriber Unit 1202 in the WLLSA 1101, via the gateway 76, satellite links 1208, Virtual Gateway 1108, and WLLBS 1105.

D A call to/from the PSTN terminal 75a to a subscriber Unit 1202 in the Regional Service Area 1011, but oytside the WLLSA 1101, via the gateway 76 and satetilite links 1208, and bypassing the virtual gateway 1108 and WLLBS 1105.

E A call to/from a subcriber Unit 1102 in the WLLSA 1101 to another Subcriber Uint 1102 in another WLLSA 1101' within the same Regional Service Area 1011.

F A call to/from a Subscriber Unit 1102 in one WLLSA 1101' in a first Regional Service Area 1101' to a Subscriber Unit 1102 wutgub a second Regional Service Area 1011, but not in a second WLLSA 1101", using the WLLBS 1105 and Virtual Gateway 1108.

G A call to/from a Subscriber Unit 1102 in one WLLSA 1101' in a first Regional Service Area 1011' to a Subscriber Unit 1102 within a second Regional Service Area 1011 in a second WLLSA 1101", using the WLLBS 1105 and Virtual Gateway 1108, and possibly bypassing the gateway 76.

H A call to/from a Subscriber Unit 1202 in Regional Service Area 1011 to another Subscriber Unit 1202 in Regional Service Area 1011 or in another Regional Service Area 1011' (neither Subscriber Unit being located in a WLLSA 1101), possibly using the gateway 76.

In all of these cases, with the exception of the latter case of the call to/from one Subscriber Unit 1202 in Regional Service Area 1011 to another Subscriber Unit 1202 in Regional Service Area 1011 or in another Regional Service Area 1101', it is possible to avoid utilizing a double hop communications link, thereby keeping the signal propagation delay as low as possible. With the exception of Case A (i.e., subscriber to subscriber links within a single WLLSA 1101) the links utilize the satellite 10, and possibly also the gateway 76, for completing the link. What is important is that the linking interface (the gateway 76 and/or the Virtual Gateway 1108) recognize the type of call and route it accordingly. In on-board processing embodiments of this invention it may be necessary for only the satellite 10 to recognize the type and destination of the call and route it accordingly.

Figure 6:
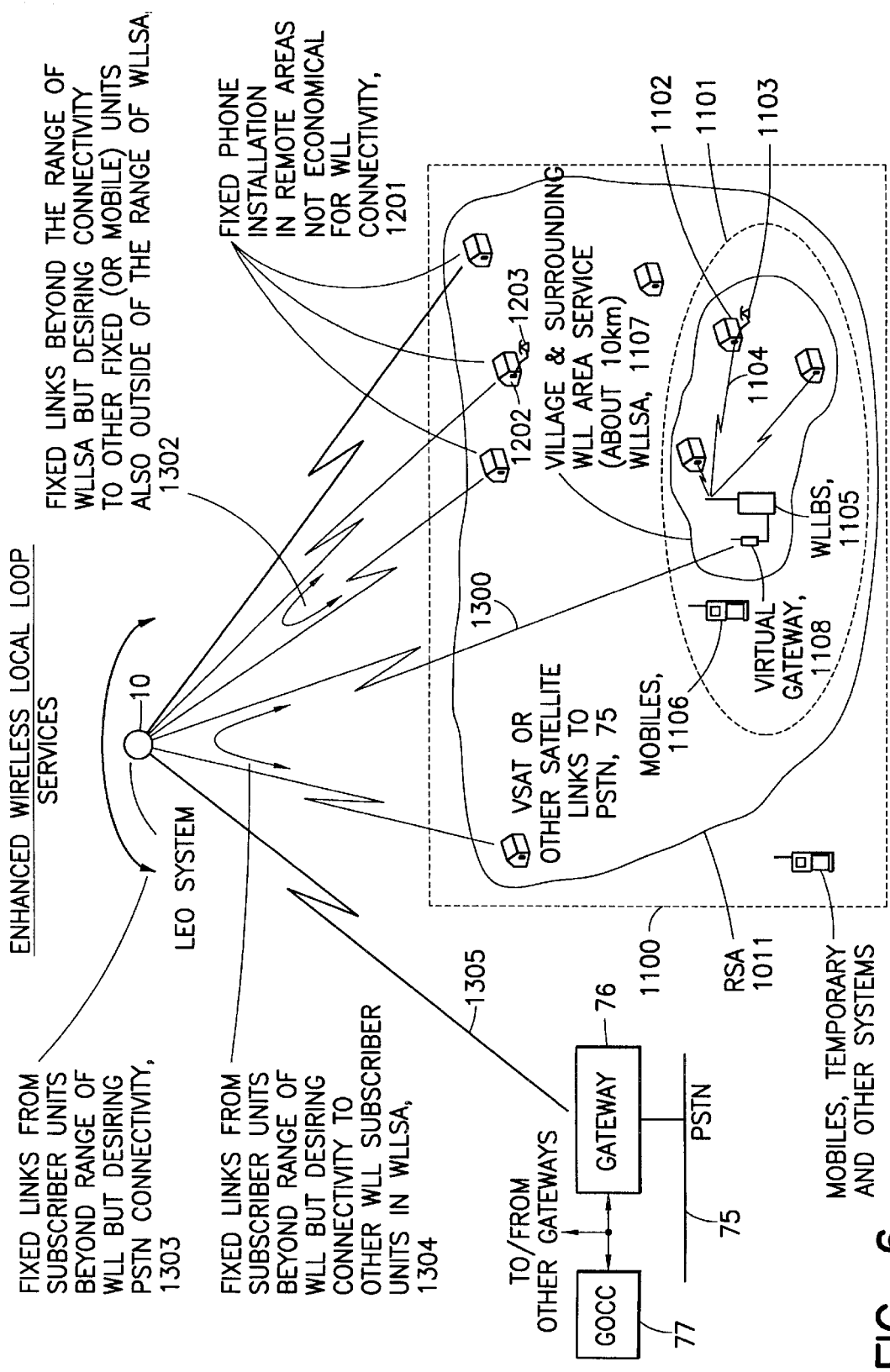
FIG. 6 is a simplified block diagram of an enhanced WLL system in accordance with the teaching of this invention.

The basic interconnection plan is shown in FIGS. 1A–1D, wherein the Regional Service Area 1011 is located within satellite beams 1010. One purpose of the Regional Service Area 1011 is to augment terrestrial WLL installations to form an Enhanced Wireless Local Loop (EWLL) Service. FIG. 6 illustrates an exemplary EWLL installation, in accordance with this invention, and a connection to the remote PSTN 75. A wireless local loop system 1100 is connected to the PSTN 75 by some means, either terrestrial (e.g., fiber optics or microwave) or a satellite link 1300 (typically a Very Small Aperture Terminal (VSAT) or other satellite link). In this case there is a terrestrial Wireless Local Loop system that includes WLL Subscriber Units (SUs) 1102 mounted on dwellings that are connected to user handsets 1103. In turn the WLL SUs 1102 are able to communicate over an optical or Radio Frequency link 1104 to the Wireless Local Loop Base Station (WLLBS) 1105. The WLLBS 1105 performs the task of connecting calls to and from WLL SUs 1102 to other WLL SUs 1102 within the WLL Service Area (WLLSA) 1107. The WLLSA 1107 may be considered as a sub-region of the Regional Service Area 1011. There may be more than one WLLSA 1107 located within a given Regional Service Area 1011. Connections out of the WLLSA 1107 (containing from 1 to n WLLBS 1105) are made, in this example, by the Virtual Gateway 1108, also referred to as a Sat-Interface Unit. One purpose of the Virtual Gateway 1108 is to allow calls to be made from the WLLSA 1107 to the PSTN terminal 75a connected to the PSTN 75, which may be located at a remote site, e.g., hundreds or thousands of miles away. The VSAT or other satellite service links 1300, such as, by example, L-Band and S-Band links to a LEO satellite communications system, connect the WLLSA 1107 to the satellite 10 and, via a feederlink 1305 (for example, a C-Band or Ka-Band feederlink), to the gateway 76 and thence to the PSTN 75.

Reference in this regard can be had to various ones of the above-noted U.S. Patents for describing embodiments of a LEO satellite constellation and gateway architecture that are suitable for practicing this invention. By example, the satellite service links 1300 and feederlinks 1305 may use direct sequence, code division-multiple access (DS-CDMA) protocols. In other embodiments time division-multiple access (TDMA) protocols can be used. It should thus be realized that the teachings of this invention are not restricted to any one particular satellite system architecture, orbital altitude, modulation or access type, bands of frequencies, etc.

Returning to FIG. 6, there are typically one or more fixed phone installations 1201 located in the Regional Service Area 1011 which are not economically connected to the WLLSA 1107 due to terrain difficulties, range, or combinations of both. It is desirable to connect the fixed phone installations 1201, comprised of Subscriber Units 1202 and handsets 1203, to other WLLSA Subscriber Units 1102 within the Regional Service Area 1011 and to each other. This invention provides the facility to make these connections without routing the call through the gateway 76. This feature provides a general throughput advantage at the gateway 76, and reduces overall system delay.

Still referring to FIG. 6, there are users located in the terrestrial WLLSA 1107 that use a telephone handset to make calls. At least four types of calls are possible:

(A) a call to/from another user within the WLLSA 1107;

(B) a call to/from another user outside the WLLSA 1107 but in the Regional Service Area 1011;

(C) a call to/from the PSTN 75 by a subscriber within a WLLSA terrestrial system; and (D) a call to/from fixed telephone installations 1201 within the Regional Service Area 1011.

These various calling cases (A–D) are now discussed separately and in greater detail.

It should be realized that while the description of the following procedures is made in the context of presently preferred embodiments, various changes and modifications can be made to these embodiments, and these changes and modifications will still fall within the scope of the teaching of this invention.

(A) For the case of a call to/from another user within the WLLSA 1107, outbound calls are routed from the user handset 1103 to the Subscriber Unit 1102 where the traffic is digitized, modulated, and sent over, by example, the Radio Frequency (RF) link 1104 to the WLLBS 1105. The call is processed by demodulating the call, and is sent to a switch within the WLLBS 1105. The switch makes a decision for routing the call based on information (a dialed telephone number) that is transmitted over the RF link 1104 from the user. In this case the user's call is routed to another user within the WLLSA 1107 based on the routing information. The call is then modulated onto an RF carrier and transmitted by the WLLBS 1105 over link 1104 to another Subscriber Unit 1102. Generally, the switch makes a decision of routing based on a telephone number dialed, and perhaps a subscriber ID number. In any case the switch knows, after consulting the number or a part of the number, that the call is a local call within the WLLSA 1107, and does not connect the call to the Virtual Gateway 1108. After receiving the call at the called Subscriber Unit 1102 the associated user terminal handset 1103 is alerted and, if desired, the called party answers and a traffic circuit is completed.

Many calls of this nature are possible, since the WLLBS 1105 can be configured to handle up to 100 or more simultaneous calls. This number of circuits can support populations of 2000–5000 users, depending on calling patterns. The range of the terrestrial local loop RF system may limit the area covered to about 10 km in radius, or to about 315 square kilometers.

Inbound calls to the user terminal handset 1103 are accomplished in the same manner. In this case the WLLBS 1105 only needs to recognize that a user is calling another of the WLLSA subscriber units. A small PBX device is all that is necessary for this purpose. The PBX device may use digital switching, interrogating a database held in memory to perform the addressing function for outgoing or incoming calls.

Figure 7A:
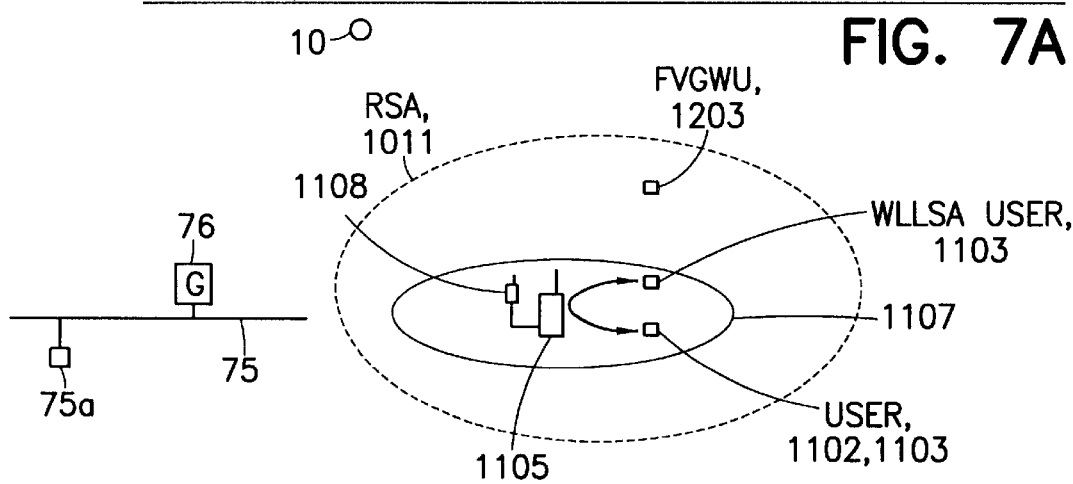
FIGS. 7A–14B illustrate a plurality of different calling methods that can be performed in the enhanced WLL system of FIG. 6, for the various cases (A–H) shown in FIG. 5.
Figure 7B:
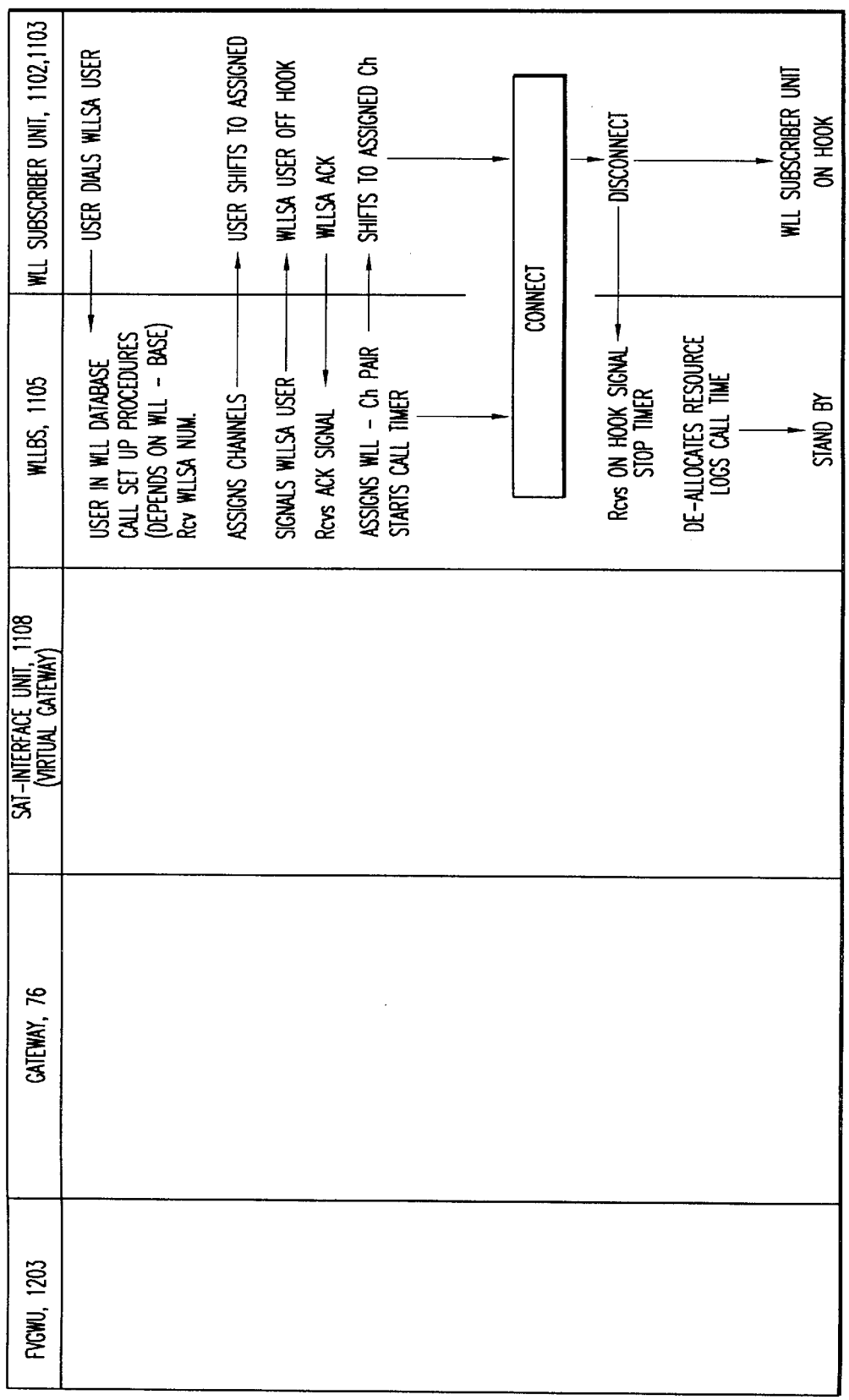

The signalling to set up a call is shown in FIGS. 7A and 7B for both inbound and outbound calls from one WLLSA subscriber 1103 to another WLLSA subscriber 1103. The details of the call signalling may be different for different WLL systems, but in general the processes will be similar to shown in FIG. 7B. As is illustrated, a user of handset 1103 dials another WLLSA user handset 1103 in the same WLLSA 1107. The calling user unit signals the WLLBS 1105 which verifies that the user is in the WLLBS database 1105a and is authentic. The WLLBS 1105 then initiates the call setup procedures. The WLLBS 1105 receives the dialed number, assigns channels and starts a call timer. The calling WLL user unit and the called WLL user unit are signaled by the WLLBS 1105 notifying them of the assigned channel pair (transmit and receive) for use. The user units then shift to the assigned channel pair and communications traffic begins. Communication continues until one user unit disconnects. At this time the WLLBS 1105 receives an on-hook signal, stops the call timer, and de-allocates the WLL system resources used to complete the call, such as by de-allocating the assigned channel pair. The user units return to standby, as does the WLLBS 1105 (assuming that it is not in the process of handling other calls).

At this point it will be instructive to discuss call billing. There are two alternates for call billing. The first is satellite-based and the second is WLL-based.

Considering first the satellite-based billing case, after communications setup is completed a call timer is initiated on the satellite 10 to time the duration of the call. The elapsed call time is logged at call termination. After the call is terminated, the call time and the identification of the caller 1203 is (or may be) concatenated with other call billing and sent over link 1305 to the gateway 76 for processing. Alternatively, it may be sent over link 1300 to the Virtual Gateway 1108 and thence to the WLLBS 1105 for billing.

In the second, WLL-based billing case, local calling within the WLLSA 1107 to and from user 1203 in the Regional Service Area 1101 may be metered within the WLLBS 1105. This leaves only those calls outside of the WLLSA 1107, i.e., those to the PSTN 75, to be metered, again either on the satellite 10 or on the ground at the gateway 76.

(B) For the case of a call to/from another user outside the WLLSA 1107, but within a Regional Service Area 1011, referred to hereinafter simply as a Fixed Virtual Gateway User (FVGWU) 1203, an outbound call (traffic) to the FVGWU 1203 from the WLL SU 1102 is digitized, modulated, and sent over RF link 1104 (see FIG. 1D) to the WLLBS 1105. Note that the handset 1103 and the Subscriber Unit 1102 may be a single unit, and may be collectively designated hereinafter simply as a WLL Subscriber Unit (SU) 1103. The call is routed by the Sat-Interface Unit or Virtual Gateway 1108 over satellite link 1208, more particularly link 1302 (FIG. 6), to the satellites 10 in view. The signal structure (e.g., super frame) is demodulated sufficiently to determine from which Regional Service Area 1011 the call is originating or, alternatively, is processed as discussed below.

As was previously indicated, the Regional Service Area 1011 is a region on the ground which corresponds to a database of user terminal locations, essentially a map. In one embodiment of this invention, i.e., an on-board satellite processing embodiment, this map is carried within the satellite computer memory. This location may be covered by many beams from different satellites. A Ground Operations Control Center (GOCC) 77 (FIG. 6) knows the condition of the satellites 10, the system resources that are available, and the system time. According to a pre-determined plan, which is pre-loaded into the satellites now serving the area that includes the Regional Service Area 1011, a decision as to which satellite to handle the call can be made collectively, according to information transmitted to the satellites 10 by the GOCC 77, via the gateway 76. The appropriate satellite 10, selected according to the information, accepts the call which is originating within the Regional Service Area 1011. A decision on routing then takes place. The satellite 10 determines that the call is to another user within a certain WLLSA 1107 according to the telephone number dialed. The satellite 10 communicates a call request to WLLSA 1107 via the link 1300 (FIG. 6) to Sat-Link Interface 1108. The call request is received and after demodulation is sent to WLLBS 1105 which completes the call setup over link 1104 to subscriber unit 1102 and thence to handset 1103. In greater detail, the call is processed by demodulating the RF signal within the Virtual Gateway 1108 and is then sent to the switch within the WLLBS 1105. An RF circuit is designated to handle the call, which is then modulated onto an RF carrier and transmitted by the WLLBS 1105 over link 1104 to a WLL Subscriber Unit 1102. Generally, the WLLBS switch makes a decision of routing based on the telephone number dialed, and possibly also on a subscriber ID number. In any case the switch, after consulting the telephone number or a part of the telephone number, knows that the call is a local call within the WLLSA 1107 and does not connect the call to the Virtual Gateway 1108. After receiving the call at the WLL Subscriber Unit 1102 the SU 1102 generates an alerting signal, if desired the called party answers, and a traffic circuit is completed. Many calls of this nature are possible simultaneously, limited only by the capacity of the Virtual Gateway 1108.

The range of the Regional Service Area 1011 local loop RF system is generally very large, and is typically limited only by the viewing area of the satellite 10. In general, there will be many beams on the satellite 10, and the area will be smaller than that seen from the satellite. As was discussed previously, there can be an arbitrary number of Regional Service Areas 1011, covered by many satellite beams.

Inbound calls to the user handset 1103 from the FVGWU 1203 are accomplished in the same manner.

In the case of an outbound call from the FVGWU 1203 outside the WLLSA 1107, but within a Regional Service Area 1011 containing the WLLSA 1107, the satellite 10 need only recognize that the FVGWU 1203 is calling a member of the set of WLLSA subscriber units 1102, and then route the call directly to the Virtual Gateway 1108, and not to the gateway 76. A small PBX device at the WLLBS 1105 is all that is necessary for completing the call. This device may use digital switching, interrogating a database held in memory to perform the addressing function for outbound calls.

For the case of an inbound call from a WLL SU 1102 inside the WLLSA 1107 and directed toward the FVGWU 1203 within a Regional Service Area 1011, the WLLBS 1105 need only recognize that the called party is a member of the set of the terminals within the Regional Service Area 1011, transfer the call setup information to the Virtual Gateway 1108 which in turn communicates to the satellite 10 serving the Regional Service Area 1011 area of the FVGWU 1203. The satellite 10 then routes the call to the proper beam and sets up the call.

Referring now to FIGS. 8A–8D, an embodiment is shown wherein on-board signal processing by the satellite 10 is not required for the case B of a call to another user outside the WLLSA 1107, but within a Regional Service Area 1011.

Figure 8A:
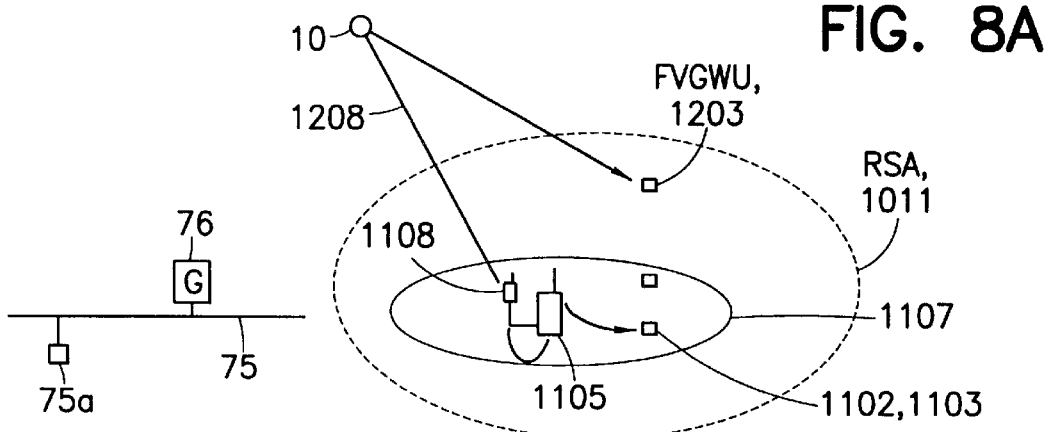
Figure 8C:
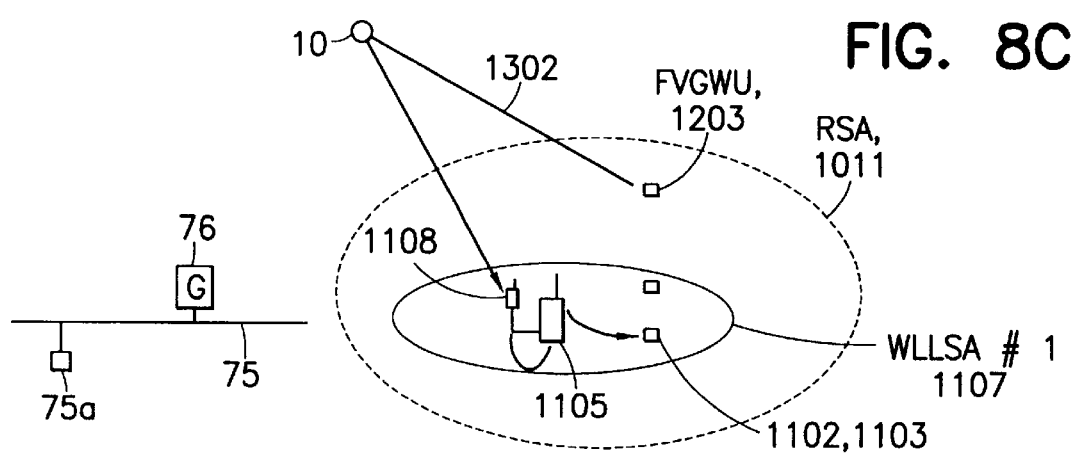
Figure 8B:
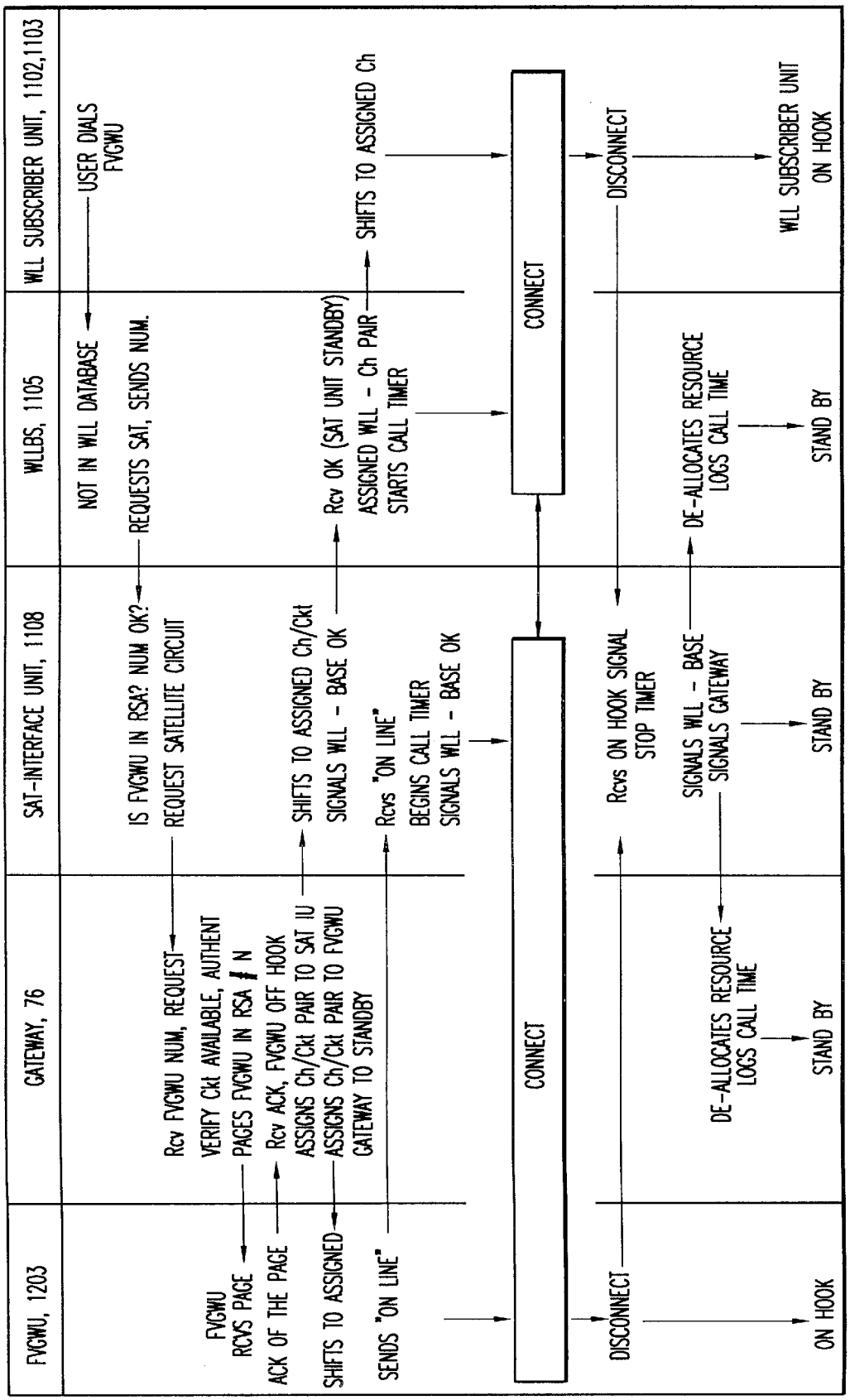

Referring first to FIGS. 8A and 8B for an outbound call from a WLL Subscriber Unit 1103 to the FVGWU 1203, the user of the WLL Subscriber Unit 1103 dials the number of the FVGWU 1203 and thus signals a request for service to the WLLBS 1105. The WLLBS 1105 examines its local WLLBS database 1105a and finds that the number dialed is not associated with the WLLSA 1107. The WLLBS 1105 then signals the Virtual Gateway 1108 requesting service, and passes the dialed number to the Virtual Gateway 1108. The Virtual Gateway 1108 verifies that the called FVGWU 1203 is in the Regional Service Area 1011, signals the gateway 76 via satellite 10 to request satellite service, and transmits the dialed number to the gateway 76. The gateway 76 receives the telephone number of the FVGWU 1203, verifies that circuits are available, and authenticates the user. The gateway 76 then pages the FVGWU 1203 in a RSA (n) via the satellite 10. If operable, the FVGWU 1203 receives the page, acknowledges the page (ACK), and begins preparation to go on line. The gateway 76 receives the ACK, assigns a channel/RF circuit pair to the FVGWU 1203, and signals the FVGWU 1203, which then shifts to the assigned channel and goes to standby waiting for the connection. The gateway 76 also signals the Virtual Gateway 1108, transmits the channel/circuit pair assignment, and goes to standby. The Virtual Gateway 1108 shifts to the assigned channel/circuit and signals the WLLBS 1105 that it is ready to receive. The FVGWU 1203 upon reaching its assigned channel/circuit signals the Virtual Gateway 1108 that it is on-line. The Virtual Gateway 1108 receives the on-line indication, starts the call timer, and goes to standby waiting the connect. The WLLBS 1105, upon receiving the OK ready to receive, assigns a WLL- channel/circuit pair, starts its own call timer, and signals the WLL Subscriber Unit 1103 with the channel assignment. The WLL Subscriber Unit 1103 then shifts to the assigned channel/circuit and begins the connection. All units are then connected and the telephone call traffic begins duplex operation over the assigned channel pairs. Either unit can cause a call termination. The disconnecting unit sends an on-hook message to the Virtual Gateway 1108 (or the WLLBS 1105 which sends a similar message to the Virtual Gateway 1108), and the call timer is stopped. The Virtual Gateway 1108 then signals the WLLBS 1105 and the gateway 76 to release channel/circuit resources. In response, each then logs the call time for future billing purposes, and all units go to standby awaiting the next call.

Figure 8D:
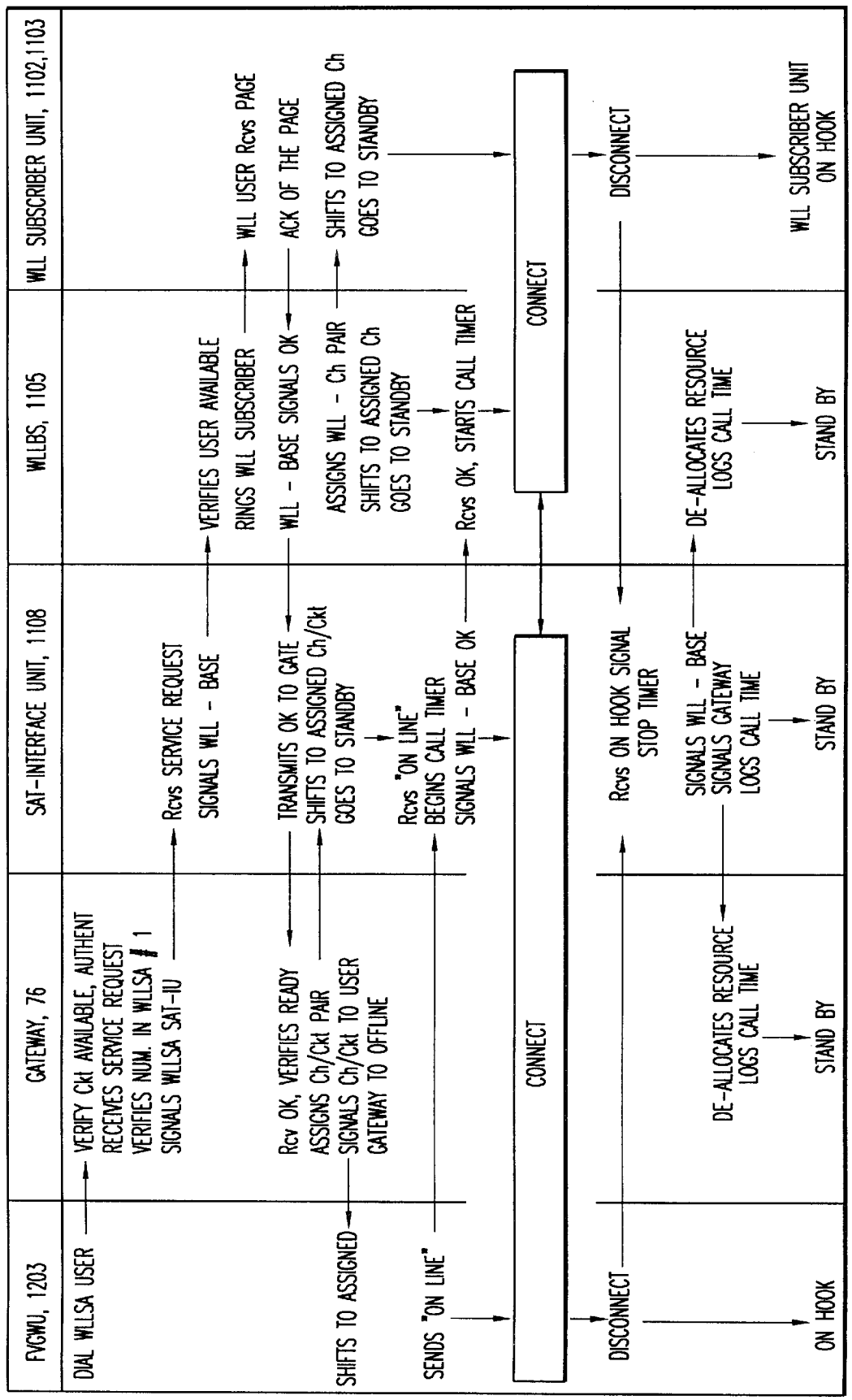

For the case of an inbound call from the FVGWU 1203 to the WLLSA Subscriber Unit 1103, the call is processed in the following manner (FIGS. 8C and 8D). The FVGWU 1203 dials the telephone number of a WLL Subscriber Unit 1103. The gateway 76 verifies that a circuit is available, receives the service request, authenticates the FVGWU 1203, and proceeds to process the call. The gateway 76, upon checking the number dialed by the FVGWU 1203, recognizes from the stored database 76a that the call is not to the PSTN 75, but is for a number located in the WLLSA #1 (or another WLLSA 1107 assigned to the gateway 76). The gateway 76 then signals the WLLSA Virtual Gateway 1108 that an incoming call is requested. The Virtual Gateway 1108 receives the service request and signals the associated WLLBS 1105 to request a service link to the dialed number. The Virtual Gateway 1108 may at this time also set up a temporary number with the gateway 76 for billing purposes. The service request is then received by the WLLBS 1105 which then verifies that the dialed user number telephone is available. If not, the WLLBS 1105 signals the Virtual Gateway 1108, which in turn signals the gateway 76 to indicate to the FVGWU 1203 that the number dialed is not available. If the dialed telephone is available, the WLLBS 1105 signals the WLL Subscriber Unit 1103 to ring. If the WLL Subscriber Unit 1103 is busy, a busy signal is reported back to the FVGWU 1203 and the call is not completed. If the dialed telephone is alerted but is not answered, the alerting is terminated by the FVGWU 1203 going off hook or is timed out by the Virtual Gateway 1108. If the called WLL Subscriber Unit 1103 goes off hook, the WLL Subscriber Unit 1103 sends an ACK message in response to the previously received page sent by the WLLBS 1105. The WLLBS 1105 then signals the receipt of the ACK to the Virtual Gateway 1108 and sets up the WLL loop end of the call. The WLLBS 1105 assigns a frequency channel pair enabling duplex operation, shifts to the assigned channel pair, and goes to stand by. The WLL Subscriber Unit 1103 receives the assigned channel pair, shifts to the assigned channel pair, and goes to stand by. Meanwhile, the Virtual Gateway 1108 transmits the page acknowledgment to the gateway 76. The gateway 76 receives the page acknowledgement, verifies circuit availability, assigns its own (satellite) channel/circuit pair, signals the FVGWU 1203 which channel/circuit pair to use, assigns a (satellite) channel/circuit pair to the Virtual Gateway 1108 (which may not be the same as the channel/circuit pair of the FVGWU 1203), and then goes to standby until signaled that the assigned channel/circuit pair(s) are no longer needed. The Virtual Gateway 1108 shifts to the assigned channel/circuit pair and goes to standby. The FVGWU 1203, after shifting to the assigned channel/circuit pair sends an "on line" message to the Virtual Gateway 1108 via satellite 10, which then signals all involved units to go from the standby state to the connect state (this step may be avoided). The Virtual Gateway 1108 then signals the WLLBS 1105 and starts a call timer. The WLLBS 1105 may also start its call timer (if desired) and the call proceeds. Either unit end can cause a call termination. The disconnecting unit sends an on hook message to the Virtual Gateway 1108 (or the WLLBS 1105 which sends a similar message to the Virtual Gateway 1108), all active call timers are stopped, and the Virtual Gateway 1108 signals the WLLBS 1105 and the gateway 76 to release channel/circuit resources. Each unit then logs the call time for future billing purposes, and all units go to standby awaiting the next call.

(C) Turning now to the case of a call to/from the PSTN 75 by a WLL subscriber within a WLLSA terrestrial system, outbound calls from the WLLSA subscriber are routed from the handset 1103 to the Subscriber Unit 1102 where the traffic is digitized, modulated, and sent over the Radio Frequency (RF) link 1104 to the WLLBS 1105. The call is then processed by demodulating the received RF signal and is sent to the switch within the WLLBS 1105. The switch makes a decision for routing based on information a transmitted over the RF link from the user. In this case the user's call is routed to the PSTN 75 over the satellite RF link 1300 and feeder link 1305 by connecting to the Virtual Gateway 1108. This process is accomplished by first signalling a request for service from the WLLBS 1105 unit to the Virtual Gateway 1108. The Virtual Gateway 1108 in turn signals the gateway 76 over links 1300 and 1305 requesting a service link. The request is received by the gateway 76 and processed, signalling the PSTN 75 to set up a call to the called party. In parallel, the Virtual Gateway 1108 and the gateway 76 shift to a traffic channel from the access channel used to make the call request and begin final call setup. Upon the called party going off hook, communication begins. Call timing and billing is accomplished by the gateway, or alternatively by the WLLBS 1105.

In this case the WLLBS 1105 need only recognize that the called party is the PSTN terminal 75*a*, and not another WLLSA Subscriber Unit 1102 or the FVGWU 1203.

It should be noted that some or all of the gateway-executed functions may be done on-board the satellite 10 in the on-board processing embodiment.

Inbound calls to the WLLSA Subscriber Unit 1102 can originate at any PSTN terminal 75*a* anywhere in the world. The caller dials the number of the WLL handset 1103 within the WLLSA 1107. The PSTN switching system routes the call to the gateway 76 that services the Regional Service Area 1011 that contains the WLLSA 1107 wherein the called WLL Subscriber Unit 1102 is located. The database 76*a* of the gateway 76 contains information for specifying that the called WLL Subscriber Unit 1102 can be reached through a particular WLLBS 1105 associated with a particular Regional Service Area 1011. The gateway 76 then searches the database 76*a* to locate an appropriate Virtual Gateway 1108. An assignment of a temporary telephone number is made by the gateway 76 and is associated with the incoming call for billing purposes. The selected Virtual Gateway 1108 is then signalled to pass the called number (not the temporary number) to the WLLBS 1105 which processes the call request, and then signals the called WLL Subscriber Unit 1102 over the RF link 1104. In response, the associated handset 1103 is alerted. Upon the handset 1103 going off hook, or in parallel with the alerting process, a link is established on a free channel of RF link 1104, which may or may not be the same RF link used previously for signalling the WLL Subscriber Unit 1102, and the call proceeds. Both the WLLBS 1105 and the gateway 76 can monitor the call time, and billing can be done from either.

In the foregoing example the database 76*a* of the gateway 76 is required to store the telephone numbers of the WLLSA Subscriber Units 1102 that are assigned to the Regional Service Area 1011 and the WLLSA 1107.

As before, it should be noted that some or all of the gateway-executed functions may be done on-board the satellite 10 in the on-board processing embodiment.

Figure 9A:
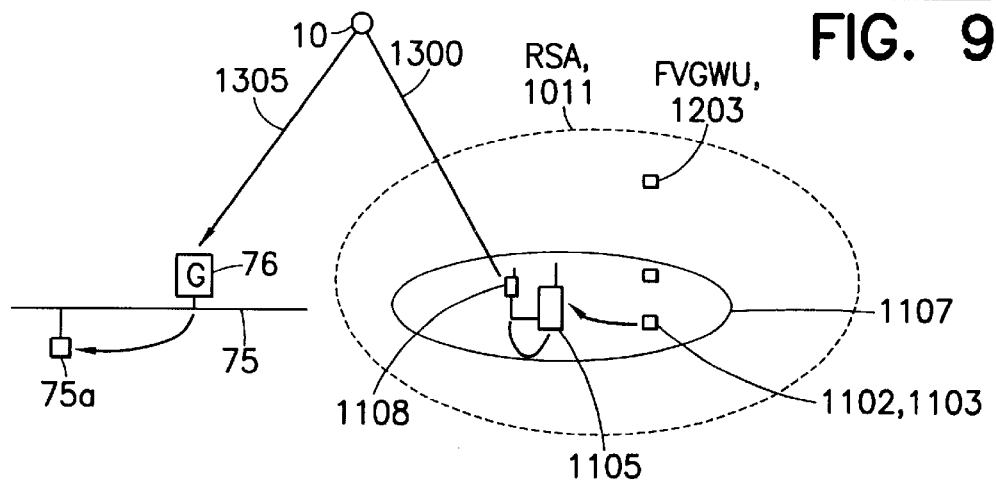
Figure 9C:
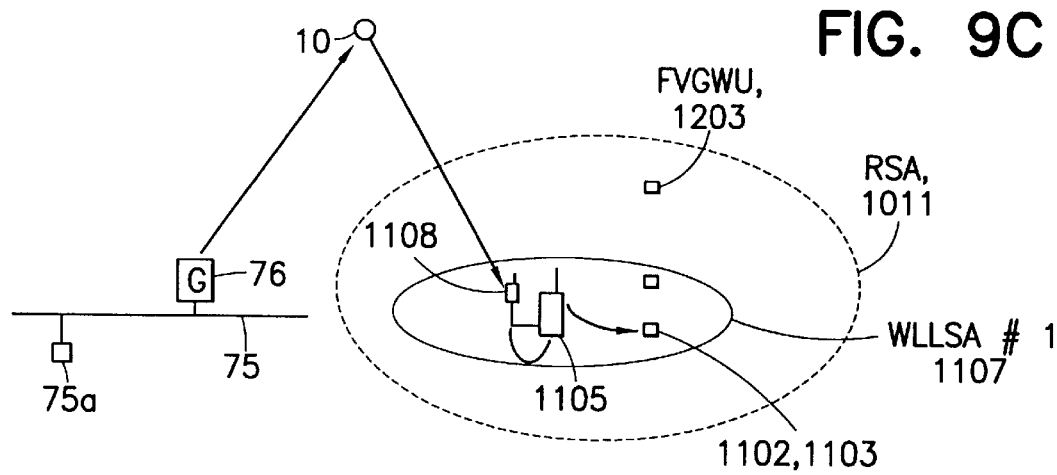
Figure 9B:
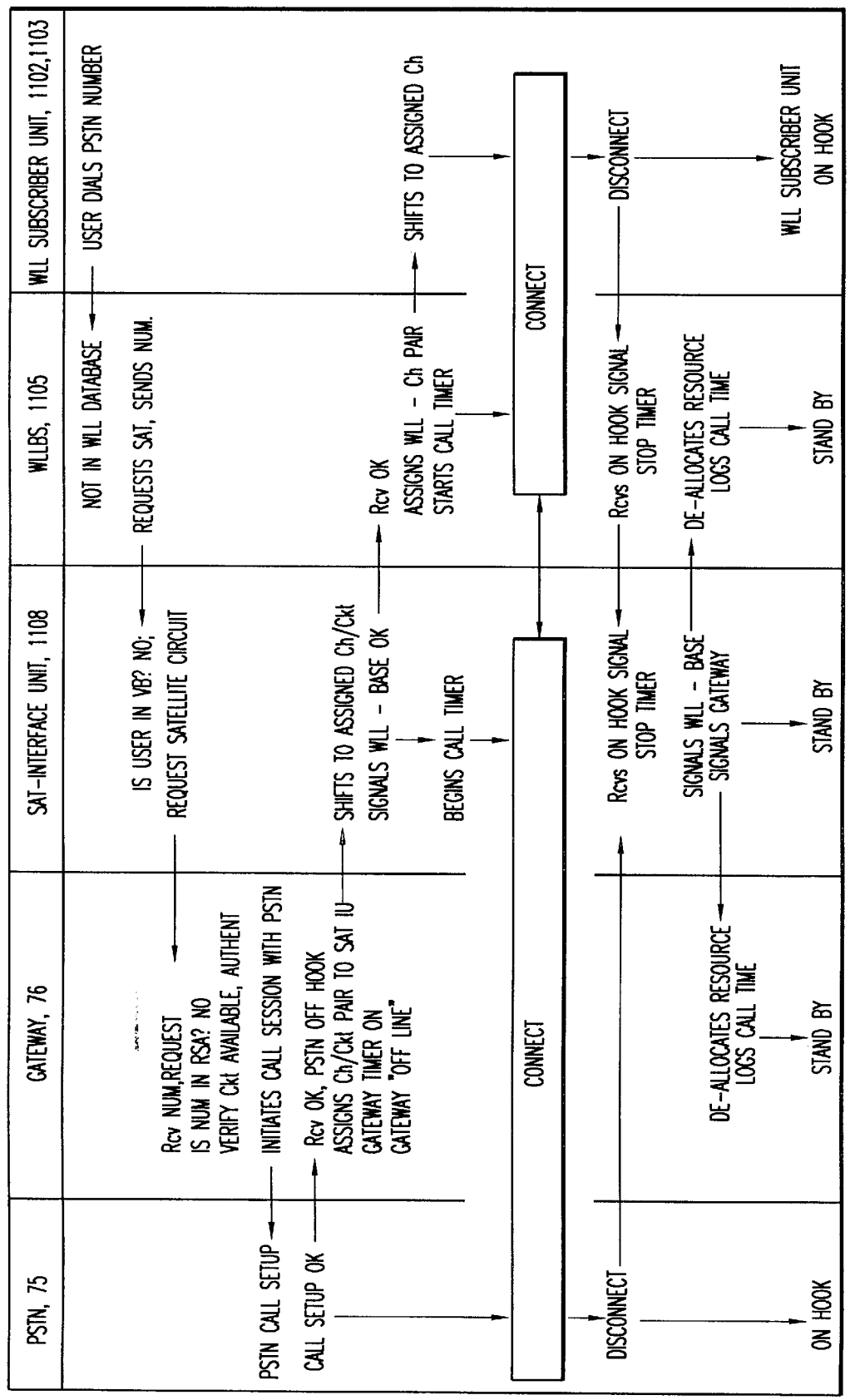

Referring now to FIGS. 9A and 9B for a non on-board satellite signal processing embodiment, it is first noted that an alternative to on-board satellite signal processing utilizes a conventional "bent pipe" satellite repeater with a combination of the Virtual Gateway 1108 and gateway 76 to place calls to and from the PSTN 75. A call made from a WLLSA subscriber unit 1102 to the PSTN terminal 75*a* is processed in the following manner. The WLL subscriber goes off hook and dials the telephone number of the PSTN terminal 75*a*. The WLLBS 1105 receives the request for service over an access channel of the RF link 1104, checks it database 1105*a*, and determines that the call is not a local call to another WLL Subscriber Unit 1102 within the WLLSA 1107 (see FIGS. 7A and 7B). The WLLBS 1105 originates a request for a satellite circuit and forwards the request to the Virtual Gateway 1108 along with the called telephone number. The Virtual Gateway 1108 first checks to see if the telephone number is associated with one of the user terminals within the Regional Service Area 1011 (e.g., one of the FVGWUs 1203, as in FIGS. 8A and 8B). Since this is not the case for this example, the Virtual Gateway 1108 formulates a PSTN or other WLLSA service request and forwards the service request and the dialled telephone number to the gateway 76 via the satellite 10. The gateway 76 receives the request for service and the telephone number, verifies the availability of circuits to handle the call, authenticates the requester, and initiates a call request to the PSTN 75. The call setup follows established PSTN 75 procedures. Upon a successful PSTN 75 connection, the gateway 76 receives an indication that the PSTN terminal 75*a* is off hook, assigns a channel/circuit pair to the Virtual Gateway 1108, turns on the gateway 76 call timer, and goes off line, waiting for a signal from the Virtual Gateway 1108 that the call is completed. The Virtual Gateway 1108 receives the indication from the gateway 76 that the PSTN terminal 75*a* is off hook, shifts to the assigned channel/circuit pair, and signals the WLLBS 1105 that it is ready to accept traffic. The Virtual Gateway 1108 also initiates its call timer. The WLLBS 1105 assigns a WLL frequency channel pair on RF link 1104 and optionally starts its own call timer. The WLL Subscriber Unit 1102 shifts to the assigned WLL frequency channel pair and all units begin call traffic. Either unit end can cause a call termination. The disconnecting unit sends an on hook message to the Virtual Gateway 1108 (or to the WLLBS 1105 which sends a similar message to the Virtual Gateway 1108), and the call timer(s) is stopped. The Virtual Gateway 1108 signals the WLLBS 1105 and the gateway 76 to release the assigned channel/circuit resources, each unit then logs the call time for future billing purposes, and all units go to standby awaiting the next call.

Figure 9D:
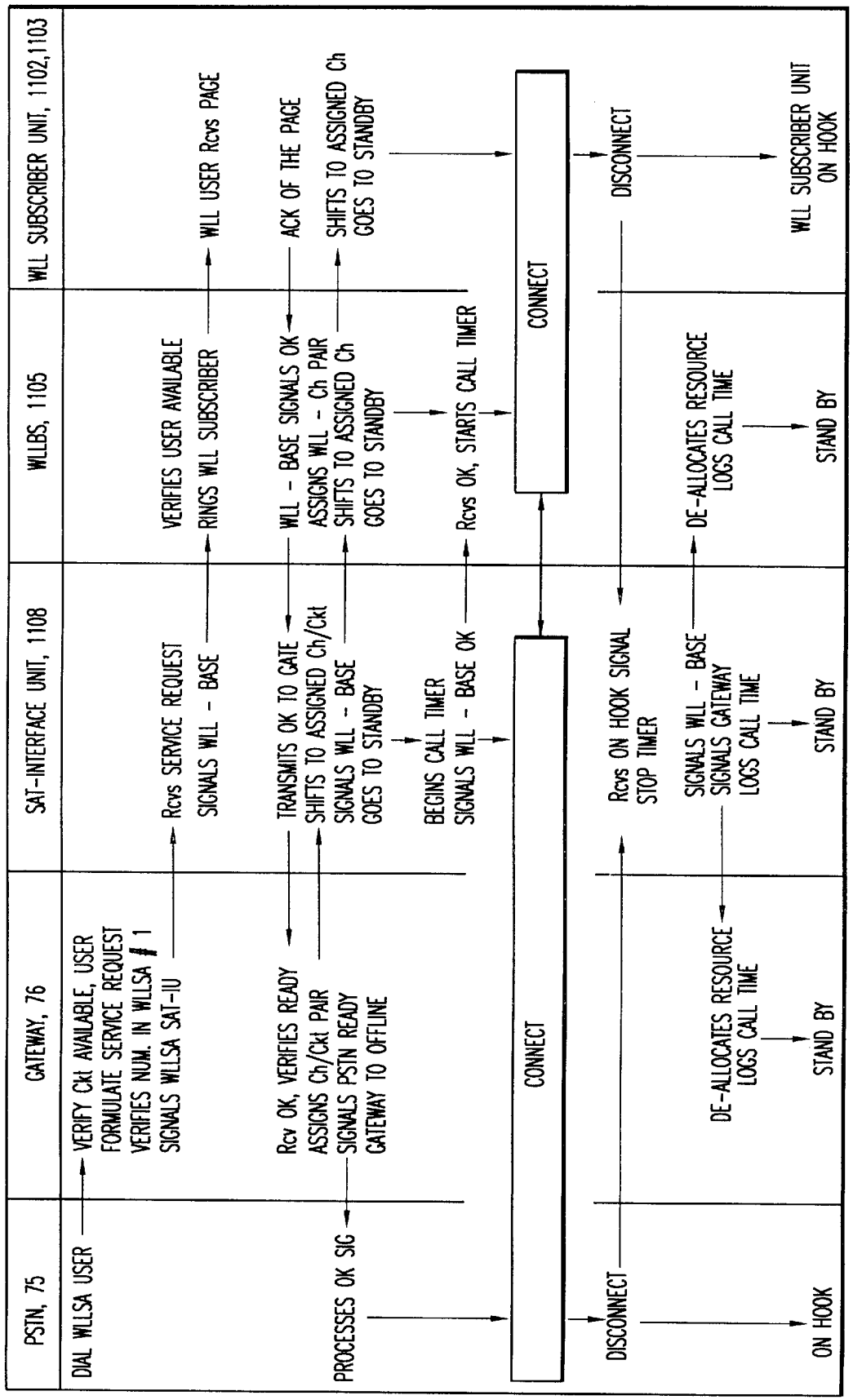

Discussed now is the case of an inbound call to a WLL Subscriber Unit 1102 from the PSTN 75. Referring to FIGS. 9C and 9D, a call made to a WLLSA Subscriber Unit 1102 from the PSTN 75 is processed in the following manner. A PSTN 75 caller at terminal 75*a* dials a telephone number assigned to a WLL Subscriber Unit 1102. This number is known by the PSTN 75 to be associated with the gateway 76. The gateway 76 is notified and verifies that there are circuits available, verifies that the number is in WLLSA #1 (or the dialed WLLSA), formulates a service request, and signals the appropriate WLLSA Virtual Gateway 1108 associated with the dialed WLLSA Subscriber Unit 1102. The Virtual Gateway 1108 receives the service request and signals the WLLBS 1105 associated with the dialed number. The Virtual Gateway 1108 signals the WLLBS 1105 that service is requested. The WLLBS 1105 verifies that the SU 1102 is available and pages the WLL SU 1102. The WLL Subscriber Unit 1102 receives the page and, if the user goes off hook, sends an ACK of the page to the WLLBS 1105. The WLLBS 1105 signals the Virtual Gateway 1108 and assigns a WLL RF channel pair to the WLL Subscriber Unit 1102. The Virtual Gateway 1108 receives the WLLBS signal and transmits an acknowledgement to the gateway 76. The WLL Subscriber Unit 1102 receives the transmitted channel pair assignment from the WLLBS 1105, shifts to the assigned frequencies, and goes to standby. The WLLBS 1105 then also shifts to the assigned frequencies. The gateway 76 receives the acknowledgement from the Virtual Gateway 1108, verifies that it is ready, assigns a satellite channel/circuit pair to the Virtual Gateway 1108, signals the PSTN 75 that it is ready, and then goes offline waiting for a signal from the Virtual Gateway 1108 that the call has ended. The PSTN 75 then processes the ready indication from the gateway 76 and connects the terminal 75*a*. The Virtual Gateway 1108 shifts to the assigned satellite channel/circuit pair, signals its readiness to the WLLBS 1105, starts its call timer, and goes to standby. The WLLBS 1105 receives the ready signal, optionally starts its own call timer, the call connection is completed, and traffic is passed through the WLLBS 1105. Either unit end can cause a call termination. The disconnecting unit sends an on hook message to the Virtual Gateway 1108 (or to the WLLBS 1105 which sends a similar message to the Virtual Gateway 1108), all call timers are stopped, and the Virtual Gateway 1108 signals the WLLBS 1105 and the gateway 76 to release the assigned channel/circuit resources. Each unit then logs the call time for future billing purposes, and all units go to standby awaiting the next call.

(D) A discussion is now made of the case of calls to/from the fixed telephone installations 1201 within the Regional Service Area 1011 (e.g., the FVGWU 1203) that are not connected to the PSTN 75 or within the WLLSA 1107. Outbound calls from the FVGWU 1201 are routed from the user handset 1203 to the Subscriber Unit 1202 where the traffic is digitized, modulated, and sent over an access channel on an RF link (i.e., satellite RF link 1300 and feeder link 1305) to the gateway 76. The call is then processed by demodulating the RF signal, and the called number is sent to a switch within the terrestrial system PSTN 75 which makes a decision for routing based on information transmitted over the RF link from the FVGWU 1203. The gateway 76 assigns a traffic channel/circuit, and notifies the FVGWU Subscriber Unit 1202 of the traffic channel/circuit to be used, where upon the FVGWU 1203 and the gateway 76 shift to the assigned traffic channel from the access channel and begin the final call setup. The communication begins upon the called PSTN terminal 75*a* going off hook. Call timing and billing in this case is done by the gateway 76.

In this case the gateway 76 only needs to recognize that the call is to the PSTN 75, and not another WLLSA subscriber or a Regional Service Area 1011 subscriber.

Inbound calls to the FVGWU 1203 may originate at any PSTN terminal 75*a* in the world. The caller dials the telephone number of the FVGWU handset 1203 and the PSTN 75 switching system routes the call to the gateway 76 serving the Regional Service Area 1011 that contains the FVGWU 1203 The gateway 76 knows from its data base that the FVGWU 1203 can be reached at a particular Regional Service Area 1011. A page is sent to the FVGWU 1203 over an access channel and the FVGWU 1203 is alerted. Upon going off hook (or in parallel with the alerting process) a traffic link is set up on an available satellite channel/circuit and the call proceeds. The gateway 76 in this case monitors the elapsed call time with its call timer.

In this case the gateway 76 has knowledge of the telephone numbers of the FVGWUs 1203 that are assigned to the Regional Service Area 1011.

As before, it should be noted that some or all of the gateway-executed functions may be done on-board the satellite 10 in the on-board processing embodiment.

Figure 10A:
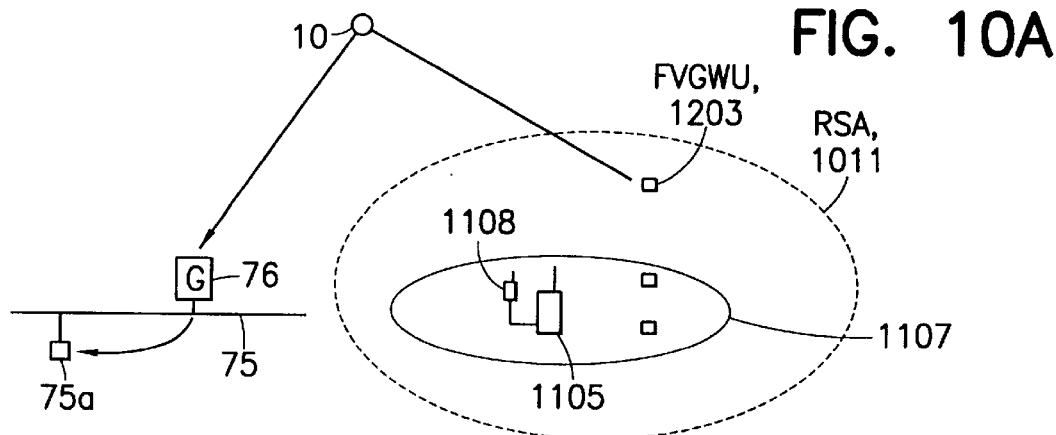
Figure 10B:
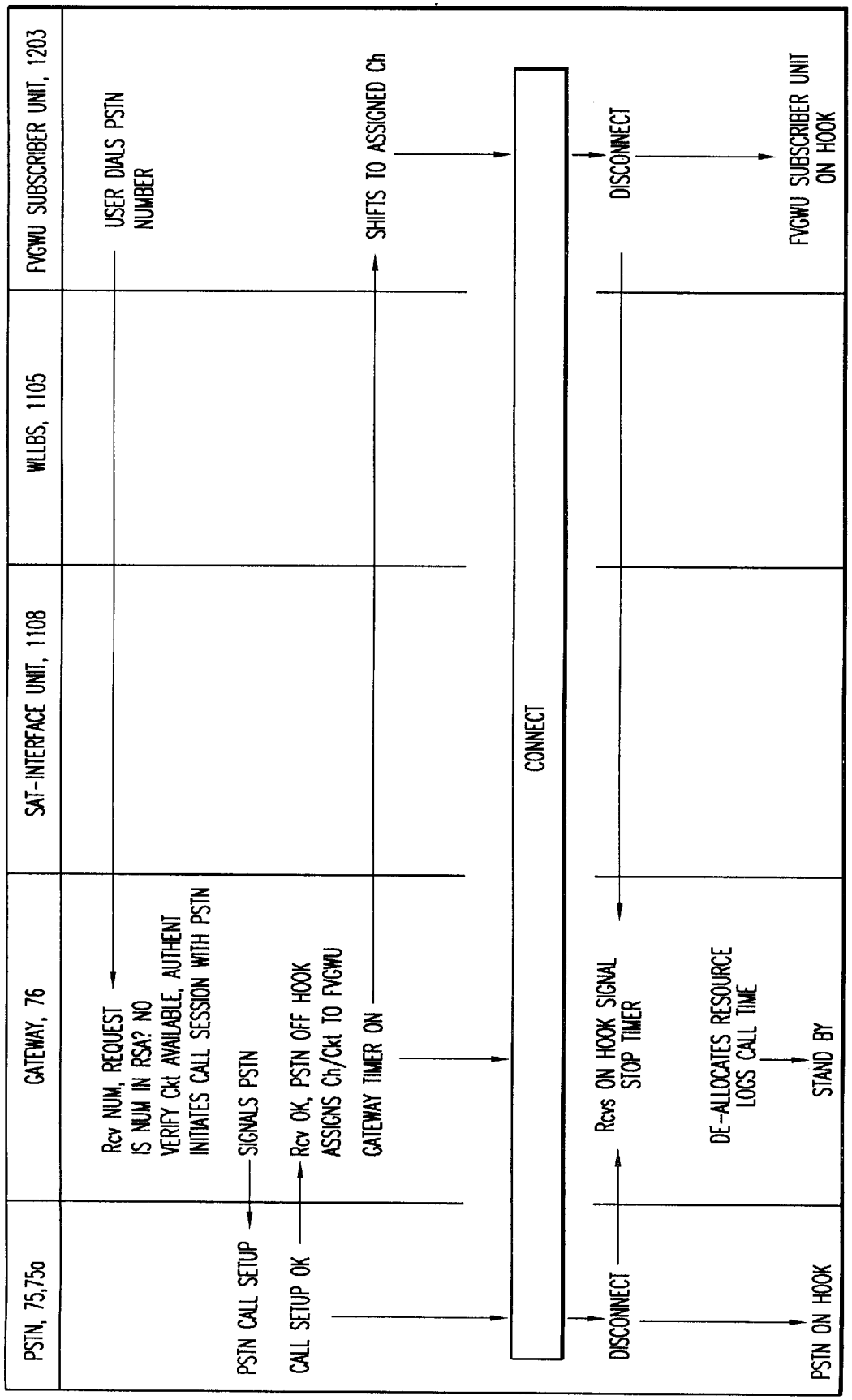

Referring to FIGS. 10A and 10B for the non on-board processing case, and for the case of an outbound call from FVGWU Subscriber Unit 1202 to the PSTN 75, the FVGWU 1203 dials a PSTN 75 number and transmits a request for service to the gateway 76. The gateway 76 receives the number and the request for service and determines if the number is a number within a RSA 1011. If no, the gateway 76 verifies that satellite circuits are available, authenticates the user, and initiates a call session with the PSTN 75 by signaling the request. The PSTN 75 receives a call setup message or messages, and according to its normal procedure initiates a service request. Upon completion, the PSTN 75 signals the gateway 76, which then assigns traffic channel/circuit pairs to the FVGWU 1203 and turns on the gateway 76 call timer. The FVGWU 1203 shifts to the assigned traffic frequencies and connects to the PSTN terminal 75*a* via the gateway 76 and satellite RF links. Either unit end can cause a call termination. The disconnecting unit sends an on hook message to the gateway 76 and the gateway's call timer is stopped. The gateway 76 releases the assigned traffic channel/circuit resources, logs the call time for future billing purposes, and all units go to standby awaiting the next call.

Figure 10C:
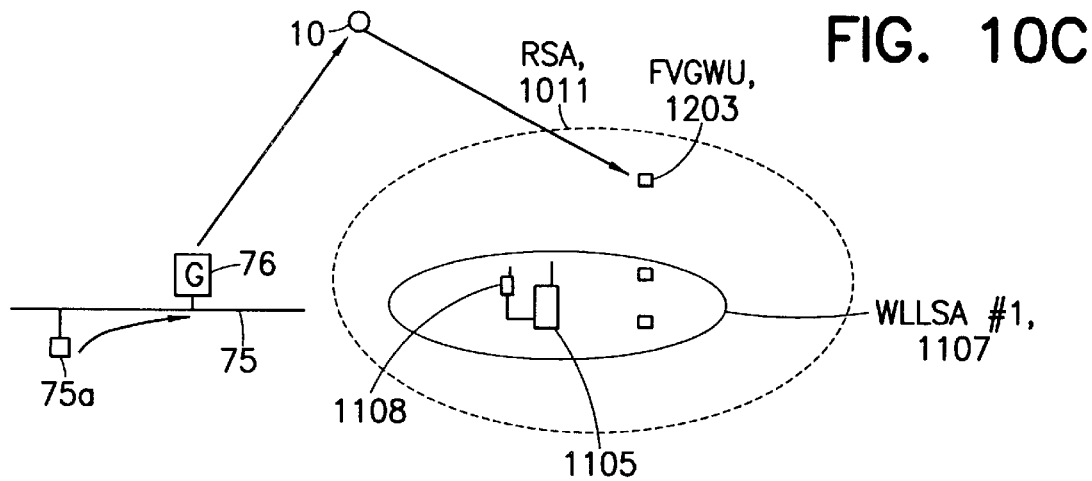
Figure 10D:
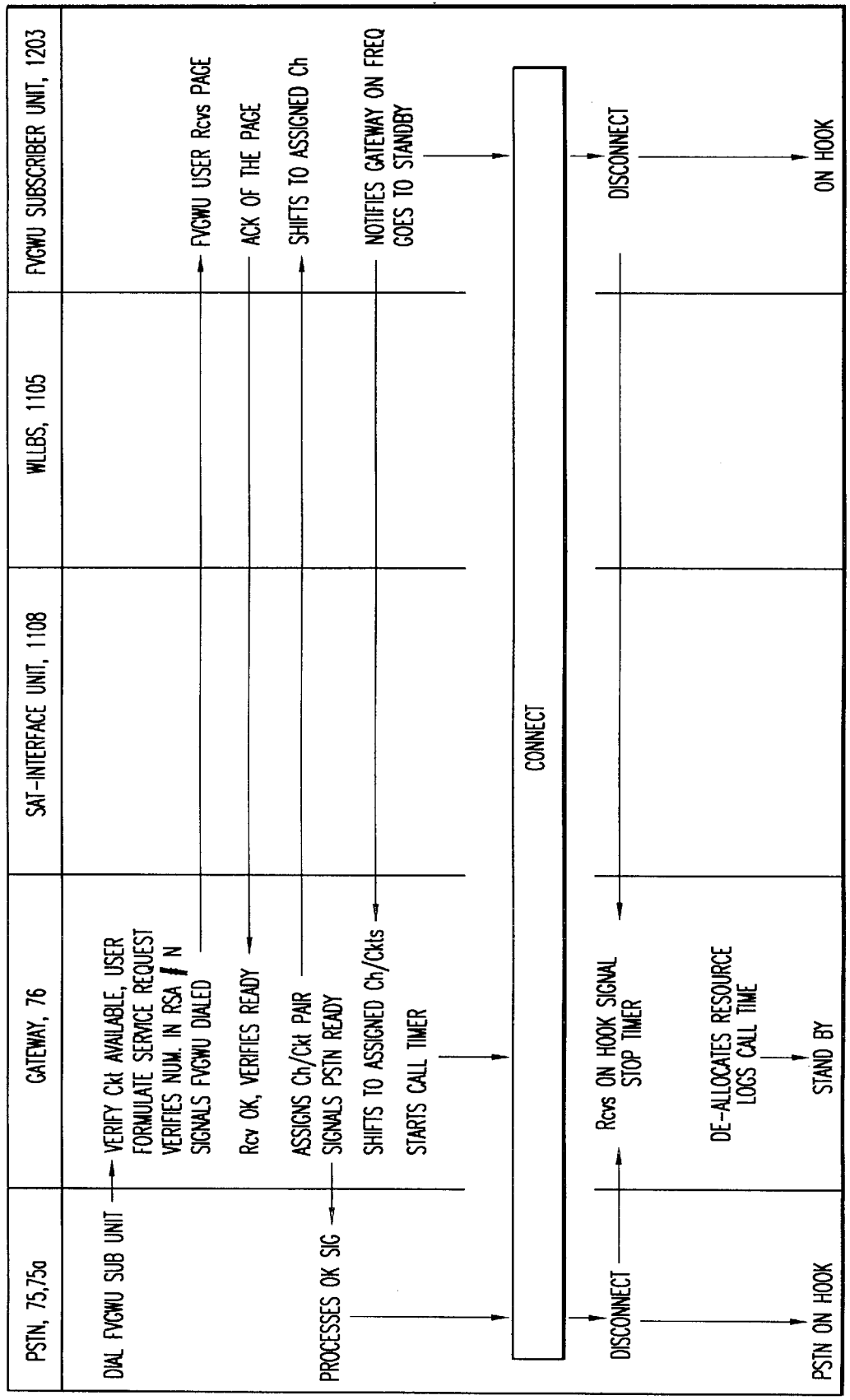

For the case of an inbound call from the PSTN 75 to the FVGWU 1203, and referring to FIGS. 10C and 10D, a call is placed to the FVGWU 1203 from the PSTN terminal 75*a* by dialing the number of the FVGWU 1203. The PSTN 75 routes the call request to the gateway 76 associated with the Regional Service Area 1011 (and if the FVGWU 1203 is a member of the WLLSA community that is associated with the Regional Service Area 1011). The gateway 76 verifies that satellite circuits and the FVGWU 1203 are available, formulates a service request, and verifies that the number dialed is in Regional Service Area 1011 #x (which may be one of many Regional Service Areas 1011 assigned to the gateway 76). The gateway 76 then pages the FVGWU 1203 on an access channel. The FVGWU 1203 receives the page and, assuming that the FVGWU 1203 goes off hook, a response to the page is sent back to the gateway over the access channel. The gateway 76 receives the page, verifies that it is ready, assigns traffic channel/circuit pairs and signals (if necessary) the PSTN 75 that it is ready. The assigned channel/circuit pair is transmitted to the FVGWU 1203 which then shifts to the assigned traffic channel/circuits, notifies the gateway 76, and then goes to standby. The gateway 76 then shifts to the assigned traffic channel/circuits, starts the call timer, all units go to connect, and the call traffic begins. Either unit end can cause a call termination. The disconnecting unit sends an on hook message to the gateway 76 and the call timer is stopped. The gateway 76 releases the assigned channel/circuit resources, logs the call time for future billing purposes, and all units go to standby awaiting the next call.

Having thus described the four basic calling cases that were listed above, it should be realized that various sub-cases and permutations of these four basic cases exist. Several such sub-cases will now be discussed with reference to FIGS. 11A, 11B, 12A–12D, 13A, 13B, 14A and 14B. In the description of these Figures it should again be noted that some or all of the functions executed by the gateway 76 may be done on-board the satellite 10 in the on-board processing embodiment.

A first sub-case is related to calls from a WLLSA 1107 to another WLLSA 1107 within the same Regional Service Area 1011. Outbound calls from a WLLSA subscriber in a first WLLSA 1107 are routed from the user handset 1103 to the Subscriber Unit 1102 where the traffic is digitized, modulated, and sent over the RF link 1104 to the WLLBS 1105. The WLLBS 1105 then operates to verify that the call is not a local call by querying its database 1105a. In one embodiment the call request is passed to the Virtual Gateway 1108 which determines that the call is to a WLL subscriber located in a second WLLSA within the same Regional Service Area 1011. In a second embodiment the Virtual Gateway 1108 forwards the call request and called number to the gateway 76, and the gateway 76 then determines that the call is to a number in a RSA, i.e., to another WLLSA 1107. The gateway 76 notifies the associated Virtual Gateway 1108 to set up a call to one of its associated WLLBSs 1105. The WLLBS 1105 signals over RF link 1104 to the called WLL Subscriber Unit 1102, thereby alerting the handset 1103. In parallel, or optionally in series, the gateway 76 shifts its frequency, and notifies the two Virtual Gateways 1108 associated with the called and the calling WLL Subscriber Units 1102 of the satellite traffic channel/circuits to be used, where upon the Virtual Gateways 1108 shift to the assigned traffic channel from the access channel and begin the final call setup. The communication begins when all units are connected. Timing and billing is done the gateway 76, and/or by one or both of the WLLBS(s) 1105 or the Virtual Gateway(s) 1108.

In this case, the gateway 76 only needs to recognize that the call is to another WLL Subscriber Unit 1102, and not to a PSTN terminal 75a or a FVGWU 1203.

Inbound calls are handled in the same manner as that described above.

Figure 11A:
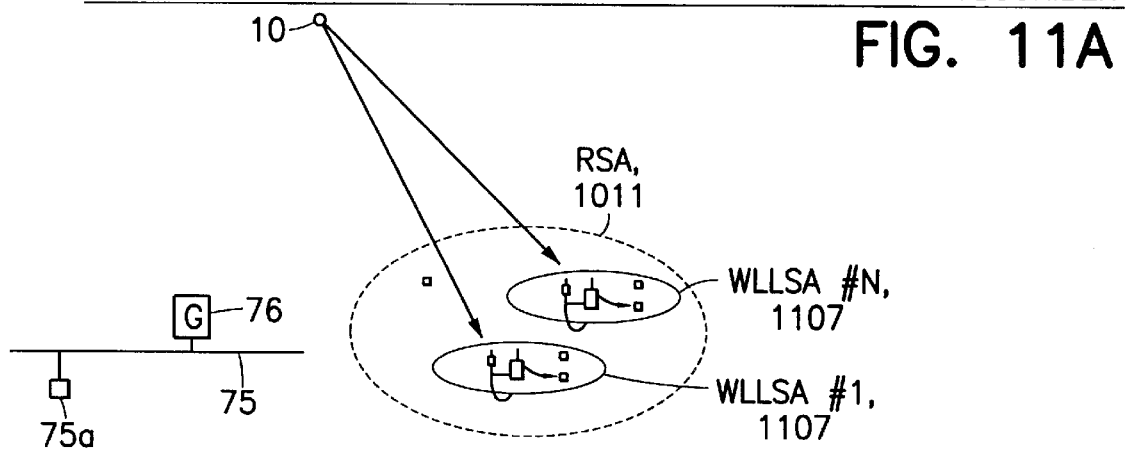
Figure 11B:
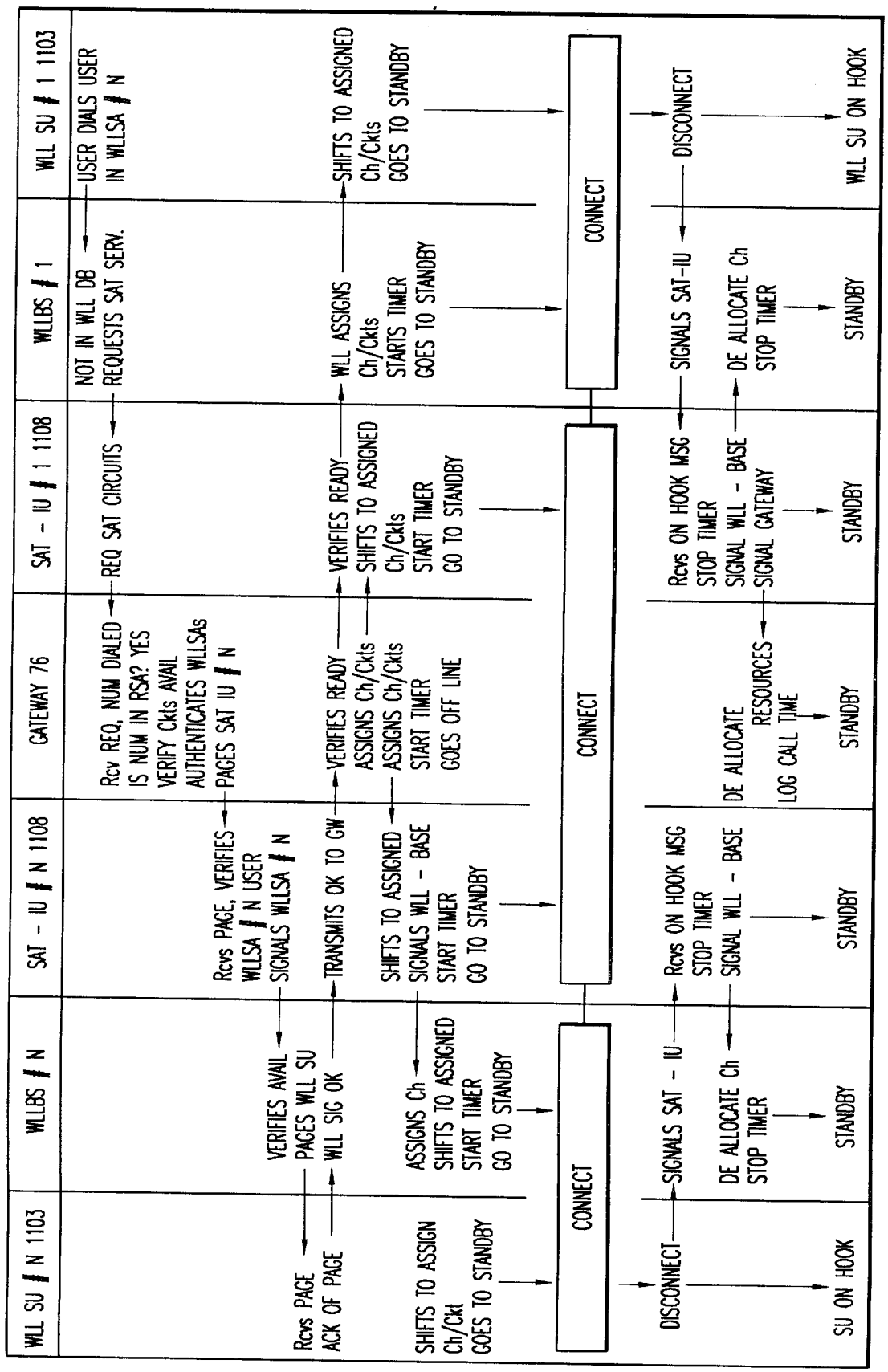

Reference is now made to FIGS. 11A and 11B for the case of an outbound call from one WLLSA Subscriber Unit 1102 to another WLLSA Subscriber Unit 1102 in a different WLLSA 1107, wherein no on-board satellite signal processing occurs. The user in WLLSA #1 dials another WLLSA user in WLLSA #N. The WLLBS #1 1105 receives the service request and, after finding that the number is not in its WLL database 1105a, forms a satellite service request and forwards the service request message to the Virtual Gateway #1 1108 to request satellite service. The Virtual Gateway #1 requests service from the gateway 76 by sending a message over links 1300 and 1305. The gateway 76 receives the service request and the number dialed, verifies that the number is in a Regional Service Area and can be served by the gateway 76, and pages the Virtual Gateway #N 1108 that is associated with the WLLSA #N and the number dialed. The Virtual Gateway #N 1108 receives the page, verifies that the WLLSA #N user is valid, and signals the WLLSA #N WLLBS 1105. The WLLBS #N 1105 verifies that the user is available, and pages the WLL Subscriber Unit 1102. The WLL Subscriber Unit in WLLSA #N receives the page, and when the handset 1103 goes off hook, an ACK of the page is sent to the WLLBS #N 1105. The WLLBS #N 1105 signals a ready response the Virtual Gateway #N 1108, which is in turn forwards the ready response to the gateway 76 over the satellite links. The gateway 76 verifies the ready condition, and signals the Virtual Gateway #1 which in turn signals the WLLBS #1 1105 that it is ready. The WLLBS 1105 #1 assigns a traffic channel/circuit pair to the WLL Subscriber Unit #1 which then shifts to the assigned channel/circuit pair and goes to standby. Meanwhile, the gateway 76 assigns satellite traffic channel/circuits to the Virtual Gateway #N 1108 which then shifts to the assigned channel/circuits and notifies the WLLBS #N 1105 that it is ready, starts its call timer, and goes to standby. The WLLBS #N 1105 assigns traffic channel/circuits to the WLL Subscriber Unit #N, starts its call timer, and goes to standby. The WLL-Subscriber Unit #N 1102 receives the assigned channel/circuits, shifts to the assigned channel/circuits, and goes to standby. All units then connect and traffic begins. Either unit end can cause a call termination. The disconnecting unit sends an on hook message to the WLLBS 1105 associated with the WLL-Subscriber Unit that is terminating. The WLLBS 1105 then signals the associated Virtual Gateway 1108. The Virtual Gateway 1108 receives the on hook message, stops the call timer, and signals the associated WLLBS 1105. The WLLBS 1105 deallocates the assigned WLL resources, stops its call timer, and goes to standby. The WLLBS #1 1105, which had originally initiated the call and requested service, signals the gateway 76 that the call has ended, the call timer is stopped, and then goes to standby. The gateway 76 receives the call termination message, releases the assigned satellite channel/circuit resources, logs the call time for future billing purposes, and goes to standby awaiting the next call.

A second sub-case is related to calls from a WLLSA 1107 to a FVGWU 1203 within the same or a different Regional Service Area 1011. Outbound calls from a WLL handset 1103 are routed to the WLL Subscriber Unit 1102 where the traffic is digitized, modulated, and sent over the RF link 1104 to the local WLLBS 1105. The WLLBS 1105 operates to verify that the call is not a local call by querying its database 1105a. The call is then passed to the Virtual Gateway 1108 which determines that the call is toward a user in the same or another Regional Service Area, but not a WLLSA user. This step may be avoided by allowing the gateway 76 to recognize that the call is toward another user, and in this case the Virtual Gateway 1108 passes the service request and the number dialed to the gateway 76 over links 1300 and 1305. The service request is received by the gateway 76 and determined to be to a FVGWU 1203 in the same or another Regional Service Area 1011. The gateway 76, using the satellite links, pages the FVGWU 1203 to set up the call, and notifies the FVGWU 1203 of the assigned traffic channel frequencies. In parallel, or optionally in series, the gateway 76 shifts its frequencies to the assigned traffic frequencies, and the communication begins when all units are connected. Call timing and billing is performed by the gateway 76, or alternatively by the WLLBS 1105 or the Virtual Gateway 1108, or by all of these units.

In this case, the gateway 76 only needs to recognize that the call is to a FVGWU 1203, and not a PSTN 75 or a WLLSA user.

Inbound calls are handled in the same manner with the FVGWU 1203 requesting a satellite circuit, the gateway 76 requesting a certain Virtual Gateway 1108 to handle the call, based on information stored in its database 76a, and notifying the appropriate WLLSA to alert the called WLL Subscriber Unit 1102.

Figure 12A:
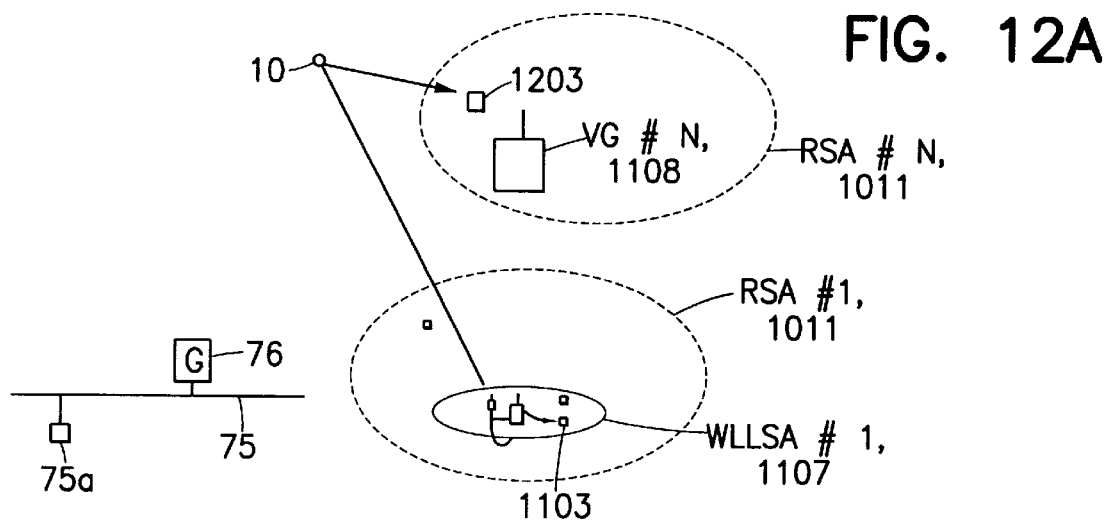
Figure 12B:
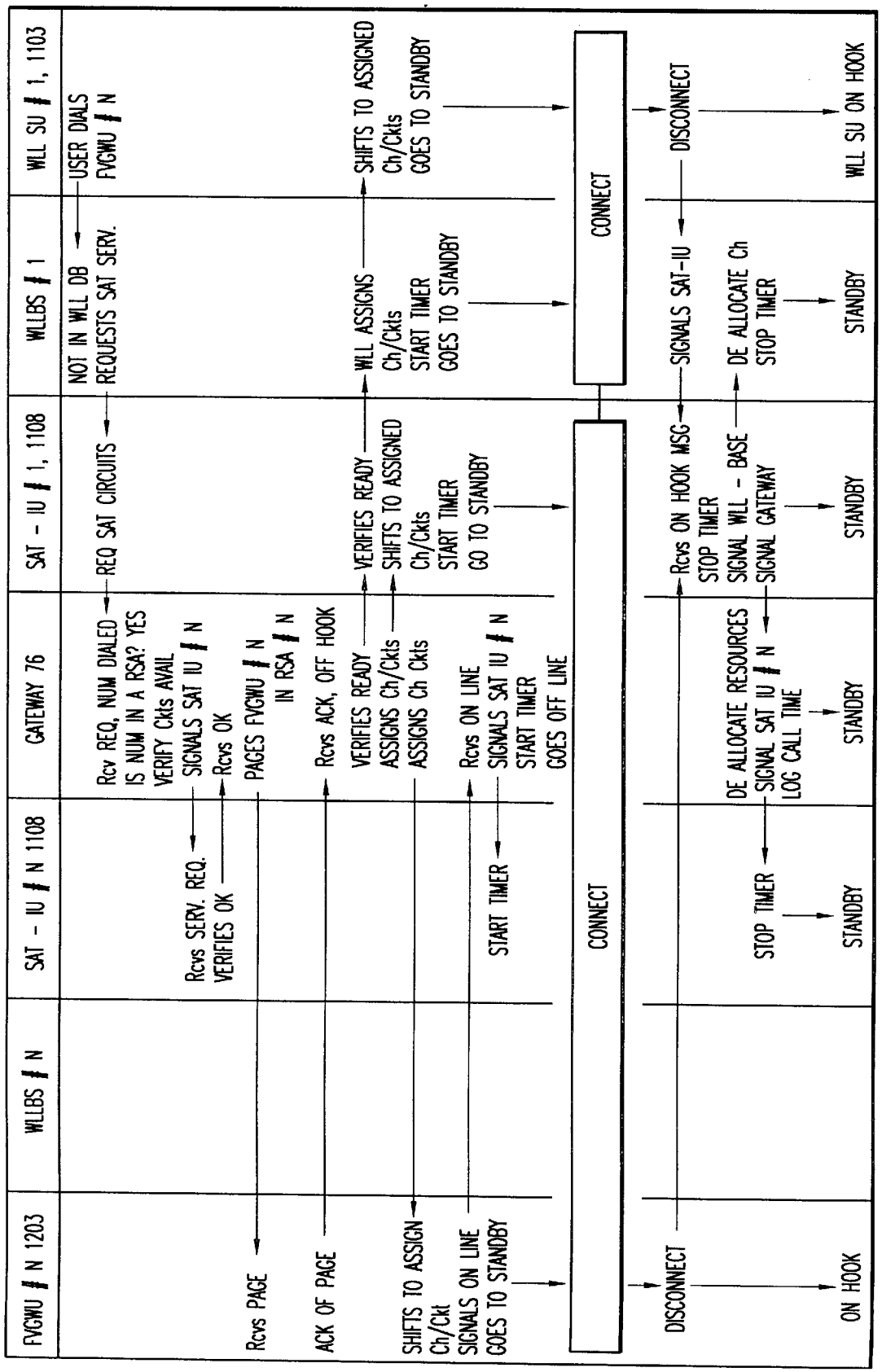

For the non on-board satellite processing case, and referring to FIGS. 12A and 12B, a call from a WLL Subscriber Unit 1203 in WLLSA #1 is made to the FVGWU 1203 in RSA #N. It should be noted that the call processing may be the same as that shown in FIG. 8B, but the following example is employed to illustrate the use of the Virtual Gateway 1108 as a verification and billing tool, as well as a virtual gateway. The process proceeds in basically the same manner as in FIG. 8B, but departs from it after the gateway 76 takes control. In this procedure it can be seen that the gateway 76 queries Virtual Gateway #N 1108 in Regional Service Area #N, which verifies its operability and availability, before paging the dialed FVGWU 1203 in RSA #N. The procedure then resumes as before until the FVGWU 1203 signals "on line" to the gateway 76, upon which the gateway 76 signals the Virtual Gateway #N 1108 to start its call timer, just prior to going offline. After the communication is terminated, the procedure is the same again until the point at which the gateway 76 has deallocated the satellite resources, upon which the gateway 76 notifies the Virtual Gateway #N 1108 to stop its call timer. In this case it can be seen that the Virtual Gateway #N is used for timing the duration of the call and for billing purposes, but is not actively involved in routing the traffic to the FVGWU 1203.

Figure 12C:
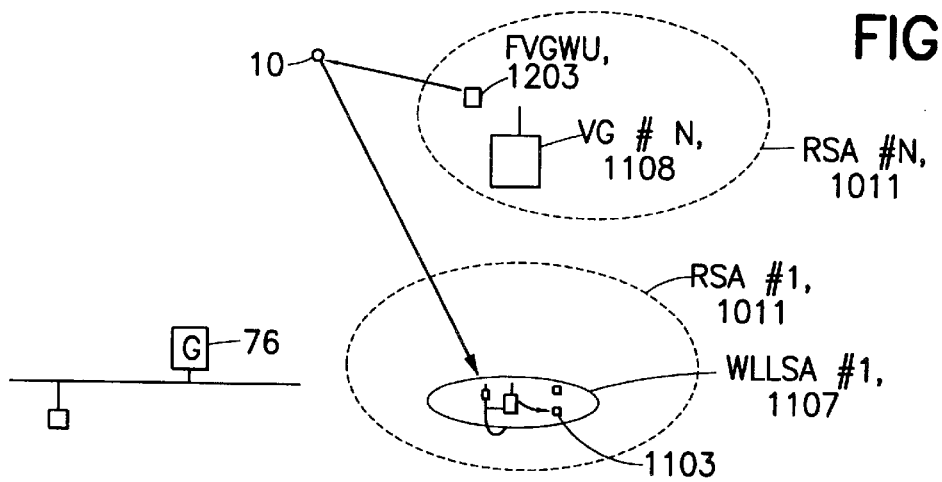
Figure 12D:
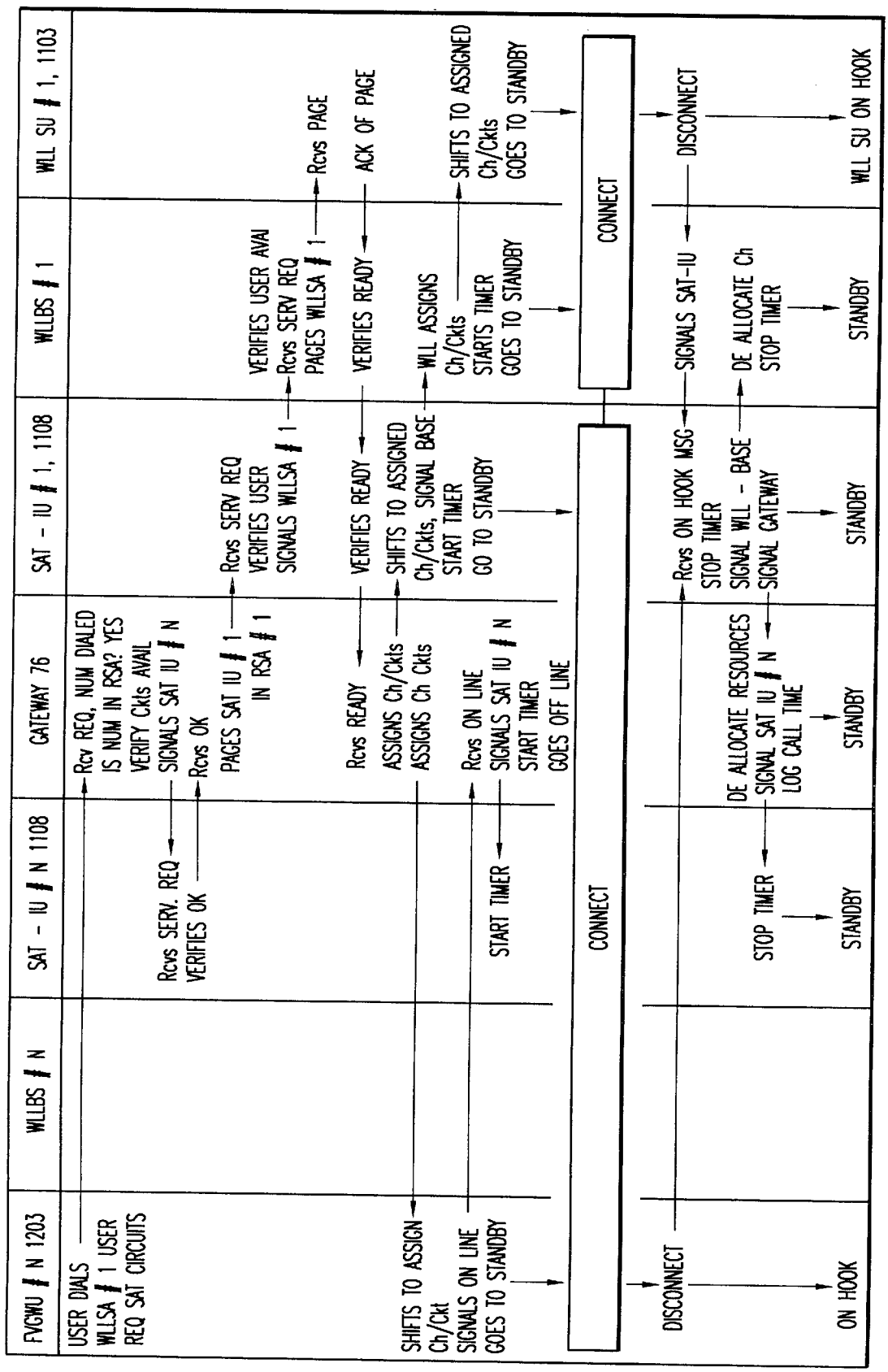

Referring to FIGS. 12C and 12D, the FVGWU 1203 dials a WLLSA #1 Subscriber Unit 1102 and requests a satellite circuit. It should be noted that the call processing may be the same as that shown in FIG. 8D, but again the following example is employed to illustrate the use of the Virtual Gateway 1108 as a verification and billing tool, as well as a virtual gateway. The service request and the number dialed by the FVGWU 1203 is received by the gateway 76 which determines that the number is in a Regional Service Area and that there are satellite circuits available. The gateway 76 then signals the Virtual Gateway #N 1108 associated with the Regional Service Area #N 1011 within which the FVGWU 1203 is requesting service. The Virtual Gateway #N indicates that it is operable to the gateway 76, which then proceeds to page the Virtual Gateway #1 1108 in Regional Service Area #1. The calling process continues as in FIG. 8D until the gateway 76 receives the "online" signal from the FVGWU 1203, upon which the gateway 76 signals the Virtual Gateway #N 1108 to start its call timer, just prior to going offline. After the communication is terminated, the procedure is the same again until the point at which the gateway 76 has deallocated the satellite resources, upon which the gateway 76 notifies the Virtual Gateway #N 1108 to stop its call timer. In this case it can again be seen that the Virtual Gateway #N is used for timing the duration of the call and for billing purposes, but is not actively involved in routing the traffic to the FVGWU 1203.

Figure 13A:
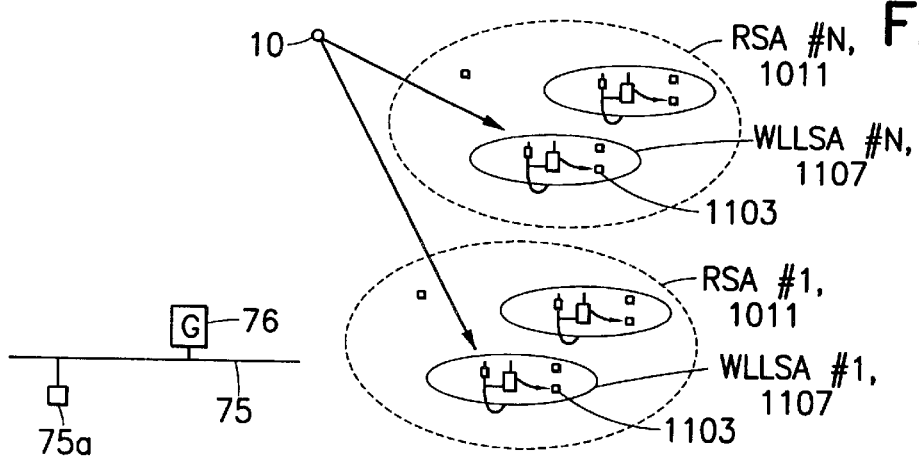
Figure 13B:
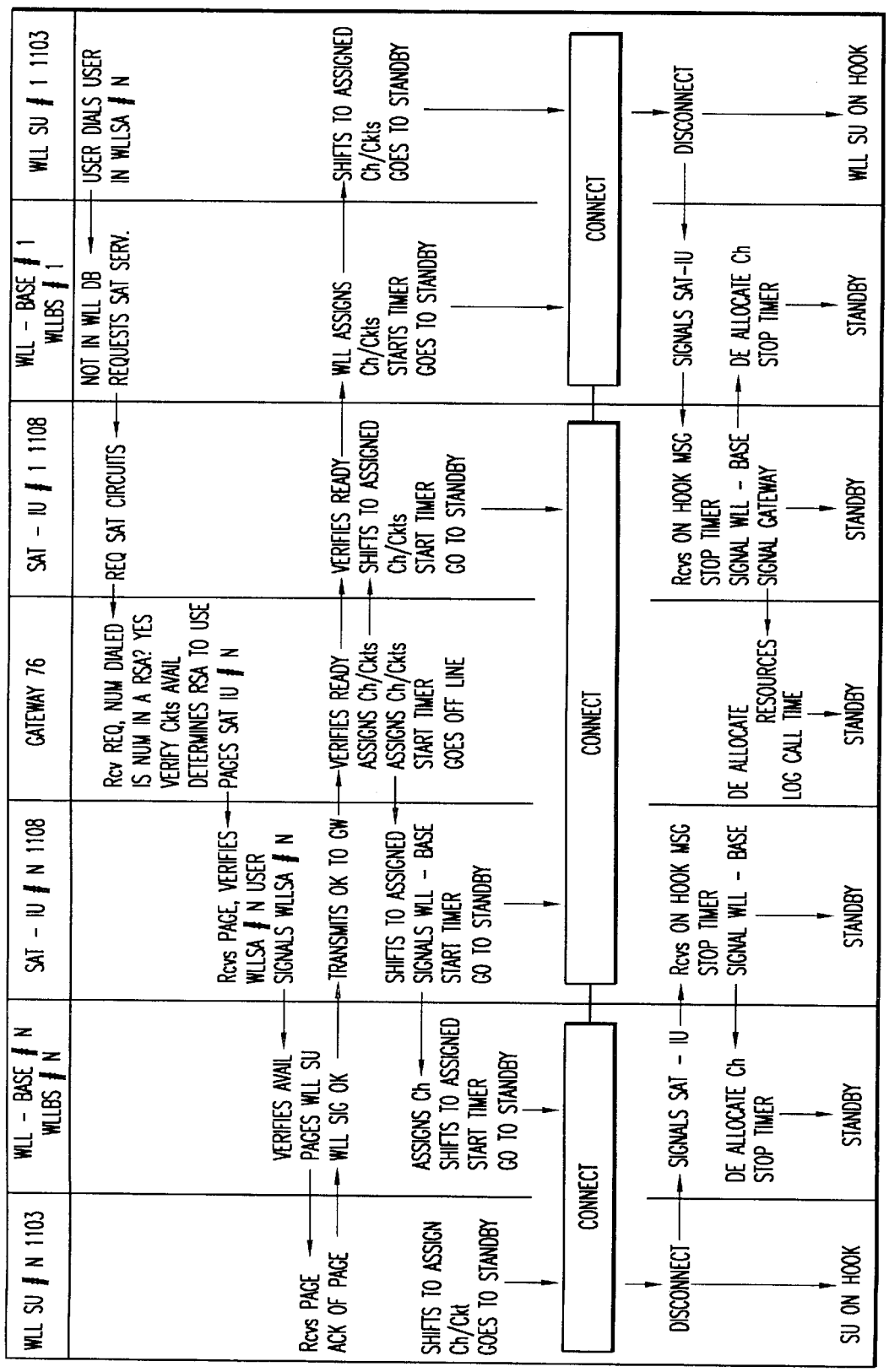

A third sub-case involves calls made from a WLLSA Subscriber Unit 1102 in a first Regional Service Area to a WLLSA Subscriber Unit 1102 in a second Regional Service Area 1011. The overall procedure is similar to that described above with regard to the first sub-case, and is illustrated in FIGS. 13A and 13B.

Figure 14A:
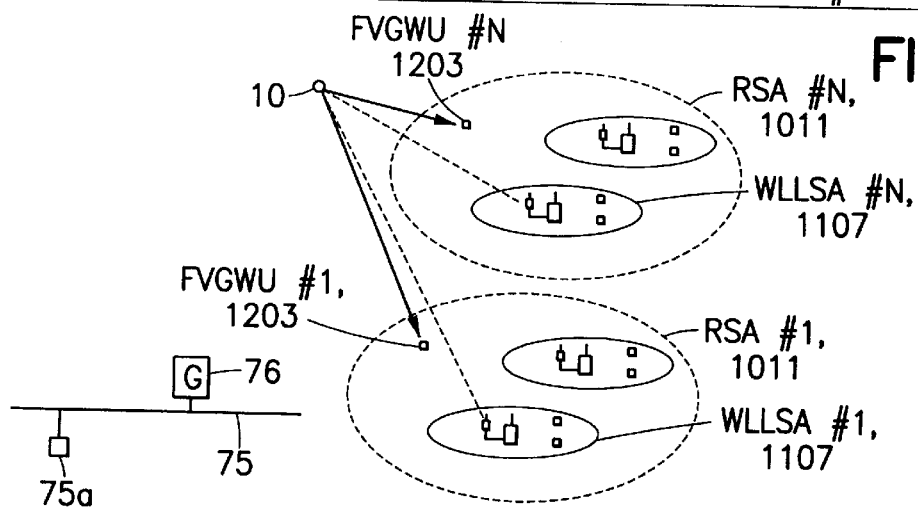
Figure 14B:
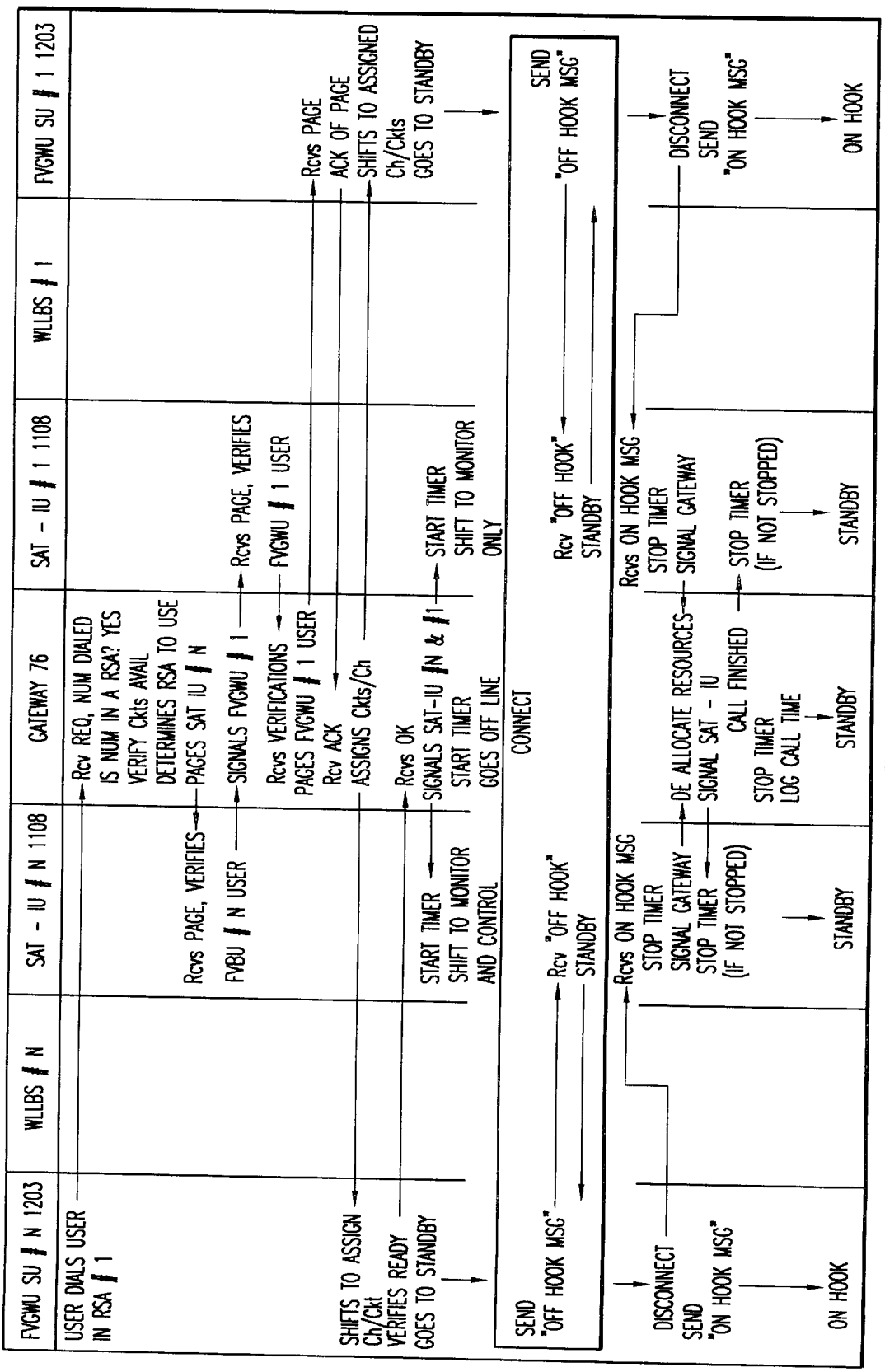

A fourth sub-case involves calls from a FVGWU 1203 to another FVGWU 1203 in the same or another Regional Service Area 1011. The two Regional Service Area embodiment is illustrated in FIGS. 14A and 14B.

Outbound calls from the user are routed from the handset 1203 to the Subscriber Unit 1202 where the traffic is digitized, modulated, and sent over a RF link to a satellite 10. The satellite system then operates to verify that the call is not a PSTN 75 call by querying a database (this can be done on-board the satellite 10 in the on-board processing embodiment, or in the gateway 76 in the non on-board processing embodiment). The caller is then verified by the Virtual Gateway 1108 which determines that the caller is a valid Regional Service Area #N user. This step may be avoided by allowing the gateway 76 to recognize that the caller is valid and that the call is directed toward another user, in this case gateway 76 processes the request and the number dialed in the gateway 76 switch. The call is then processed by the gateway 76 and a service request is formed and sent from the gateway 76 over links 1300 and 1305. The gateway 76 pages the FVGWU 1203 in the dialed WLLSA 1107 to set up a call, and may notify the Virtual Gateway 1108 of that WLLSA of the usage. In parallel, or optionally in series, the gateway 76 assigns frequencies and circuits, pages the user, and prepares the communication paths. Timing and billing is by the gateway 76, or alternatively by the Virtual Gateway(s) 1108 as was described above with respect to FIGS. 12B and 12D.

In this case, the gateway 76 only needs to recognize that the call is to another FVGWU 1203, and not to the PSTN 75 or a WLLSA user.

Inbound calls are handled in the same manner.

In greater detail, and referring to FIGS. 14A and 14B for the non-on-board processing case, a call from the FVGWU #N 1203 in Regional Service Area #N is made to the FVGWU #1 1203 in Regional Service Area #1. It should be noted that the following steps apply as well to calls from the FVGWU #1 1203 in Regional Service Area #1 to the FVGWU #N 1203 in Regional Service Area #N. Note also that it is not necessary for the user to be in another Regional Service Area. The gateway 76 receives the service request and the number dialed. The gateway 76 then recognizes that the called party is a Regional Service Area 1011 user in Regional Service Area #1 (or some other Regional Service Area). The gateway 76 then verifies that satellite circuits are available, determines from its database 76a which Regional Service Area to use, and then pages the Virtual Gateway #N 1108 that is associated with the calling FVGWU #N 1203. The Virtual Gateway #N verifies the FVGWU #N and signals the gateway 76. The gateway 76 then signals the Virtual Gateway #1 1108 receives the page, verifies the FVGWU #1 user, and signals the gateway 76. The gateway 76, upon receiving the verifications, pages the FVGWU #1 1203 in the associated Regional Service Area #1. The FVGWU #1 1203 receives the page and, if desired, provides an ACK to the gateway 76 thus signaling approval to set up the call. The gateway 76 receives the ACK and proceeds to assign satellite circuits and channels for the communication. The Ad FVGWU #1 1203 shifts to its assigned channel/circuit and goes to standby. The FVGWU #N 1203 also receives the assigned channel/circuit, shifts to the assigned channel/circuit, acknowledges that it is ready to proceed, and goes to standby. The gateway 76 receives the verification of ready from the FVGWU #N 1203, signals Virtual Gateways #1 and #N that communications are ready to begin, starts its call timer, and goes offline awaiting the notification that the call is finished. The Virtual Gateways 1108 #N and #1 receive the start signals, begin their respective call timers, and shift their receivers to a monitoring frequency so as to monitor (and control for Sat-IU #N 1108) the call progress and detect the termination of the call. The monitoring frequency may be the same as the traffic channel frequency, and may use in-band signalling. The call then commences. Periodically during the call the FVGWU #1 and the FVGWU #N may send "off-hook" messages, such as by the use of in-band signalling, which are monitored by the Virtual Gateway 1108 associated with each. This signal ensures that the call in progress continues until one of the FVGWUs 1203 terminates the call. Either of the FVGWU units may terminate the call by sending an "on hook" message to the associated Virtual Gateway 1108. The Virtual Gateway 1108 receiving the "on-hook" message stops its call timer and signals the gateway 76 that the call is completed. The gateway 76 then deallocates the assigned satellite resources, and signals the other Virtual Gateway 1108 that the call has been terminated. In response the other Virtual Gateway 1108 stops its call timer, and all units go to standby.

It is pointed out that in the foregoing discussion the use of call timers and the like is not required to make or complete a call, but is provided so as to enable a proper accounting of the call to be made to facilitate the billing process.

Figure 15A:
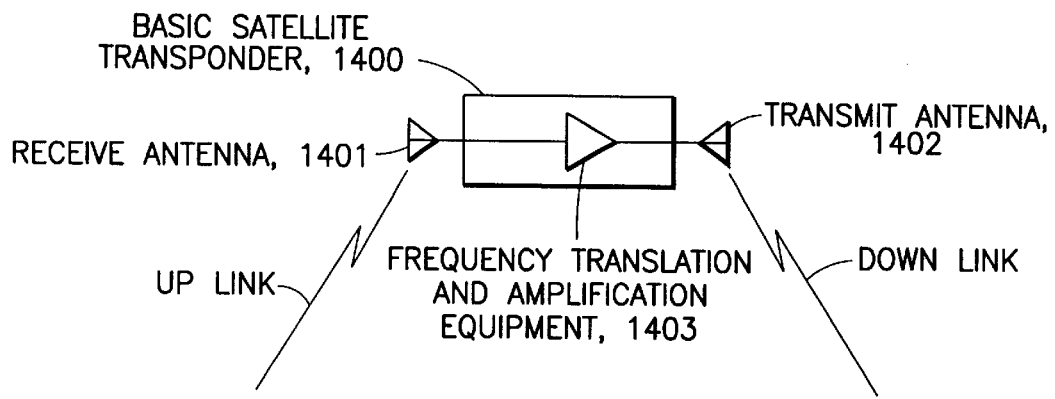
FIGS. 15A–15C illustrate various satellite transponder architectures that are suitable for implementing the satellites of the satellite communication system that forms a part of the enhanced WLL system of FIG. 6.

In order to pass signals through the satellite 10 and have them repeated at a sufficient level to have communications occur there is a need to receive signals, usually change frequency, amplify the signals, and transmit them to the ground. Referring to FIG. 15A, there is illustrated a satellite 10 that may be part of a constellation of satellites. The satellite 10 has support equipment, generally referred to as a bus, which provides telemetry and command control, power and power conditioning, pointing, attitude and orbit control, propulsion, structure, as well as other functions. The satellite payload is generally referred to as simply the payload or as the transponder. An exemplary satellite transponder 1400 includes a receive antenna 1401, a transmit antenna 1402, and a frequency translation, signal processing, and amplification equipment section 1403. Shown in FIGS. 16A–16D are the most common of the transponder types. The antennas 1401 and 1402 may be omnidirectional, direct radiating types, reflector/feed types, phased array types, or virtually any other type of antenna. The antennas may be combined for transmitting and receiving in a single antenna, with the receive and transmit signals separated by other equipment, such as a diplexer.

The simplest is the Transponder Type I-A (FIG. 16A), is a Quasi-Linear Single Conversion Repeater. This repeater receives, separates, and amplifies its assigned uplink carriers, translates the frequency to the downlink band, and amplifies the signal for retransmission on the downlink. This transponder is sometimes refereed to as a single conversion type because it translates from the uplink to the downlink band in one step. The early stages of the repeater usually are comprised of Low Noise Amplifiers to amplify the received frequency band, filters to eliminate energy outside the operating band, and a broadband frequency converter to shift the entire operating band from uplink to downlink frequency. The frequency converter typically includes a mixer and a local oscillator (LO)> Another version of this repeater type, Transponder Type 1-B (FIG. 16B), uses two local oscillators to convert the frequency from and to the final downlink frequency with an intermediate frequency (IF) utilized in between the local oscillators. This type of transponder allows manipulation of the signals at generally a much lower frequency, such as UHF or even lower. This manipulation may utilize Surface Acoustic Wave (SAW) Filters to further allow switching, frequency shifting, and other manipulations for implementing various downlink signal functions.

Figure 16A:
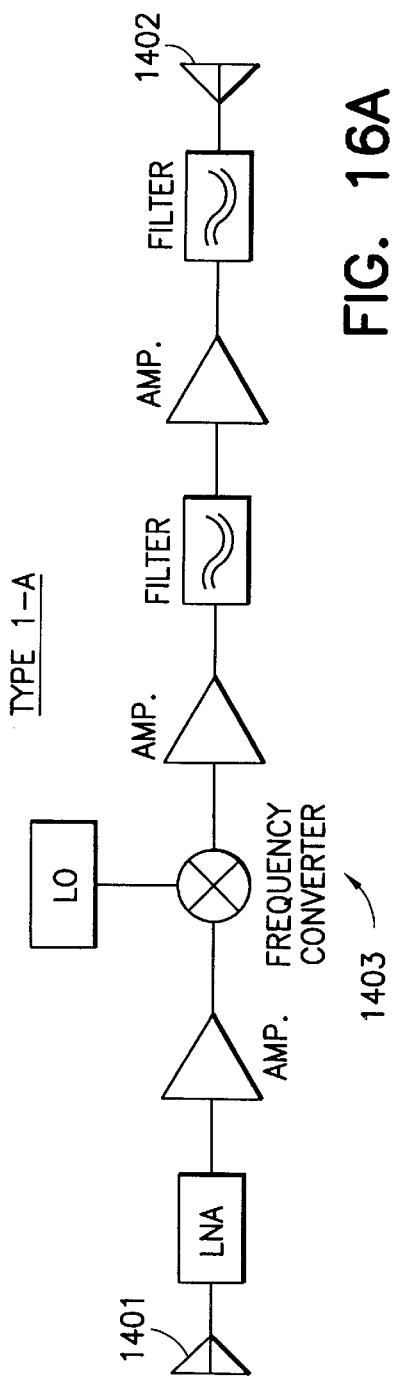
FIGS. 16A–16D illustrate various embodiments of the frequency translation, amplification, and signal processing equipment that forms a part of the transponder shown in FIG. 15A.
Figure 16B:
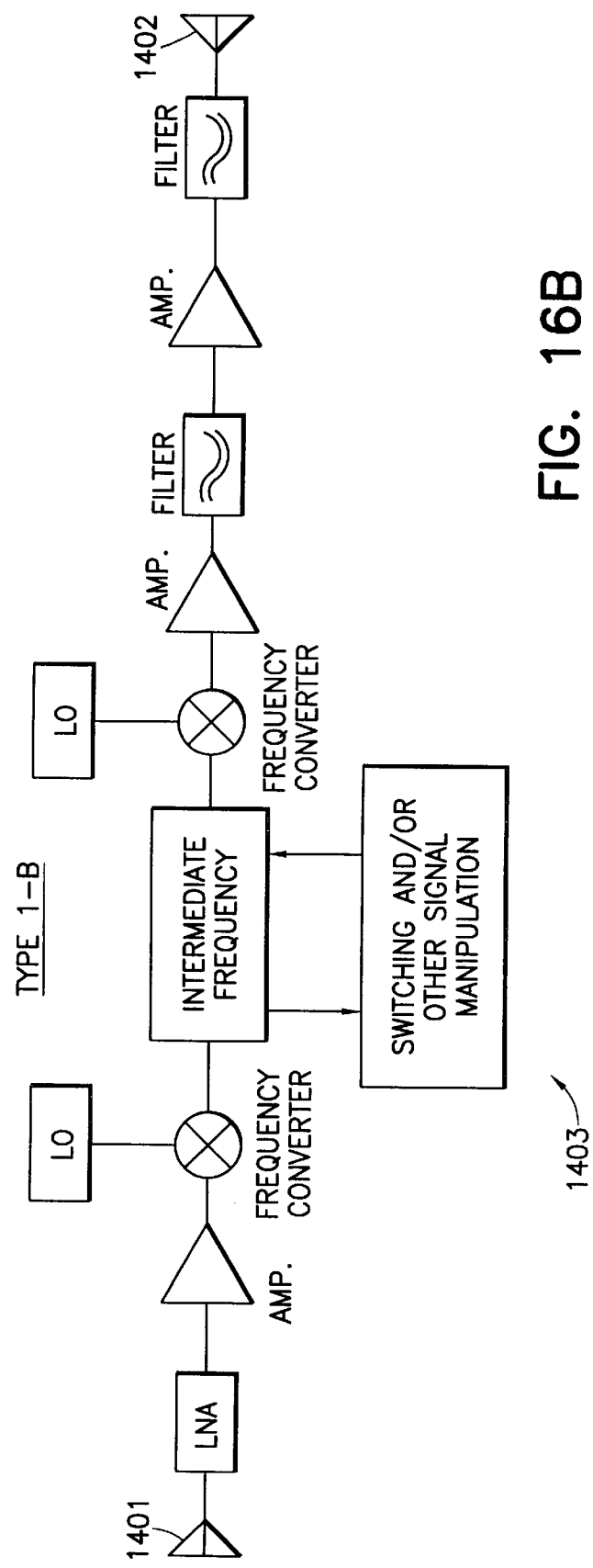
Figure 16C:
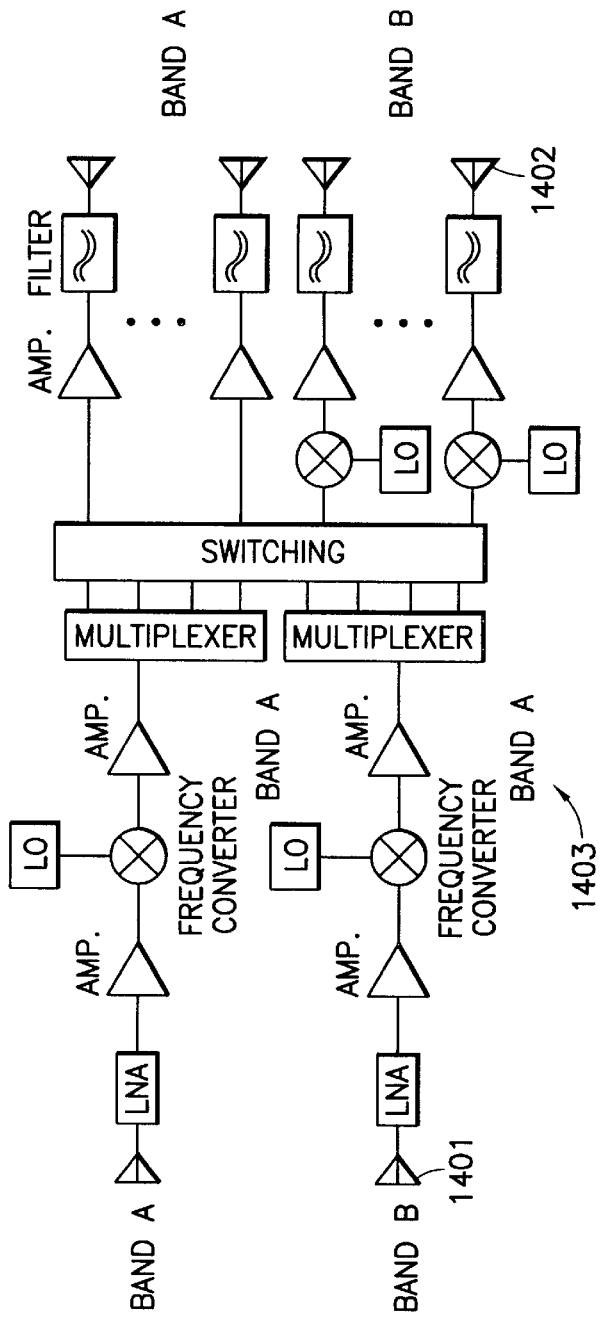

A second transponder, shown in FIG. 16C, is a dual conversion type which is useful in certain applications. The illustrated embodiment shows two band operation, where Band A is being transmitted on one set of frequencies, and Band B is being transmitted on a second band of frequencies. The frequencies of both bands are translated to one or the other, which in the illustrated embodiment are translated to Band A. The translated frequencies may be multiplexed, switched or otherwise manipulated, or cross-connected. After manipulation the frequencies destined for the Band A downlink are sent to the Band A downlink amplifiers and, in turn, the antennas for band A. The signals intended for the Band B downlink are further translated to the Band B downlink frequency and transmitted. This system is basically a combination of the Type 1-A and Type 1-B transponder configurations of FIGS. 16A and 16B.

Figure 16D:
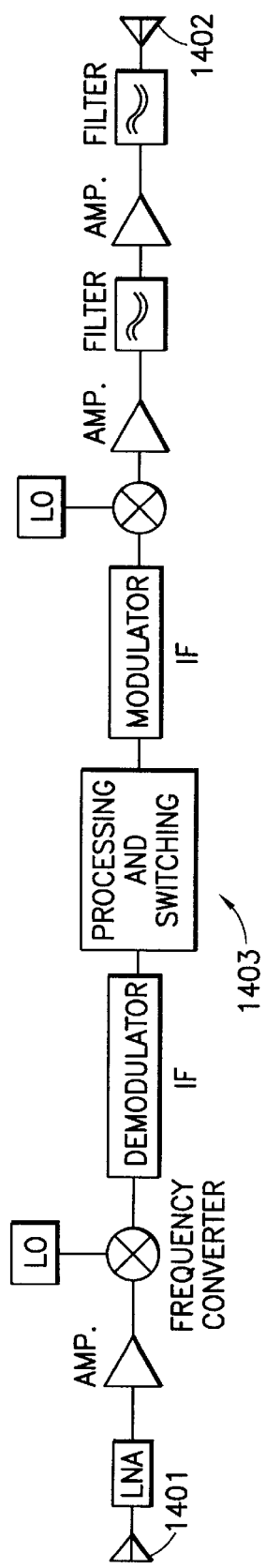

A further transponder type, shown in FIG. 16D, is referred to as a regenerative repeater. Digital transmission applications can have a more complex transponder, which in certain cases may increase performance. A regenerative transponder performs the receiving and transmitting functions in the same manner as the Type 1 or 2 transponders, however, the regenerator contains in each transmission link a demodulator that demodulates the uplink signal to a digital baseband signal, and a modulator which remodulates that signal onto a downlink carrier. The demodulated digital signal is retimed and restored to a standard form which isolates the uplink performance from the downlink performance, thus preventing an accumulation of noise. Any desired signal processing functions can be performed on the digital baseband signal, such as extracting signal routing information, repacketizing the bits into another packet format, etc.

Figure 15B:
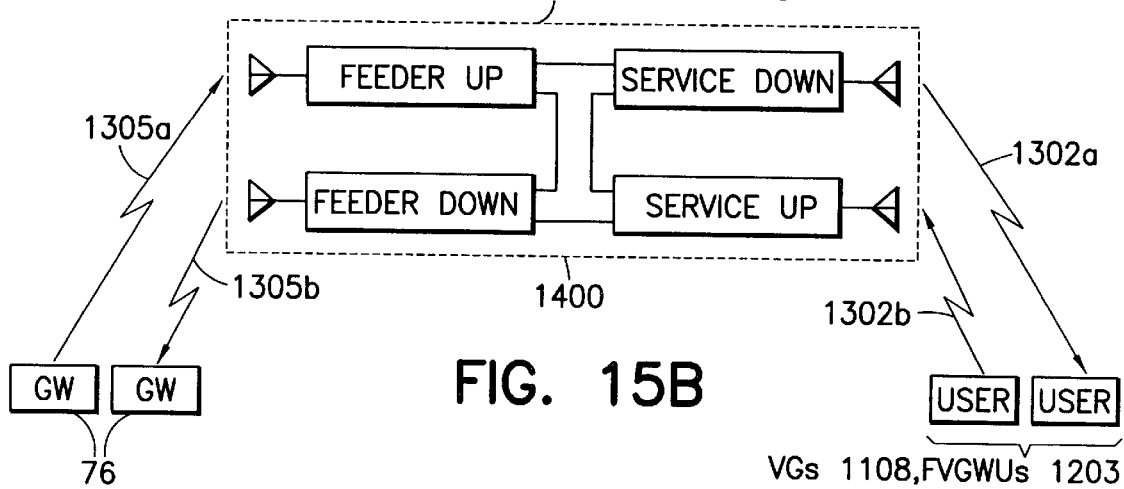

More than one of these basic transponder types may be combined on a single satellite to perform different functions and to allow various modes of operation. In particular, the instant invention utilizes both regenerative, and quasi-linear, transponders to perform signal routing. FIG. 15B shows a preferred transponder architecture for the satellite 10. The preferred transponder architecture has signal paths interconnecting feeder links and service links, and various frequency bands may be used. There are two types of transponder architecture. The type illustrated in FIG. 15B does not use intersatellite links (ISLs), while the type illustrated in FIG. 15C does use ISLs.

Referring first to the transponder of FIG. 15B, the gateway 76 includes a transmitter which provides an uplink 1305$a$ to the satellite transponder 1400. The signal is received by the Feeder Uplink equipment and can either be translated in frequency to the service downlink frequencies 1302$a$, for transmission to users, or to the feeder downlink frequencies 1305$b$ for transmission to other gateways 76 or to itself. The FVGWU 1203, the Virtual Gateway 1108 (or mobile users 1106 and other user equipment) have transmitters which can provide an uplink 1302$b$ to the satellite transponder 1400. This signal is received by the Service Uplink equipment and can either be translated in frequency to the feederlink frequency for transmission to gateways 76 on links 1305$b$, or translated to other service link 1302$a$ frequencies for transmission to other users, or to itself.

Figure 15C:
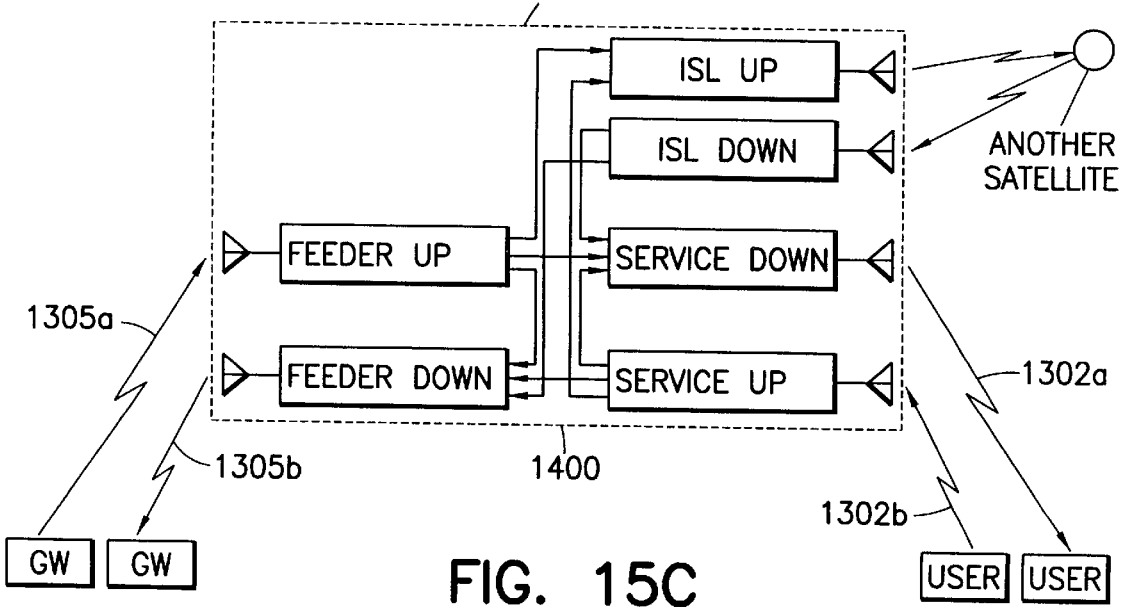

Referring to FIG. 15C, in addition to the foregoing functionality the ISLs use a third output from the Feeder Link equipment that is routed to ISL Uplink equipment for transmission to another satellite. Likewise, there is a third output from the Service Up Link equipment which can be routed to the ISL Uplink equipment for transmission to another satellite. Transmissions from the other satellite may be routed to either service or feeder downlink equipment.

In the presently preferred embodiment of this invention the gateways 76 may be constructed as disclosed in, by example, the above-referenced U.S. Pat. No. : 5,552,798, issued Sep. 3, 1996, entitled "Antenna for Multipath Satellite Communication Links", by F. J. Dietrich and P. A. Monte, with functions added to perform the various interactions with the Virtual Gateways 1108 as described in detail above. The capability to transfer information to the Virtual Gateway 1108 enables it to operate autonomously for various periods of time. During a call the gateway 76 may further instruct the Virtual Gateway 1108 to change its operating characteristics or mode of operation, or frequencies, or other parameters. The gateway 76, in addition to the frequency assignment (which may be changed during a connection) may also transfer other connection parameters to the Virtual Gateway 1108, including power limitations, user terminal and Virtual Gateway power control parameters, paging instructions, user terminal position location parameters, satellite tracking information, satellite handoff instructions, signaling for connections to terrestrial switching equipment, Walsh (spreading) codes or other circuit code information to be used, user equipment type, and other information such as timing and frequency references. The gateway 76 may also transfer certain Ground Operations Control Center (GOCC) information to the Virtual Gateway 1108 that may be necessary to provide supervision of system utilization, thereby providing an interface between the GOCC and the Virtual Gateway 1108. The gateway 76 also collects information during and after the call for the purpose of system management, billing, and other supervisory functions. The gateway 76 is assumed to include databases and computer equipment for providing connectivity with the Virtual Gateways 1108 and user terminals (both fixed and mobile) as described above. The gateway 76 also translates the GOCC-provided long range plans that are based on traffic requirements and constraints, such as available frequencies, capacities, service areas, etc., into short range plans usable by the Virtual Gateway 1108. Transfer of these short range plans to the Virtual Gateway 1108 enables planning to be done for other Virtual Gateway sessions. This is particularly important for multiple frequency, multiple session Virtual Gateway terminals. The gateway 76 also provides an authentication center for authenticating Virtual Gateways and user terminals, and providing overall system security.

Figure 17:
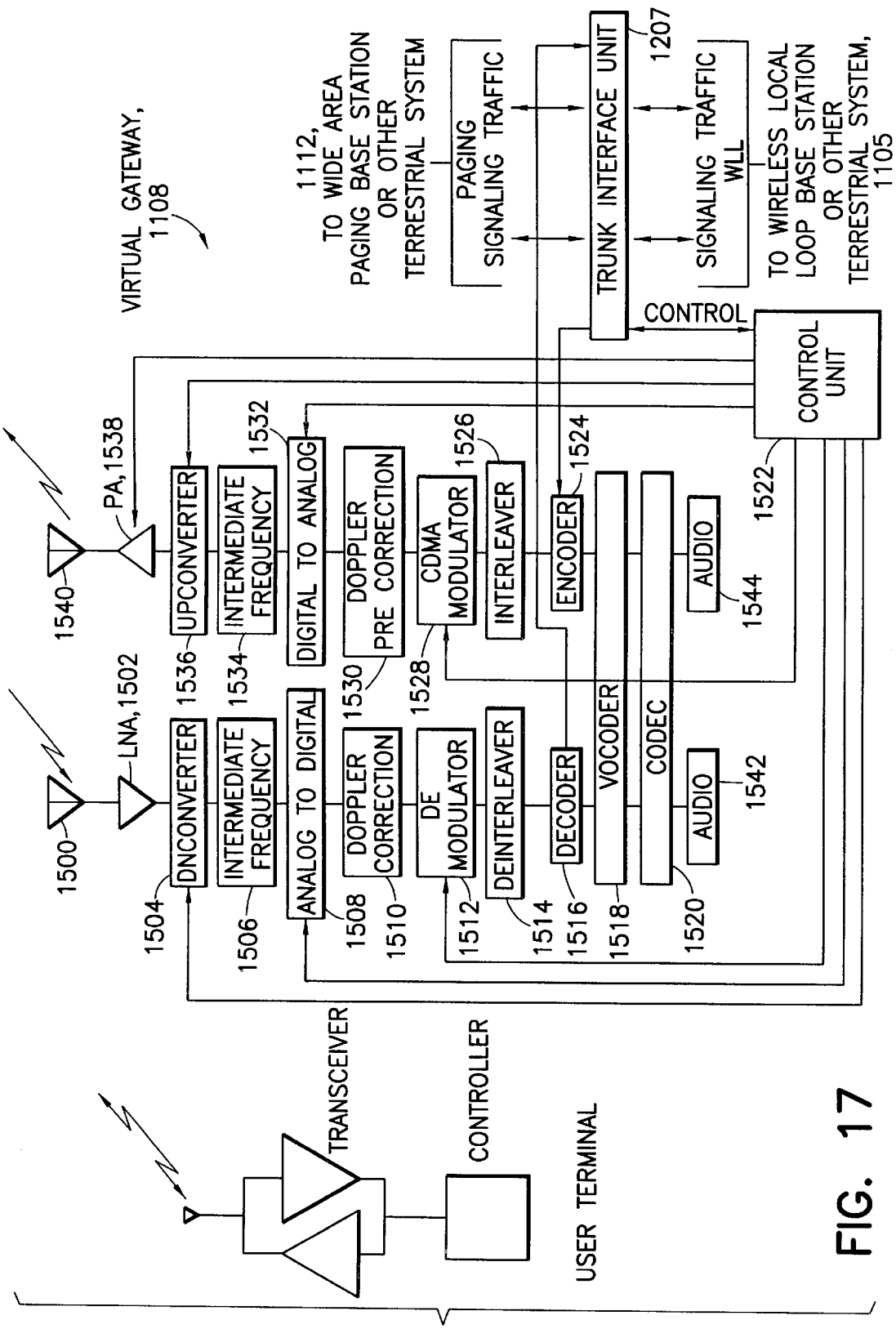
FIG. 17 is a block diagram of a subscriber interface unit, also referred to herein as a Virtual Gateway.

Referring to FIG. 17, the Virtual Gateway 1108 is similar in some respects to a user terminal, but is modified to conduct remote gateway sessions. Although the Virtual Gateway 1108 is generally sited in a fixed location, the use of mobile and transportable Virtual Gateways is also within the scope of this invention, and may be desired for emergency and other purposes. The Virtual Gateway 1108 is deployed within range of communications of the associated gateway 76. In most cases the range is one at which single satellite coverage is available to the serving gateway 76, however, in the case of intersatellite linking, the location of the Virtual Gateway 1108 may be arbitrary.

As was discussed above, during a call the gateway 76 may instruct the Virtual Gateway 1108 to change its operating characteristics or mode of operation, or frequencies or other parameters of the session.

The antenna of the Virtual Gateway 1108 is preferably a tracking antenna, which may be capable of tracking one or more satellites simultaneously, but omni-directional or pseudo omni-directional antennas are possible as well.

Referring more particularly to the block diagram of FIG. 17, signals arrive at the antenna 1500 from the satellite 10 and are received at a Low Noise Amplifier (LNA) 1502 and down converted in block 1504 to an intermediate frequency 1506, converted from analog to digital in block 1508, and Doppler corrected in block 1510 to compensate for motion of the satellite. The Doppler corrected signal is then applied to a demodulator 1512 (either a single demodulator or multiple (in the case of a RAKE receiver)) and then to a deinterleaver 1514 where the signals are combined. The combined signal is then input to a decoder 1516 and finally to a vocoder 1518 and codec 1520 which reconstructs the audio signal. Prior to the vocoder 1518 traffic signaling and control signals are taken from the decoder 1516 and made available to the Trunk Interface Unit 1207. This connection makes both audio and data signals available to other applications, such as the WLLBS 1105, other terrestrial system, and/or the above-described Paging/Broadcast System 1112 of FIG. 18. Other data coming from the gateway 76 is also made available to a control unit 1522. The control unit 1522, which includes a computer, software, databases and other functions, provides local control of the Virtual Gateway 1108 and the Trunk Interface Unit 1207. These controls are used to provide variability of parameters of the downconverter 1504, A/D converter 1508, demodulator 1512 and other portions of the receiver chain. In addition, the control unit 1522 exercises control over the return link (transmitter) chain, comprised of an encoder 1524, interleaver 1526, CDMA modulator 1528, Doppler pre-corrector 1530, D/A converter 1532, intermediate frequency unit 1534, upconverter 1536, power amplifier 1538, and transmit antenna 1540. Other subsystems for power, control and data entry may be provided. The audio inputs and outputs 1542 and 1544, respectively, may or may not be used.

The primary input and output of the Virtual gateway 1108 is the Trunk Interface Unit 1207, which provides communications traffic (e.g., voice and/or data) and signaling for various WLL interconnections, various interconnections to PBX-type wired systems, and signaling and traffic to the above-described Paging/Broadcast System 1112 and/or other similar terrestrial systems for call alerting, paging, messaging, store and forward of data, one way broadcast data for local distribution, and other similar services.

The Virtual Gateway 1108 preferably has the ability to handle multiple calls and, as such, certain of the components of the receive and transmit chains are duplicated as necessary. Any terrestrial terminal (WLL, Cellular, or PCS) can be made to operate also with the satellite system (i.e., dual-moded) by the proper selection of transmit and receive (transceiver) components, and the provision of a terminal controller capable of operating with the satellite system air interface, thereby enabling the terrestrial system to extend its coverage to that of the satellite system. For example, the WLL user can go mobile inside the WLL territory or anywhere else inside the serving gateway's coverage area. This dual-mode capability of the user terminals allows world wide roaming.

Figure 19:
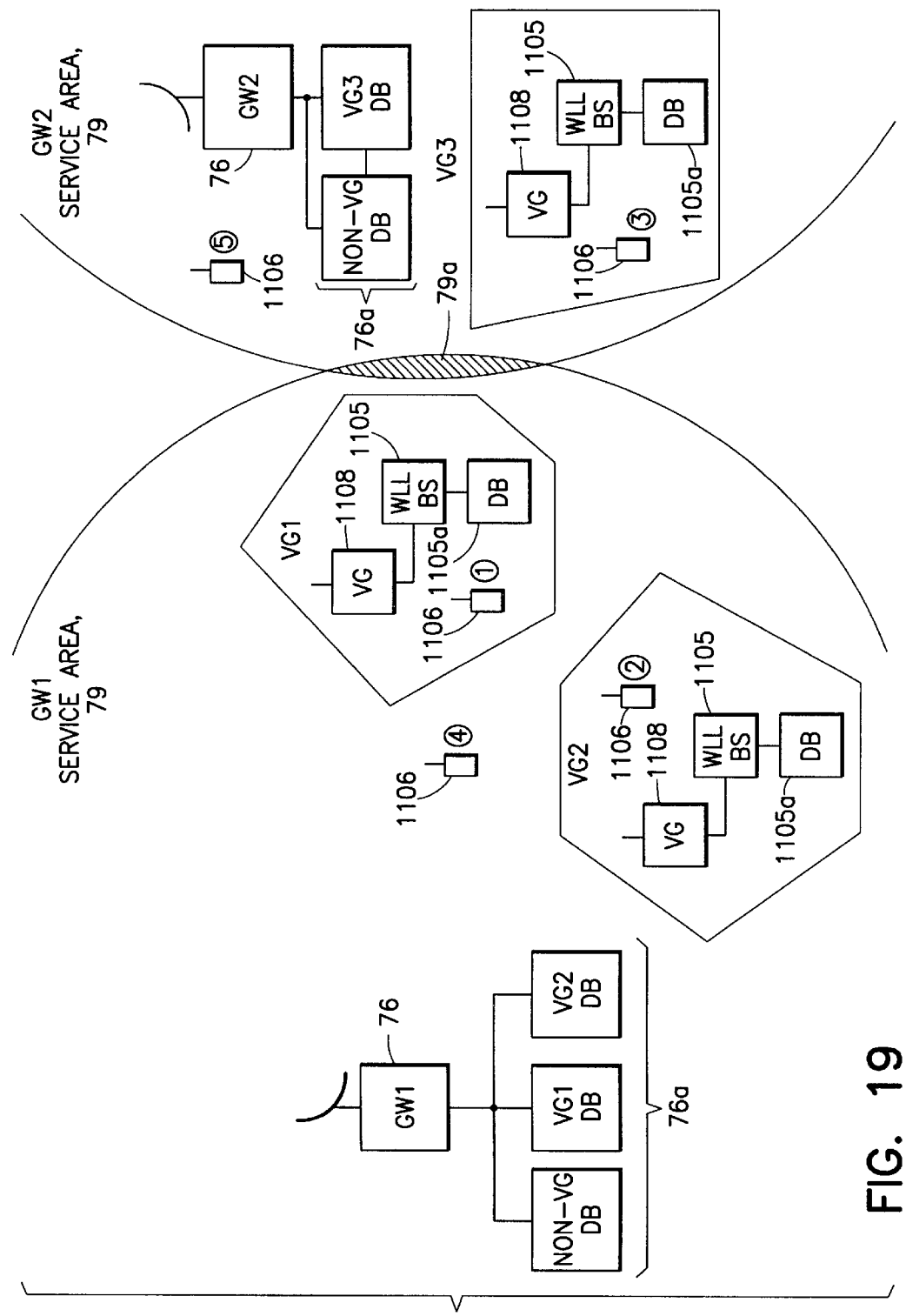
FIG. 19 is a diagram that is useful in explaining the various mobile terminal service embodiments of this invention.

Reference is now made to FIG. 19 for illustrating various cases of mobile terminal operation. In FIG. 19 two gateways 76 are shown (i.e., GW1 and GW2), each having an associated gateway service area 79. In the illustrated example the service areas 79 overlap in the region designated 79*a*, although this may not always be the case. Within the service area 79 of GW1 are two localized network service regions, such as WLP or WLL service areas serviced by virtual gateways VG1 and VG2. Within the service area 79 of GW2 is a single localized network service region, such as a WLL service area serviced by virtual gateway VG3. The GW1 includes the database 76*a*, which is shown to include a non-VG database (DB), and a database for both VG1 and VG2. The GW2 also includes the database 76*a*, which is shown to include a non-VG database and a database for VG3. The databases 76*a* store information that is descriptive of valid system and VG users. In addition, the VG databases store information that describes the boundaries of each VG service area, such as the locations of vertices of the polygons that bound each VG service area. Also illustrated in FIG. 19 is a mobile user terminal 1106 that is capable of being transported to various locations within the GW1 and GW2 service areas. The various locations are depicted as locations 1–5, each of which represents a specific instance or case of mobile terminal use. These five cases are as follows.

Case 1: The mobile terminal 1106 is "home" within the service area of VG1.

Case 2: The mobile terminal 1106 roams to the service area of VG2, but is still located within the GW1 service area 79.

Case 3: The mobile terminal 1106 roams to the service area of VG3, and is located within the GW2 service area 79.

Case 4: The mobile terminal 1106 roams outside of the service area of any VG, but is still located within the GW1 service area 79.

Case 5: The mobile terminal 1106 roams outside of the service area of any VG, and is located within the GW2 service area 79.

A description of the operation of the system for these various cases is now provided.

Case 1: When the mobile terminal 1106 is within the coverage region of its home VG, the operation is the same as that described above. Basically, the mobile terminal 1106 initiates a call which is relayed to the GW1 through at least one satellite 10. The GW1 performs a position location on the mobile terminal 1106 and finds, based on information stored in the VG1 database, that the mobile terminal 1106 is within the service region of its home VG. The GW1 then assigns the call to the VG 1108 of VG1, and the call proceeds as previously described, depending on the location of the called party.

Case 2: When the mobile terminal 1106 is within the coverage region of VG2, e.g., the mobile terminal 1106 has roamed from VG1 to VG2, the mobile terminal 1106 initiates a call which is relayed to GW1 through at least one satellite 10. The GW1 performs a position location on the mobile terminal 1106 and finds, based on information stored in the VG1 and the VG2 databases 76a, that the mobile terminal 1106 is within the service region of VG2. The GW1 then determines if a roaming agreement is in place between VG1 and VG2. If a roaming agreement exists then the mobile terminal is authenticated using VG2, or by using the database 1105a of VG1, or by using the GW1 database 76a. The database 1105a contains the identification of the mobile terminal 1106, as well as a list of allowed services for the mobile terminal. In any case, the GW1 informs the VG1 of the current location of the mobile terminal 1106, which is stored in the database 1105a of the VG1. That is, VG1 marks the mobile terminal 1106 as roaming, and furthermore denotes the identification of the VG where the mobile terminal is currently located. Having authenticated the mobile terminal 1106, the GW1 assigns the call to the VG 1108 of VG2, and the call proceeds as previously described, depending on the location of called party. At the termination of the call, the VG2 sends the call results or billing information to GW1. The GW1 then relays the call results to the VG1, either immediately or at some predetermined interval. In this manner the mobile terminal's use of the system resources can be properly accounted for at the user's home VG1.

Case 3: When the mobile terminal 1106 is within the coverage region of VG3, e.g., the mobile terminal 1106 has roamed from VG1 to VG3, the mobile terminal 1106 initiates a call which is relayed to GW2 through at least one satellite 10. The GW2 performs a position location on the mobile terminal 1106 and finds, based on information stored in the non-VG and VG3 databases, that the mobile terminal 1106 is within the service region of VG3, and also that the mobile terminal 1106 is not a home user (i.e., is a user of the GW1). If no roaming agreement exists between GW1 and GW2, then the GW2 may simply deny service to the mobile terminal 1106. Assuming that a roaming agreement does exist, the GW2 authenticates the mobile terminal 1106 using the VG1 database 1105a, which is obtained via GW1 from VG1, either through a satellite of the same or a different constellation, or through a turn-around satellite transponder, or through the PSTN or a terrestrial data link. In any event the GW2 informs the VG1 of the current location of the mobile terminal 1106, via the GW1, and the VG1 marks the mobile terminal 1106 as roaming, and furthermore denotes the identification of the VG where the mobile terminal is currently located and also the identity of the serving GW (i.e., GW2). Having authenticated the mobile terminal 1106, the GW2 assigns the call to the VG 1108 of VG3, and the call proceeds as previously described, depending on the location of the called party. At the termination of the call, the VG3 sends the call results or billing information to GW2. The GW2 then relays the call results to the VG1 via the GW1, either immediately or at some predetermined interval.

Case 4: The call handling for Case 4 is similar to that described above for Case 2. When the mobile terminal 1106 is outside of the coverage region of any VG within the GW1 service area, e.g., the mobile terminal 1106 has roamed outside of VG1, the mobile terminal 1106 initiates a call which is relayed to GW1 through at least one satellite 10. The GW1 performs a position location on the mobile terminal 1106 and finds, based on information stored in the VG1 and the VG2 databases 76a, that the mobile terminal 1106 is not within the service region of any VG. The mobile terminal is authenticated using the database 1105a of VG1, or is authenticated using the GW1 database 76a. The GW1 informs the VG1 of the current location of the mobile terminal 1106, which is stored in the database 1105a of the VG1. That is, VG1 marks the mobile terminal 1106 as roaming. Having authenticated the mobile terminal 1106, the GW1 handles the call itself, and the call proceeds as previously described, depending on the location of the called party. At the termination of the call, the GW1 may send the call results to the VG1, either immediately or at some predetermined interval.

Case 5: The call handling for Case 5 is similar to that described above for Case 3. When the mobile terminal 1106 is outside of the coverage region of any VG within the GW2 service area, e.g., the mobile terminal 1106 has roamed outside of VG1 and outside of the coverage area of GW1, the mobile terminal 1106 initiates a call which is relayed to GW2 through at least one satellite 10. The GW2 performs a position location on the mobile terminal 1106 and finds, based on information stored in the non-VG and VG3 databases, that the mobile terminal 1106 is not within the service region of VG3, and also that the mobile terminal 1106 is not a home user (i.e., is a user of the GW1). If no roaming agreement exists between GW1 and GW2, then the GW2 may simply deny service to the mobile terminal 1106. Assuming that a roaming agreement does exist, the GW2 authenticates the mobile terminal 1106 using the VG1 database 1105a, which is obtained via GW1 from VG1 as described previously for Case 3. The GW2 informs the VG1 of the current location of the mobile terminal 1106, via the GW1, and the VG1 marks the mobile terminal 1106 as roaming in the GW2 service area. Having authenticated the mobile terminal 1106, the GW2 handles the call itself and the call proceeds as previously described, depending on the location of the called party. At the termination of the call, the GW2 sends the call results to the VG1 via the GW1, either immediately or at some predetermined interval.

Figure 20:
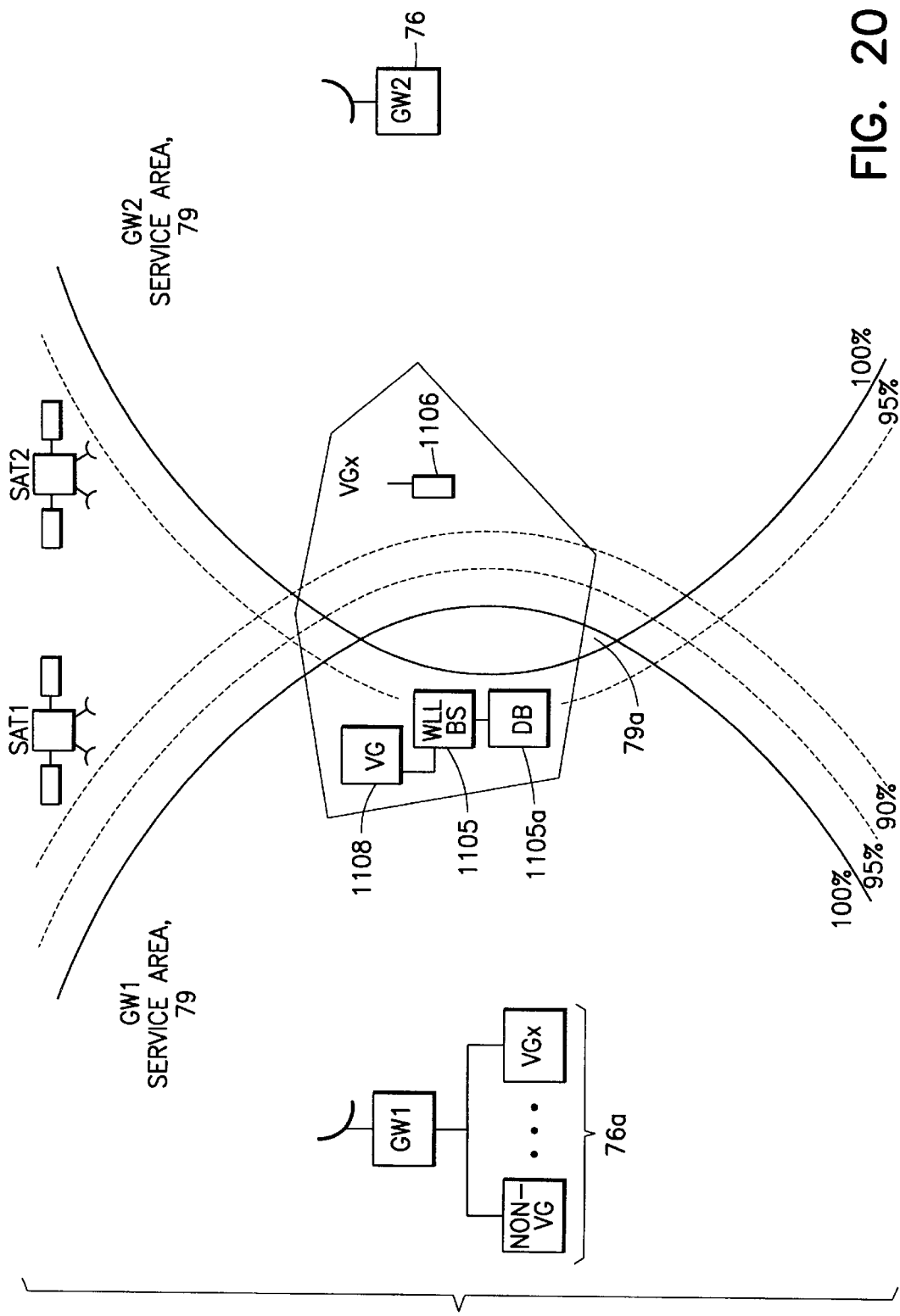
FIG. 20 is a diagram that is useful in explaining a case wherein a WLL service region lies within two gateway coverage areas.

Reference is now made to FIG. 20 for illustrating a case wherein a virtual gateway x (VGx) service area that is associated with GW1 lies partially outside of the 100% boundary of GW1 availability. In the illustrated example a portion of the VGx service area lies within the GW2 service area 79, although this may not always be the case. As is shown, for each gateway 76 there is a region wherein a user terminal is assured 100% gateway availability through at least one satellite. Beyond this region the user terminal may still be able to be serviced by the GW1, however the availability drops off to 95% availability, then 90% availability, etc.

For the case of FIG. 20 it is assumed that the terminal 1106 is located outside of the 90% availability circle of GW1, and within the 100% availability circle of GW2. It is further assumed that the terminal 1106 is associated with the VGx of GW1, and is making a call to a fixed or mobile user within the VGx service area. When the terminal 1106 initiates the call it is assumed that the call request is relayed via SAT2 to GW2. GW2 recognizes from the call request information (e.g., terminal ID), from the position location performed on terminal 1106, and from the dialed number, that the terminal 1106 is calling another user in the VGx service area, and that the terminal is associated with the GW1. GW2 then contacts GW1 through a satellite of the same or a different constellation, or through a turn-around satellite transponder, or through the PSTN or a terrestrial data link. In response, GW1 assigns a channel pair for use with the VGx and sends the channel pair information and any other call set-up parameters back to GW2, which informs the terminal 1106 of the call set-up information through SAT2. GW1 also informs the VGx 1108 of the assigned channel pairs and other call set-up information through SAT1. The call then proceeds as described previously for the case of a terminal calling within its home VG service area. Any return link ACKs or other signals can be relayed from the terminal 1106 via SAT2 and GW2 to the GW1.

Figure 21A:
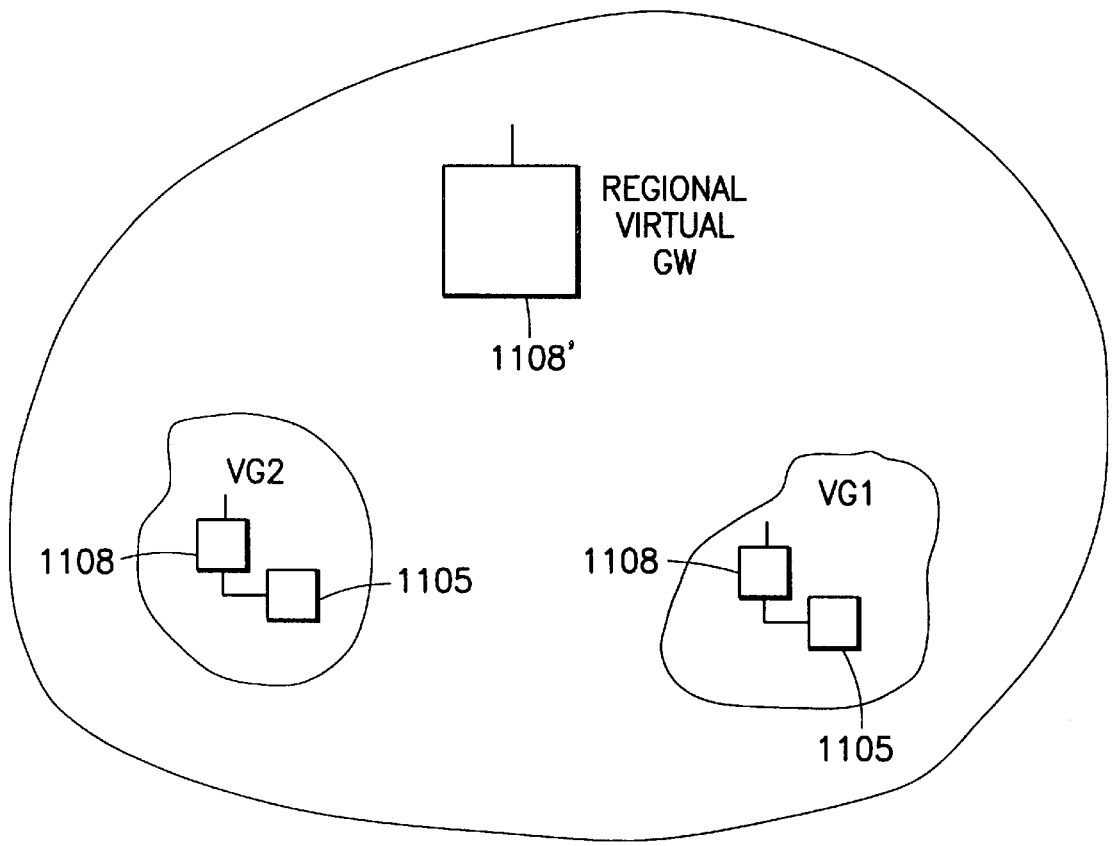
FIGS. 21A and 21B illustrate the use of one or more regional virtual gateways.
Figure 21B:
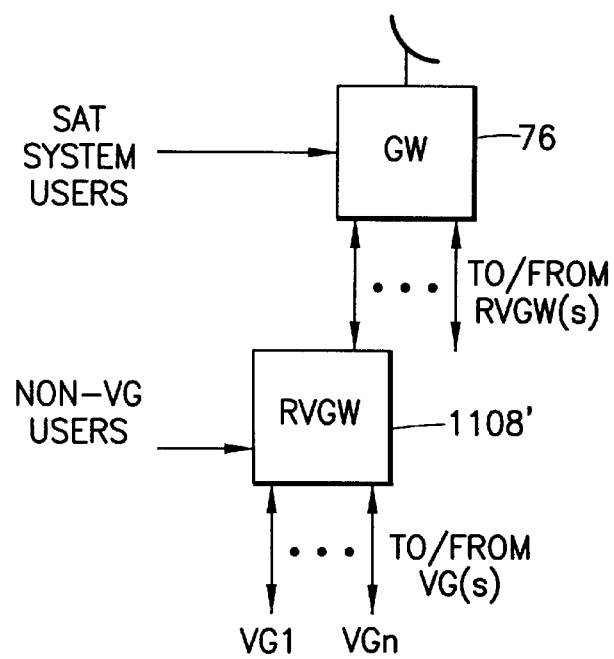

FIGS. 21A and 21B illustrate the use of a Regional Virtual Gateway (RVGW) 1108' in accordance with an aspect of this invention. As is shown in FIG. 21A, a RVGW 1108' can be associated with a plurality of the VGs, such as VG1 and VG2. Each RVGW 1108' is coupled to one or more of the VGs 1108 and to a serving GW 76. The RVGW 1108' forwards call requests from the VGs 1108 to the GW 76, and also forwards system resource allocations from GW 76 to the VGs 1108 in a pass through manner. In this hierarchical embodiment the RVGW 1108' may also handle the call requests from those terminals 1106 that are not located in a VG service area, as described above with respect to cases 4 and 5 of FIG. 19. The gateway 76 is responsible for non-WLL user terminals that make call requests (and that receive calls) within the gateway service area 79.

It is within the scope of this invention for a serving gateway 76 to send a message during a call to a virtual gateway 1108, such as an overhead message, with a new system resource allocation. The virtual gateway 1108 then informs the terminal 1106, 1206 of the new resource assignment, such as a new channel pair assignment. Both the virtual gateway and terminal then switch to the new channel assignment during the call. In this manner new channel pair assignments can be made during a call, enabling one or more user communications to be shifted in the assigned frequency spectrum. This can be especially useful when it is desired to mitigate the current or expected effects of interference from another satellite system, from a fixed space-based or terrestrially-based interference source, and/or the effects of self-interference.

While the invention has been particularly shown and described with respect to preferred embodiments thereof, it will be understood by those skilled in the art that changes in form and details may be made therein without departing from the scope and spirit of the invention.

What is claimed is:

1. A method for operating a communication system, comprising steps of:
   receiving a call for a user terminal at a satellite system gateway;
   examining a database to determine if the user terminal is associated with a localized service area within a coverage area of the satellite system gateway;
   if yes, formulating a message and transmitting the message to a virtual gateway that serves the regional service area, the message being transmitted via at least one satellite;
   receiving the message at the virtual gateway and paging the user terminal; and
   upon the user terminal responding to the page, establishing the call using satellite system resources that are allocated to the virtual gateway from the satellite system gateway.

2. A method as in claim 1, wherein the allocated satellite system resources comprise frequency channels.

3. A method as in claim 1, wherein the allocated satellite system resources comprise spreading codes.

4. A method as in claim 1, wherein the user terminal is a mobile terminal.

5. A method as in claim 1, wherein the user terminal is a fixed terminal.

6. A method as in claim 1, wherein the at least one satellite is a portion of a constellation of non-geosynchronous orbit satellites.

7. A method for operating a communication system, comprising steps of:
   receiving a call for a user terminal at a virtual gateway that serves a localized service area within a coverage area of a satellite system gateway;
   examining a database to determine if the called user terminal is associated with a localized service area that is served by the virtual gateway;
   if yes, establishing the call;
   if no, formulating a message and transmitting the message to the satellite system gateway, the message being transmitted via at least one satellite;
   receiving the message at the satellite system gateway and examining a database to determine if the called user terminal is associated with a second localized service area within the coverage area of the satellite system gateway;
   if yes, formulating a message and transmitting the message to a second virtual gateway that serves the second localized service area, the message being transmitted via at least one satellite;
   receiving the message at the second virtual gateway and paging the user terminal; and upon the user terminal responding to the page, establishing the call using satellite system resources that are allocated to the second virtual gateway from the satellite system gateway.

8. A method as in claim 7, wherein the allocated satellite system resources comprise frequency channels.

9. A method as in claim 7, wherein the allocated satellite system resources comprise spreading codes.

10. A method as in claim 7, wherein the user terminal is a mobile terminal.

11. A method as in claim 7, wherein the user terminal is a fixed terminal.

12. A method as in claim 7, wherein the at least one satellite is a portion of a constellation of non-geosynchronous orbit satellites.

* * * * *